US008124188B2

(12) United States Patent
Meagher et al.

(10) Patent No.: US 8,124,188 B2
(45) Date of Patent: Feb. 28, 2012

(54) POLYMERIC COATINGS AND METHODS FOR FORMING THEM

(75) Inventors: Laurence Meagher, Brunswick (AU); Helmut Thissen, Rowville (AU); Paul Pasic, Bentleigh (AU); Richard Alexander Evans, Glen Waverley (AU); Graham Johnson, Peakhurst (AU)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 675 days.

(21) Appl. No.: 11/840,523

(22) Filed: Aug. 17, 2007

(65) Prior Publication Data
US 2008/0045686 A1 Feb. 21, 2008

(30) Foreign Application Priority Data

Aug. 18, 2006 (AU) .............................. 2006904515

(51) Int. Cl.
*C09D 201/02* (2006.01)
*C08L 101/02* (2006.01)
(52) U.S. Cl. .................. 427/385.5; 524/827; 526/329.7; 427/340
(58) Field of Classification Search ............... 526/329.7; 524/827; 427/340, 385.5
See application file for complete search history.

(56) References Cited

U.S. PATENT DOCUMENTS

| | | | |
|---|---|---|---|
| 4,979,959 A | 12/1990 | Guire et al. | |
| 5,217,492 A | 6/1993 | Guire et al. | |
| 5,258,041 A | 11/1993 | Guire et al. | |
| 6,358,557 B1 | 3/2002 | Wang et al. | |
| 6,632,446 B1 * | 10/2003 | Hubbell et al. | 424/423 |

FOREIGN PATENT DOCUMENTS

| | | |
|---|---|---|
| EP | 1095711 A2 | 5/2001 |
| EP | 1227120 | 7/2002 |
| EP | 1095965 | 2/2005 |
| WO | WO 90/00887 | 2/1990 |
| WO | WO 96/20796 | 7/1996 |
| WO | WO 99/55396 | 11/1999 |
| WO | WO 01/66605 | 9/2001 |
| WO | WO 01/76594 | 10/2001 |
| WO | WO 01/92924 | 12/2001 |
| WO | WO 02/13881 | 2/2002 |
| WO | WO 02/32590 | 4/2002 |
| WO | WO 02/094331 | 11/2002 |
| WO | WO03/042724 | 5/2003 |
| WO | WO 03/083040 | 10/2003 |
| WO | WO 2004/076511 | 9/2004 |

OTHER PUBLICATIONS

Nakayama et at., 'Spatio-Resolved Hyperbranched Graft Polymerized Surfaces by Iniferter-Based Photograft Copolymerization', Langmuir, 2002, 18, 2601.

Otsu et al., 'Photon Correlation Spectroscopy of Poly(vinylacetate)', Macromolecules, 1986, 19, 2087.
Pan et al., 'Covalent Surface Coating of PMMA Microdevices for Protein Analysis', Abstracts, Joint Regional Meeting of the Northwest and Rocky Mountain Section of the American Chemical Society, Logan, UT, United States, Jun. 6-9, 2004.
Ajayaghosh et al., 'Photografting of Acrylic Monomers on Polystyrene Support', Journal of Applied Polymer Science, 1992, 45, 1617.
Bai et al., 'Synthesis of polymer-inorganic hybrid nanoparticles via radical polymerization initiated by surface-immobilized photoiniferter', Polymer International, 2003, 52, 853.
Barbucci et al., 'The use of hyaluronan and its activated sulphated derivative patterned with a micrometric scale on glass substrate in melanocyte cell behaviour', Biomaterials, 2003, 24, 915.
Boven et al., 'Radical grafting of poly(methyl methacrylate) onto silicon wafers, glass slides and glass beads', Polymer Communications, 1991, 32, 50.
Brown et al., 'Synthesis of oligol(ethylene glycol) methacrylate polymer brushes', European Polymer Journal, 2005, 41, 1757.
de Boer et al., '"Living" Free Radical Photopolymerization Initiated from Surface-Grafted Iniferter Monolayers', Macromolecules, 2000, 33, 349.
Gwendolyn et al., 'Photoimmobilization of poly (N-vinyl Pyrrolidinone) as a means to improve haemocompatibility of polyurethane biomaterials', Biomaterials, 1999, 20, 1879.
Halliwell et al., 'A Factorial Analysis of Silanization Conditions for the Immobilization of Oligonucleotides on Glass Surfaces', Analytical Chemistry, 2001, 731, 2476.
Hattori et al., 'Gate effect of theophylline-imprinted polymers grafted to the cellulose by living radical polymerization', Journal of Membrane Science, 2004, 233, 169.
Higashi et al., 'High-Spatioresolved Microarchitectural Surface Prepared by Photograft Copolymerization Using Dithiocarbamate Surface Preparation and Cellular Responses', Langmuir, 1999, 15, 2080.
Inoue et al., Surface Photografting of Hydrophilic Vinyl Monomers onto Diethyldithiocarbamated Polydimethylsiloxane', Journal of Applied Polymer Science, 1984, 29, 877.
Kawaguchi et al., 'Hairy Particles Prepared by Living Radical Graft-Polymerization', Macromolecular Symposia, 2002, 179, 75.
Kidoaki et al., 'Thermoresponsive Structural Change of a Poly(N-isopropylacrylamide) Graft Layer Measured with an Atomic Force Microscope', Langmuir, 2001, 17, 2402.
Kidoaki et al., 'Measurement of the Interaction Forces between Proteins and Iniferter-Based Graft-Polymerized Surfaces with an Atomic Force Microscope in Aqueous Media ', Langmuir, 2001, 17, 1080.
Kim et al., 'Effects of Polymer grafting on a glass surface for protein chip application', Colloids and Surfaces B: Biointerfaces, 2004, 33(2), 67-75.
Kizilel et al., 'Sequential formation of hydrogel multilayers through surface initiated photopolymerization', Proc. 227th ACS National Meeting, Anaheim, CA, USA, Mar. 28-Apr. 1, 2004.
Lee et al., 'Spatio-Resolved, Macromolecular Architectural Surface: Highly Branched Graft Polymer via Photochemically Driven Quasiliving Polymerization Technique', Macromolecules, 1999, 32, 6989-6995.

(Continued)

*Primary Examiner* — Kelechi Egwim
(74) *Attorney, Agent, or Firm* — Merchant & Gould P.C.

(57) ABSTRACT

The present invention relates to a controllable polymeric surface coating including a macromolecule, which is covalently bound to the surface of a substrate, the macromolecule including a plurality of polymerization initiators and a plurality of surface binding groups; and pendant polymers grafted from at least some of the polymerization initiators.

17 Claims, 32 Drawing Sheets

OTHER PUBLICATIONS

Lee et al., 'Surface photograft polymerization on segmented polyurethane using the iniferter technique', Journal of Biomedical Materials Research, 1999, 47, 564.

Liu et al., 'Preparation of polystyrene grafted silica nanoparticles by two-steps UV induced reaction', Journal of Photochemistry and Photobiology A—Chemistry, 2004, 167, 237.

Luo et al., 'Synthesis of a Novel Methacrylic Monomer Iniferter and Its Application in Surface Photografting on Crosslinked Polymer Substrates', Journal of Polymer Science Part A Polymer Chemistry, 2002, 40, 1885.

Luo et al., 'A Methacrylated Photoiniferter as a Chemical Basis for Microlithography: Micropatterning Based on Photografting Polymerization', Macromolecules, 2003, 36, 6739.

Matsuda et al., 'Quasi-living surface graft polymerization with phosphorylcholine group(s) at the terminal end', Biomaterials, 2003, 24, 4507.

Morokoshi et al., 'Sensing Capabilities of Colloidal Gold Modified with a Self-Assembled Monolayer of a Glucose-Carrying Polymer Chain on a Glass Substrate', Langmuir, 2004, 20, 8897.

Nahar et al., 'Light-induced activation of an inert surface for covalent immobilization of a protein ligand', Analytical Biochemitry, 2001, 294, 148.

Nakayama et al., 'Surface Macromolecular Architectural Designs Using Photo-Graft Copolymerization Based on Photochemistry of Benzyl N, N-Diethyldithiocarbamate', Macromolecules, 1996, 29, 8622.

Nakayama et al., 'Surface Macromolecular Microarchitecture Design: Biocompatible Surfaces via Photo-Block-Graft-Copolymerization Using N, N-Diethyldithiocarbamate', Langmuir, 1999, 15, 5560.

Nakayama et al., 'In Situ Observation of Dithiocarbamate-Based Surface Photograft Copolymerization Using Quartz Crystal Microbalance', Macromolecules, 1999, 32, 5405.

Nakayama et al., 'Laboratory-Scale Mass Production of a Multi-Micropatterned Grafted Surface with Different Polymer Regions', Journal of Biomedical Materials Research, 2000, 53, 584.

Nakayama et al., 'Spatio-Resolved Hyperbranched Graft Polymerized Surfaces by Iniferter-Based Photograft Copolymerization', Langmuir, 2002, 18, 2601; 30 Otsu et al., 'Photon Correlation Spectroscopy of Poly(vinylacetate)', Macromolecules, 1986, 19, 2087.

Peppas et al., Biomimetic materials and micropatterned structures using iniferters, Advanced Drug Delivery Reviews, 2004, 56, 1587.

Pyun et al., 'Synthesis of Polymer Brushes Using Atom Transfer Radical Polymerization', Macromolecular Rapid Communications, 2003, 24, 1043.

Qi et al., Nano-patterned and layered synthetic—biological materials assembled upon polymer brushes via biotin/streptavidin recognition, Proc 228th ACS National Meeting, Philadelphia, PA, United States, Aug. 22-26, 2004.

Ruckert et al., 'Molecularly imprinted composite materials via iniferter-modified supports', Journal of Materials Chemistry, 2002, 12, 2275.

Sigal et al., "Polyacrylamides Bearing Pendant -Sialoside Groups Strongly Inhibit Agglutination of Erythrocytes by Influenza Virus: The Strong Inhibition Reflects Enhanced Binding through Cooperative Polyvalent Interactionsα", J. Am. Chem. Soc., 1996, 118, 3789-3800.

Sugawara et al., 'Novel Surface Graft Copolymerization Method with Micron-Order Regional Precision', Macromolecules, 1994, 27, 7809.

Sun et al., "A facile synthesis of bifunctionalphospholipids for biomimetic membrane engineering", Tetrahedron, 2004, 60, 11765-11770.

Tarasow et al., 'Characteristics of an RNA Diels—Alderase Active Site', J. Am. Chem. Soc., 1999, 121, 3614-3617.

Tsuji et al., 'Temperature-Sensitive Hairy Particles Prepared by Living Radical Graft-Polymerization', Langmuir, 2004, 20, 2449.

Van der Heiden, 'A photochemical method for the surface modification of poly(etherurethanes) with phosphorycholine—containing compounds to improve haemocompatibility', Journal of Biomedical Materials Research, 1997, 37, 282.

Wang et al., 'In vitro stability study of organosilane self-assemble monolayers and multilayers', Journal of Colloid and Interface Science, 2005, 291, 438.

Willey et al., 'Rapid degradation of alkanethiol-based self-assembled monolayers on gold in ambient laboratory conditions', Surface Science, 2005. 576, 188.

Xiao et al., 'Surface modification of the Channels of poly(dimethylsiloxane) Microfluidic Chips with Polyacrylamide for Fast Electrophoretic Separations of Proteins', Analytical Chemistry, 2004, 76(7), 2055.

Xu et al., Surface-Active and Stimuli Responsive Polymer-Si: (100) Hybrids from Surface-Initiated Atom Transfer Radical Polymerization for Control of Cell Adhesion', Biomacromolecules, 2004, 5, 2392.

Yasutake et al., 'Controlled Radical Polymerization of Vaporized Vinyl Monomers on Solid Surfaces under UV Irradiation', Macromolecular Chemistry and Physics, 2004, 205, 492.

Zaremski et al., 'The Mechanism of Graft Free-Radical Polymerization on Silica Surface Containing Iniferter Groups', Journal of Macromolecular Science—Pure and Applied Chemistry, 1996, A33, 237-242.

Zhao et al., 'Polymer brushes: surface-immobilized macromolecules', Progress in Polymer Science, 2000, 25, 677.

Zhu et al., 'Covalent immobilization of chitosan/heparin complex with a photosensitive hetero-bifunctional crosslinking reagent on PLA surface', Biomaterials, 2002, 23, 4657.

* cited by examiner

POLYMERIC COATINGS AND METHODS FOR FORMING THEM

FIELD OF THE INVENTION

The present invention relates to methods and processes for modifying the surface of a variety of substrate materials (including organic and inorganic substrates). More particularly, the present invention relates to at least partially coating the surface of a substrate with polymers so as to impart a functional property to the surface of the substrate, which is distinct from the functional properties of the remainder of the substrate. For example, in biomedical applications the functional property imparted to the surface of a substrate may be the ability to induce a particular biological response.

BACKGROUND OF THE INVENTION

In many applications it is important to differentiate between the bulk properties of a material or device and the surface properties of that material or device. The bulk or substrate material provides a set of bulk properties suitable for the intended application, such as mechanical properties or refractive properties. However, in many applications the surface properties of the substrate material are not suitable or ideal for the intended application. Accordingly, for these substrate materials surface modification is required to mask the surface properties of the substrate that may interfere with use of the substrate.

For example, surface modification to mask the properties of a bulk material is useful in biomedical applications. The bulk material of an implant, such as a polymeric corneal onlay or metal hip implant, is selected for refractive and/or mechanical properties. However, the surface properties of the bulk material may interfere with a desired biological response, such as cell attachment, or may provoke an undesired biological response, such as protein fouling. Furthermore, surface modification may be used to achieve a degree of control over the biological response to the material or device that cannot be achieved by the properties of the bulk material itself. Examples of ways one can achieve control over the biological response include the display of specific bioactive signals such as peptides or drugs on the surface of a device or the prevention of non-specific interactions between the surface of the device and the surrounding biological medium.

One surface modification technique developed to mask the surface properties of bulk materials is the immobilisation of polymers on a substrate surface. This has generally been achieved, with varying degrees of success and completeness, by adsorption or covalent bonding.

Adsorption is the simplest method of immobilising macromolecules onto a surface. However, adsorbed coatings may desorb under certain conditions, which limits the appropriateness of adsorption as a surface modification technique in a variety of biomedical applications. For example, devices designed to remain in physiological conditions for an extended period of time, such as implants, may lose their functional surface coating, leaching polymers into their environment. Furthermore, simple adsorption is not readily applicable to a large variety of substrate materials, as the properties of the substrate are not suitable for attracting and retaining the coating polymers. Whether the properties of a substrate are appropriate will also depend on the type of polymer that is to be applied.

WO 03/042724 describes a more sophisticated process for coating a material surface based on adsorption, comprising the steps of: a) providing an inorganic or organic bulk material; b) providing one or more polyionic molecules with at least one of them having pendant covalently bound initiator moieties for radical polymerization; c) applying the polyionic material of step (b) to the bulk material of step (a), thereby forming a hydrophilic layer on the bulk material surface; and d) graft polymerizing a hydrophilic monomer or macromonomer to said polyionic material. Disadvantages of this approach include the possibility of desorption of the coating as described for the adsorbed surface modification techniques. Furthermore, control over the grafted polymer coating architecture is limited.

Alternatively, polymers are immobilised onto the surface of a substrate by covalent bonding. A variety of different processes for obtaining graft polymer coatings on solid substrates have been described. Some examples of this technique include:

1) EP 1 095 711 A2 describes the covalent attachment to a substrate of conventional radical polymerisation initiators which may be used for the coating of biomedical substrate materials. This approach typically leads to an indeterminate and inconsistent density of the initiator across the surface of a substrate, which is often undesirable. Furthermore, disadvantageously the initiator density that can be achieved with this procedure is limited. Finally, there is only limited control over the subsequently grafted coating architecture.

2) Initiator-containing self-assembled monolayers have also been used. For example, Boven et al. [Boven, G., Folkersma, R., Challa, G., Schouten, A. J., Polym. Commun. 32 (1991) 50] treated glass beads with 3-aminopropyltriethoxysilane to obtain amino functional groups on the surface. Azo-initiators were then immobilised on the surface through the formation of amide bonds between the g-APS modified surface and an acid chloride functionalized azo-initiator. Subsequent surface initiated radical polymerisation produced tethered PMMA chains. Disadvantages of this approach again include an indeterminate, inconsistent, and limited density of the initiator across the surface of a substrate and limited control over the grafted coating architecture. Furthermore, this approach uses a multi-step surface coating approach which limits its applicability and usefulness to silica-type materials.

3) Sugawara, T., Matsuda, T., Macromolecules 27 (1994) 7809 describes grafting poly(acrylamide) on poly(ethylene terephthalate) (PET) substrates. First the substrate is coated with poly(allylamine), which had been partially derivatised with photoreactive phenylazido groups. The aminated polymer was then bound to the surface of the PET substrate by UV irradiation. Carboxylated azo-initiators were then immobilized on the polyamine modified surface through a condensation reaction. Radical polymerisation in a monomer solution finally yielded tethered polymers. Again, this technique uses a multi-step surface coating approach which limits its applicability. Other disadvantages of this approach again include an indeterminate, inconsistent and limited density of the initiator across the surface of a substrate and limited control over the grafted coating architecture.

4) Graft polymerisation initiators have also been immobilised on solid substrates by simple swelling in a solution containing the initiator and subsequent graft polymerisation in a solution containing the initiator. U.S. Pat. No. 6,358,557 discloses this concept. Furthermore, WO 03/083040 teaches the use of primer layers incorporating the initiator. This method can also be used for solid substrates that are incapable of swelling. Apart from substrate dependency issues, disadvantages of this approach again include the indeterminate, inconsistent and limited density of the initiator across the surface of a substrate and limited control over the grafted coating architecture. Furthermore, the lack of covalent attachment can lead to partial desorption of the coating.

ATRP initiators have been covalently attached to silica surfaces via a silane reaction with surface hydroxyl groups and to gold surfaces by the reaction of ATRP initiators containing thiol groups with the gold surface [Pyun, J., Kowalewski, T. Matyjaszewski, K., Macromolecular Rapid Communications, 24 (2003) 1043]. However, reliance on the use of substrates such as silica and gold limits the applicability of this technology. In addition, further disadvantages include, that self assembled layers formed from silanes have been shown to be somewhat unstable [Wang, A. et al., Journal of Colloid and Interface Science, 291 (2005) 438] and irreproducible [Halliwell, C. M., Cass, A. E. G., Analytical Chemistry 73 (2001) 2476] and that self assembled layers formed between gold and thiols (a non-covalent interaction) have been shown to be unstable with time [Willey, T. M. et al., Surface Science 576 (2005) 188]. Furthermore, the formation of such modified surfaces is relatively complex (with the requirement that the substrate be scrupulously clean and dry) and the surface coating may not be evenly distributed on the substrate. The covalent attachment of other initiators, such as iniferters, has also been used to form graft polymer layers on substrates such as silica (via silanes) [Lee, H. J., Nakayama, Y., Masuda, T., Macromolecules 32 (1999) 6989] and polystyrene via derivatisation reactions [Nakayama, Y., Matsuda, T., Langmuir 15 (1999) 5560; Kawaguchi, H., Isono, Y. Tsugi, S., Macromolecular Symposia 179 (2002) 75]. However, as previously discussed, surface modification schemes designed for particular substrates, such as silica and polystyrene, severely limits the applicability of the technology.

Reference to any prior art in this specification is not, and should not be taken as, an acknowledgement or any form of suggestion that this prior art forms part of the common general knowledge in Australia or any other jurisdiction or that this prior art could reasonably be expected to be ascertained, understood or regarded as relevant by a person skilled in the art.

SUMMARY OF THE INVENTION

The present invention relates to an alternative, stable, broadly applicable method of forming a polymeric coating on the surface of a substrate.

Advantageously, the present invention relates to a method of forming a polymeric surface coating which reliably achieves predetermined surface coating characteristics, such as density, evenness and thickness. This advantage is achieved at a first level by control over the density and distribution of polymerisation initiators on a macromolecule covalently bound to the surface of a substrate and at a second level by control over the formation of pendant polymers by grafting from the polymerisation initiators.

Accordingly, in a first aspect, the present invention provides a method for controllably locating polymerisation initiators on a surface of a substrate including covalently binding a macromolecule to the surface, wherein the macromolecule includes a plurality of polymerisation initiators and a plurality of surface binding groups.

Preferably, the macromolecule includes a predetermined molar ratio of polymerisation initiators of at least 1%.

Preferably, the polymerisation initiators are controlled free radical polymerisation initiators.

In a further aspect, the present invention provides a method for controllably locating polymerisation initiators on a surface of a substrate including covalently binding a macromolecule to the surface via a plurality of covalent bonds, wherein the macromolecule includes a plurality of polymerisation initiators.

Preferably, the macromolecule includes a predetermined molar ratio of polymerisation initiators of at least 1%.

Preferably, the polymerisation initiators are controlled free radical polymerisation initiators.

In a still further aspect, the present invention provides a method for controllably locating polymerisation initiators on a surface of a substrate including covalently binding a macromolecule, having a predetermined molar ratio of polymerisation initiators covalently bound thereto, to the surface of the substrate.

Preferably, the macromolecule has a predetermined molar ratio of polymerisation initiators of at least 1%

Preferably, the polymerisation initiators are controlled free radical polymerisation initiators.

The term "controllably" in relation to locating polymerisation initiators on a surface, as used in the specification and claims, refers to the ability to apply the method to direct the characteristics of the location or relative location of the initiators on the surface, such as the evenness, density and accessibility of the initiators. Limitations on the ability to regulate or modulate factors such as these are common limitations in the art for improved surface modification of substrates. While these factors can be controlled to some extent (in the sense of lower density or accessibility), this tends to reduce the resultant properties of the end product. The present invention is directed to positively modulating these factors for improved end-product properties.

The term "polymerisation initiator" or "initiator" as used in the specification and claims means any compound which initiates polymerisation or which is capable of producing a reactive species which initiates polymerisation.

The term "predetermined" as used in the specification and claims refers to the selection of the molar ratio of polymerisation initiators sufficient to achieve the desired density and distribution of polymerisation initiators on the macromolecule covalently bound to the surface of the substrate. A predetermined molar ratio denotes that the ratio of initiators is controllable and, as shown in the examples, may be varied and determined in advance.

The term "molar ratio" is a measure of the density of the polymerisation initiators on the macromolecule. The term is used to refer to the ratio of the number of polymerisation initiators per diluent monomer units in the macromolecule.

Control of the molar ratio of the initiator groups in the macromolecule allows control over the surface density of the initiators on the substrate bearing the macromolecular coating. Accordingly, the density of the initiators in the macromolecular coating is controlled by the predetermined molar ratio of the initiator groups in a macromolecule. This is advantageous as it provides a greater level of control over the subsequent polymeric coating, the density of which is able to be reliably produced from a predictable surface density of initiators. Alternatively, the density of initiator groups present on the surface of the substrate may be controlled by varying the amount of macromolecule attached to the surface in a gradient across the substrate, which will affect the subsequent properties of the pendant polymer molecules.

The macromolecule may be attached to the surface of the substrate via a plurality of covalent bonds. Use of a plurality of covalent bonds to bind the macromolecule to the surface of the substrate may improve the stability of the macromolecular coating. Covalent bonds may be formed in one embodiment by reaction of functional groups on the substrate surface with complementary functional groups on the macromolecule. Alternatively, the macromolecule may be applied to the substrate using layer-by-layer technology which is subsequently cross-linked to form covalent bonds between the layers and also with the substrate surface. Such a process increases the stability and insolubility of the macromolecular coating compared to simple layer-by-layer application.

The macromolecule may be any macromolecule suitable for the intended ultimate application of the substrate and for the chosen method of applying the macromolecule.

The polymerisation initiators may be anionic, cationic, or free radical initiators. Preferably, the initiators are living polymerisation initiators. More preferably, the initiators are controlled free radical polymerisation initiators. Such initiators include iniferter, RAFT agent derived, ATRP, triarylmethane and alkoxyamine (nitroxide mediated) initiators.

The polymerisation initiators may be covalently bound to the macromolecule by incorporation during polymerisation, such as by copolymerisation with a diluent monomer. Alternatively, the initiators may be reacted with functional pendant groups on a pre-formed macromolecule to form a covalent bond. The incorporation of the initiators is performed before the macromolecule is covalently bound to the surface of the substrate.

Optionally, the method further includes an initial step of determining one or more polymerisation initiator location characteristics. For example, the desired density of the initiators in the macromolecular coating may be determined, which will then direct the determination of the appropriate molar ratio of polymerisation initiators in the macromolecule.

A still further aspect of the present invention provides a method for preparing a controllable polymeric surface coating on a surface of a substrate including covalently binding a macromolecule to the surface, wherein the macromolecule includes a plurality of polymerisation initiators and a plurality of surface binding groups; and grafting pendant polymers from at least some of the polymerisation initiators.

Preferably, the macromolecule includes a predetermined molar ratio of polymerisation initiators of at least 1%.

Preferably, the polymerisation initiators are controlled free radical polymerisation initiators.

Preferably, the pendant polymers are grafted from the polymerisation initiators by controlled free radical living polymerisation.

In one embodiment, the method further includes providing additional polymers which are grafted to the pendant polymers.

A still further aspect of the present invention provides a method for preparing a controllable polymeric surface coating on a surface of a substrate including covalently binding a macromolecule to the surface via a plurality of covalent bonds, wherein the macromolecule includes a plurality of polymerisation initiators; and grafting pendant polymers from at least some of the polymerisation initiators.

Preferably, the macromolecule includes a predetermined molar ratio of polymerisation initiators of at least 1%.

Preferably, the polymerisation initiators are controlled free radical polymerisation initiators.

Preferably, the pendant polymers are grafted from the polymerisation initiators by controlled free radical living polymerisation.

In one embodiment, the method further includes providing additional polymers which are grafted to the pendant polymers.

A still further aspect of the present invention provides a method for preparing a controllable polymeric surface coating on a surface of a substrate including covalently binding a macromolecule having a predetermined molar ratio of polymerisation initiators covalently bound thereto to the surface of the substrate; and grafting pendant polymers from at least some of the polymerisation initiators.

Preferably, the macromolecule has a predetermined molar ratio of polymerisation inhibitors of at least 1%.

Preferably, the polymerisation initiators are controlled free radical polymerisation initiators.

Preferably, the pendant polymers are grafted from the polymerisation initiators by controlled free radical living polymerisation.

In one embodiment, the method further includes providing additional polymers which are grafted to the pendant polymers.

The term "controllable" in relation to the polymeric surface coating on a surface of a substrate, as used in the specification and claims refers to the ability to apply the method to direct the characteristics of the polymeric surface coating by directing the location of the initiators on the surface, as discussed above, and directing the characteristics of the pendant polymers and resultant coating layer such as density, thickness, evenness, chemistry and architecture. Limitations on the ability to regulate or modulate factors such as these are common limitations in the art. The present invention is directed to positively modulating these factors for improved end-product properties of the polymeric coating.

Preferably, the polymerisation initiators are living polymerisation initiators and the polymerisation process for grafting from the polymerisation initiators is a living polymerisation process. And more preferably, the polymerisation initiators are controlled free radical polymerisation initiators and the polymerisation process for grafting pendant polymer from the polymerisation initiators is a controlled free radical living polymerisation process. Advantageously, the use of living polymerisation provides a person using the method with a greater degree of control over the resulting polymeric coating, as a consequence of the characteristics of living polymerisation. For instance, living polymerisation provides greater control over the polydispersity of the pendant polymers. This, in combination with grafting from initiators on the substrate surface, provides the ability to direct an even, dense coating having a controlled thickness which is sufficient to mask the bulk properties of the underlying substrate. Living polymerisation also enables a person to positively modulate or regulate the architecture of the pendant polymer layer. For example, living polymerisation may be used to create blocks or gradients in the pendant polymer layers, imparting multiple properties or characteristics to a single coating. Consequently, the use of living polymerisation in grafting the pendant polymers from the substrate provides the ability to prepare a highly controlled coating, including a controlled pendant polymer architecture.

Optionally, the method further includes an initial step of determining one or more polymeric surface coating characteristics, for example, a desired density, density gradient (ie, the variation in the density over an area) or coating thickness of the polymeric coating.

In a still further aspect the present invention provides a controllable polymeric surface coating including a macromolecule, which is covalently bound to the surface of a substrate, the macromolecule including a plurality of polymerisation initiators and a plurality of surface binding groups; and pendant polymers grafted from at least some of the polymerisation initiators.

Preferably, the macromolecule includes a predetermined molar ratio of polymerisation initiators of at least 1%.

Preferably, the polymerisation initiators are controlled free radical polymerisation initiators.

Preferably, the pendant polymers are grafted from the polymerisation initiators by controlled free radical living polymerisation.

The controllable polymeric surface may further include additional polymers grafted to the pendant polymers.

The controllable polymeric surface coating may further include at least one biologically active component attached to the pendant polymers. When more than one biologically active component is attached to the pendant polymers, the biologically active components may have a synergistic effect or a complementary effect.

Preferably the pendant polymers possess a controlled-architecture.

Preferably, the pendant polymers modulate a biological response. Most preferably, the pendant polymers modulate cell adhesion.

Preferably, the controllable polymeric surface coating is stable over an extended period of time in the environment of use, including storage. The term "stable" is used in the context of the environment of use of the surface coating and does not necessarily mean that the surface coating is stable indefinitely, as would be appreciated by the skilled person.

In a still further aspect the present invention provides a controllable polymeric surface coating including a macromolecule, which is covalently bound to the surface of a substrate via a plurality of covalent bonds, the macromolecule including a plurality of polymerisation initiators; and pendant polymers grafted from at least some of the polymerisation initiators.

Preferably, the macromolecule includes a predetermined molar ratio of polymerisation initiators of at least 1%.

Preferably, the polymerisation initiators are controlled free radical polymerisation initiators.

Preferably, the pendant polymers are grafted from the polymerisation initiators by controlled free radical living polymerisation.

The controllable polymeric surface may further include additional polymers grafted to the pendant polymers.

The controllable polymeric surface coating may further include at least one biologically active component attached to the pendant polymers. When more than one biologically active component is attached to the pendant polymers, the biologically active components may have a synergistic effect or a complementary effect.

Preferably the pendant polymers possess a controlled-architecture.

Preferably, the pendant polymers modulate a biological response. Most preferably, the pendant polymers modulate cell adhesion.

Preferably, the controllable polymeric surface coating is stable over an extended period of time in the environment of use, including storage. The term "stable" is used in the context of the environment of use of the surface coating and does not necessarily mean that the surface coating is stable indefinitely, as would be appreciated by the skilled person.

In a still further aspect the present invention provides a controllable polymeric surface coating including a macromolecule having a predetermined molar ratio of polymerisation initiators covalently bound thereto, wherein the macromolecule is covalently bound to a surface of a substrate; and pendant polymers covalently attached to the macromolecule via the polymerisation initiators, wherein the pendant polymers form an even, dense and/or thick layer.

Preferably, the macromolecule has a predetermined molar ratio of polymerisation initiators of at least 1%.

Preferably, the polymerisation initiators are controlled free radical polymerisation initiators.

Preferably, the pendant polymers are grafted from the polymerisation initiators by controlled free radical living polymerisation.

The controllable polymeric surface may further include additional polymers grafted to the pendant polymers.

The controllable polymeric surface coating may further include at least one biologically active component attached to the pendant polymers. When more than one biologically active component is attached to the pendant polymers, the biologically active components may have a synergistic effect or a complementary effect.

Preferably the pendant polymers possess a controlled-architecture.

Preferably, the pendant polymers modulate a biological response. Most preferably, the pendant polymers modulate cell adhesion.

Preferably, the controllable polymeric surface coating is stable over an extended period of time in the environment of use, including storage. The term "stable" is used in the context of the environment of use of the surface coating and does not necessarily mean that the surface coating is stable indefinitely, as would be appreciated by the skilled person.

The term "controlled-architecture" refers to the ability to form different types of polymers through control of the polymerisation. As would be known by the skilled person, polymers with controlled architecture may be designed with various types or variations in morphology, (including but not limited to linear, branched, star, combination network); variations in composition (including, but not limited to, block copolymer, random copolymer, homopolymer, graft copolymer, tapered or gradient copolymer), variations in crosslinking density, and/or variations in functionality (including, but not limited to end, site, specific, telechelic, multifunctional and macromonomers).

The term "biological response" as used in the specification and claims refers to the property of the pendant polymers in the controlled polymeric surface to modulate a biological response. Such a response includes, but is not limited to, an antibiotic response, an antimicrobial response, promoting or inhibiting cell attachment, promoting or inhibiting protein adsorption.

Optionally, the controllable polymeric surface coating provides at least one predetermined biological effect.

The term "controlled free radical polymerisation initiator" means any compound which initiates controlled or living free radical polymerisation or which is capable of producing a reactive species which initiates controlled or living free radical polymerisation.

In a still further aspect the present invention provides a controllable polymeric surface coating, including a macromolecule which is able to be covalently bound to the surface of a substrate via a plurality of covalent bonds, the macromolecule including a plurality of polymerisation initiators; and pendant polymers grafted from at least some of the polymerisation initiators.

The term "grafting from" means growing a polymeric chain from a tethered polymerisation initiator. "Grafting from" is to be distinguished from "grafting to", which term encompasses binding of a preformed polymer to functional groups on the surface of the substrate.

In the following discussion the term "polymeric coating" refers to a coating including a layer of macromolecules having polymerisation initiators and pendant polymers grafted therefrom. In contrast, the term "macromolecular coating" refers merely to the layer of macromolecules having polymerisation initiators applied to a substrate and covalently bound to the surface of the substrate, before grafting of the pendant polymers has occurred.

Throughout this specification the terms "living polymerisation" and "controlled polymerisation" are used interchangeably. Living polymerisation and controlled polymerisation are terms of art. A useful reference on this form of polymerisation is Moad, G., Solomon, D. H., *The Chemistry of Radical Polymerisation,* 2nd Ed. (fully revised), Elsevier: Boston, 2006.

As used in the specification and claims, the term "comprises" (or its grammatical variants) is equivalent to the term "includes" and should not be taken as excluding the presence of other elements or features.

DETAILED DESCRIPTION OF THE EMBODIMENTS

The present invention will now be described with reference to particular embodiments and examples. Nothing in the following discussion is intended to limit the scope of the present invention.

The polymeric coating of the present invention may be applied to a broad range of substrates. Examples of suitable substrates include, but are not limited to, inorganic or organic substrates such as glasses, quartz, ceramics, silica minerals, silica gels, metals, metal oxides, wood carbon materials such as graphite or glassy carbon, natural or synthetic organic polymers. Polymer substrates include, but are not limited to, those made by chain or step growth polymerisations. Chain growth polymers include, but are not limited to, those made by free radical, group transfer, cationic or anionic methods. Examples of chain growth polymers are those made from acrylate, methacrylate, vinyl or styrenic type monomers or mixtures thereof. Step growth polymers include, but are not limited to, polymers such as polyesters, polyamides, polycarbonates, epoxy resins, thiol-ene polymers and polyurethanes. These organic polymers may contain significant inorganic components such as silicon in the form of siloxanes. Substrates may be composites or laminates or blends of the above materials.

The substrate to be coated may take any form within wide limits. For example, the substrate may be mouldings of all kinds and sizes, such as biomedical mouldings or industrial mouldings, beads, granules, particles including nano- and microparticles, capsules, tubes, fibers, films or membranes. The substrate may also be a porous material such as a scaffold, woven or non-woven fabric, porous polymeric monolith or crosslinked hydrogel. The surface of the substrate may be flat, non-flat or curved. The polymeric coating is covalently attached to the substrate. Functional groups present on the substrate may be used to react with complementary functional groups on the macromolecule. If the substrate does not possess suitable surface functional groups, the surface of the substrate may be functionalised by methods known in the art for introducing functional groups. Such processes include plasma treatment and plasma polymerisation. The functional groups introduced to the surface by such processes may optionally be modified as required to allow the functional groups on the macromolecule to covalently bond (directly or via another molecule) with the functional groups on the surface of the substrate.

Macromolecular compounds suitable for use in the present invention include covalently bound polymerisation initiators. The macromolecules may also include diluent monomers and functional groups for covalently binding the macromolecule to the surface of the substrate. The polymerisation initiators are covalently bound to the macromolecule before the macromolecule is covalently bound to the surface of the substrate.

Diluent monomers, when present in the macromolecule may be alkyl(meth)acrylates, hydroxyalkyl(meth)acrylates, haloalkyl(meth)acrylates, alkoxyalkyl(meth)acrylates, optionally mono N-substituted or di-N-substituted aminoalkyl(meth)acrylates, cycloalkyl(meth)acrylates, phenoxy (meth)acrylate, alkyleneglycol(meth)acrylate, polyalkyleneglycol(meth)acrylate, (meth)acrylamides, derivatives of (meth)acrylamides, esters of fumaric acid, maleic acid and maleic acid anhydride and esters of maleic acid, N-vinyl carbazole, N-vinylpyrrolidone, vinyl pyridine, benzyl acrylate, benzyl methacrylate and copolymers of two or more thereof. The term (meth)acrylate encompasses both acrylates and methacrylates.

Suitable diluent monomers include acrylic acid, methyl acrylate, ethyl acrylate, propyl acrylate, butyl acrylate, hexyl acrylate, isohexyl acrylate, cyclohexyl acrylate, isobornyl acrylate, ethoxyethyl acrylate, allyl acrylate, acrolein, acrylamide, acryloyl chloride, poly(ethylenegylcol)acrylate, methacrylic acid, methyl methacrylate, ethyl methacrylate, propyl methacrylate, butyl methacrylate, hexyl methacrylate, isohexyl methacrylate, cyclohexyl methacrylate, isobornyl methacrylate, ethoxyethyl methacrylate, methacrylamide, methacryloyl chloride, allyl methacrylate, 1H,1H,2H,2H-perfluorodecyl methacrylate (and other fluorinated alkyl methacrylates), 1H,1H,2H,2H-perfluorodecyl methacrylate, 4,4,5,5,6,6,7,7,8,9,9-dodecafluoro-2-hydroxy-8-(trifluoromethyl)nonyl methacrylate, 3,3,4,4,5,5,6,6,7,8,8,8-dodecafluoro-7-(trifluoromethyl)octyl methacrylate, 3,3,4,4,5,5,6,6,7,7,8,8,9,9,10,10,11,12,12,12-eicosafluoro-11-(trifluoromethyl)dodecyl methacrylate, benzyl methacrylate, 2-butoxyethyl methacrylate, 2-(tert-butylamino)ethyl methacrylate, butyl 3-butoxymethacrylate, 9H-carbazole-9-ethylmethacrylate, 3-chloro-2-hydroxypropyl methacrylate, cyclohexyl methacrylate, decyl methacrylate, 3-(diethoxymethylsilyl)propyl methacrylate, 2-(diethylamino)ethyl methacrylate, 2-(dimethylamino)ethyl methacrylate, 3-(dimethylchlorosilyl)propyl methacrylate, disperse red 1 methacrylate, disperse red 13 methacrylate, disperse yellow 7 methacrylate, ethylene glycol dicyclopentenyl ether methacrylate, ethylene glycol methacrylate phosphate, ethylene glycol methyl ether methacrylate, ethylene glycol monoacetoacetate monomethacrylate, fluorescein-O-methacrylate, glycidyl methacrylate, 3-[(3,5,7,9,11,13,15-heptacyclopentylpentacyclo[9.5.1.1$^{3,9}$.1$^{5,15}$.1$^{7,13}$]octasiloxan-1-yloxy)-dimethylsilyl]propyl methacrylate (dimethylsilyloxy(propyl)methacrylate-POSS), 2-hydroxyethyl methacrylate, hydroxypropyl methacrylate, isobornyl methacrylate, isodecyl methacrylate, lauryl methacrylate, 2-(methacryloyloxy)ethyl acetoacetate, [2-(methacryloyloxy)ethyl]dimethyl-(3-sulfopropyl)ammonium hydroxide, 2-naphthyl methacrylate, 2-(4-nitrophenoxy)ethyl methacrylate, pentabromobenzyl methacrylate, 2,2,3,3,3-pentafluoropropyl methacrylate, 3-sulfopropyl methacrylate potassium salt, 2-(tert-butylamino)-ethyl methacrylate, tetrahydrofurfuryl methacrylate, 2,4,6-tribromophenyl methacrylate, tridecyl methacrylate, 3-(trimethoxysilyl)propyl methacrylate, 3,3,5-trimethylcyclohexyl methacrylate, trimethylsilyl methacrylate, 3-[tris(trimethylsiloxy)silyl]propyl methacrylate, 3-[tris(trimethylsiloxy)silyl]propyl methacrylate, ZONYL®TM fluoromonomer, 2-methylacrylamide Methacrolein, vinyl methyl ketone, 3-methyl-3-buten-2-one, 2-methylacryloyl chloride, poly-ethyleneglycol) behenyl ether methacrylate, polyethyleneglycol) methacrylate, (polyethyleneglycol) methyl ether, maleimides, styrene, styrenics, acrylonitrile, methacrylonitrile, dimethylacrylamide maleic anhydride and copolymers of two or more thereof.

Polymerisation initiators suitable for use with the present invention include, but are not limited to, those which result in free radical, anionic or cationic propagation steps. Further, the polymerisation initiators include, but are not limited to, compounds in which initiation is triggered by photochemical, chemical or thermal stimuli. Preferably, polymerisation initiators are free radical initiators. More preferably, the free radical initiators are controlled or living free radical polymerisation initiators. Controlled free radical polymerisation initiators include Atom Transfer Radical Polymerisation (ATRP) initiators, RAFT agent derived initiators, iniferters, triarylmethane and alkoxyamine (nitroxide mediated) control agents. Iniferters, include thiocarbonyl compounds such as dithioester, trithiocarbonates, thiocarbamates, dithiocarbamates, such as N,N-diethyldithiocarbamate trihydrate, and xanthates. Controlled free radical initiators are advantageously activated under defined conditions. For example, iniferters are photoinitiators which are triggered by irradiation with UV light. ATRP initiators are triggered by copper catalyst systems. Such initiators are known in the art.

The polymerisation initiators may be covalently incorporated into the macromolecule by polymerisation. In this approach, the polymerisation initiators are coupled to a polymerisable group, such as an ethylenically unsaturated group, and the modified—monomer is incorporated by copolymerisation with a diluent monomer into the macromolecule. The polymerisation initiators may be covalently bound via core-active functional groups to the diluent monomers listed above suitable for such a purpose. For example, an iniferter may be attached to a methacrylate or acrylate group. In order to incorporate the initiator comonomer into the macromolecule polymerisation processes known in the art may be used to copolymerise the initiator comonomer with a diluent monomer, and optionally a monomer carrying a functional group for covalently binding to the surface. For example, polymerisation of an iniferter-methacrylate monomer and an acrylate diluent monomer may be thermally initiated using an Azobisisobutyronitrile (AIBN) initiator.

If the polymerisation initiator is incorporated in this manner, preferably the pendant polymerisation initiator is not activated in the macromolecule polymerisation conditions. For instance, if the macromolecule was to be synthesised by thermal initiation, then the selected pendant initiators would be thermally stable. Alternatively, if the polymerisation of the macromolecule was by photoinitiation, the pendant polymerisation initiators would be photoinactive. The defined conditions of activating controlled free radical initiators assist in avoiding activation of the initiators when polymerising the macromolecule. For example, if the polymerisation initiator is copolymerised with methacrylic acid using AIBN under mild conditions, then suitable polymerisation initiators would include ATRP, alkoxyamine and iniferters, in preference to most RAFT agent derived initiators. The resulting polymer would then include living polymerisation initiators distributed along the macromolecule backbone.

Alternatively, macromolecule polymerisation conditions may be chosen such that the pendant polymerisation initiators are activated. Such conditions will result in a macromolecule possessing a branched structure. Such an approach is more suitable with pendant living polymerisation initiators than with traditional initiators. In that instance, even if the pendant initiators react during polymerisation of the macromolecule the ultimate functionality of the macromolecular coating should not be affected because the initiator will largely be reattached to the macromolecule once it is synthesised and thus still be available for subsequent activation.

Using this approach for incorporating the polymerisation initiators into the macromolecule, the molar ratio of the initiators in the macromolecule can be controlled by typical copolymerisation techniques. Preferably, the stoichiometry of the macromolecule is 1 to 50 mol % of pendant groups on the macromolecule chain are substituted by initiator moieties. More preferably, this stoichiometry is 1 to 25 mol % and even more preferably 2 to 15 mol %.

An alternative approach for incorporating covalently bound initiators into the macromolecule is to synthesise a macromolecule having polymerisation initiator binding sites. These would typically be pendant functional groups which would be reactive with complementary functional groups on the polymerisation initiators. By reacting the functional groups on the pre-formed macromolecule with the polymerisation initiators the initiators can be covalently attached to the macromolecule. Using this approach, the molar ratio of the initiator groups in the macromolecule can be controlled by controlling the molar ratio of monomers having functional groups during the polymerisation of the macromolecule.

The macromolecule may also contain functional groups for covalently attaching the macromolecule to the surface of the substrate. These functional groups may be present on the diluent monomer or on an additional monomer which is incorporated into the macromolecule. Suitable functional groups for covalently attaching the macromolecule to the substrate include, but are not limited to, amino, carboxy, hydroxy, phenylazido, sulfo, halogenated, activated carboxylic ester, such as N-hydroxysuccinimide ester, isocyanate, isothiocyanate, glycidyl, alkyne, aldehyde or ketone groups or derivatives thereof or groups that can participate in "click" reactions. Such functional groups may be utilised with an additional coupling agent such as carbodiimide. Alternatively, a catalyst may be used to assist in binding the macromolecule to the substrate.

The macromolecule may be synthesised as a linear, star or branched polymer. It may be a random copolymer or block copolymer, with functional groups for binding the macromolecule and initiators in different blocks.

The macromolecule may be covalently attached to the substrate by a plurality of covalent bonds. The presence of a plurality of covalent bonds between the substrate and the macromolecule increases the stability of the macromolecular coating. The covalent bonds between the macromolecule and the substrate may be formed during a specific reaction expressly for that purpose.

An example of a suitable process for applying the macromolecule to the substrate is the construction of a multi-layer coating using an azide activated poly(ethylene imine) (PEI-A) and poly(acrylic acid-co-diethyl-dithiocarbamic acid 4-vinyl-benzyl ester) copolymer. A layer-by-layer (LBL) coating is constructed in the dark on a solid polymeric substrate material starting with PEI-A, followed by the poly (acrylic acid-co-diethyl-dithiocarbamic acid 4-vinyl-benzyl ester) copolymer. After the construction of a multilayer-coating, the substrate material may be irradiated at a wavelength that induces cross-linking as well as covalent surface immobilisation of the LBL layer due to the photolysis of the azidonitrobenzoic acid residues, but does not activate the iniferter molecules incorporated in the macromolecule.

A further example for the same approach includes the use of an initiator modified macromolecule only in the last coating step of the assembly of the LBL coating.

Alternatively, the macromolecule may be covalently bound to the substrate simultaneously with the formation of the pendant polymers. For example, derivatised macromolecules such as poly(ethylene imine) (PEI) or poly(acrylic acid) (PAAC) that carry a specific molar ratio of controlled free radical polymerisation initiators are also derivatised so that they carry a specific molar ratio of photoreactive groups. Examples for the latter derivatisation are the reaction of poly (ethylene imine) (PEI) with 5-azido-2-nitrobenzoic acid N-hydroxysuccinimide ester which yields an azide activated PEI (PEI-A) or the derivatisation of PAAC with phenylazido aniline. After adsorption of such a macromolecule on a solid substrate in the dark and a subsequent washing step, the macromolecular coated substrate material is transferred into a monomer solution and irradiated at a wavelength that induces covalent surface immobilisation of the macromolecule via the nitrene groups that are generated in this process. In addition, the irradiation leads to controlled free radical polymerisation from the substrate surface.

Binding of the polymerisation initiators to a macromolecule and subsequent attachment to a substrate removes the necessity of a 1:1 ratio of functional groups on the substrate and initiators. Multiple points of attachment to the substrate on a macromolecule can bind numerous initiators to the substrate. This advantage allows for better coverage of the substrate with initiators. Further, because the macromolecule may traverse pores and other surface undulations, a consistent and even coating may be obtained even across a porous substrate.

Once the macromolecular coating is applied in the various manners discussed above, the pendant polymers may be formed by grafting from the polymerisation initiators bound to the macromolecule. The technique of grafting from a tethered initiator, as compared to grafting to functional groups on the surface, allows a denser, thicker polymeric coating to be obtained, as grafting from an initiator does not require the diffusion of pre-formed polymers through a polymer film of increasing density. Accordingly, using grafting from techniques provides an increased degree of control over the resulting polymeric coating.

Preferably the ultimate structure of the polymeric coating will be that of a polymer brush of low polydispersity. Alternatively, multifunctional monomers may be used in the graft polymerisation solution which will result in cross-linking of the pendant polymers.

The average molecular weight of a pendant polymer is preferably 1,000 to 2,000,000. However, the most preferred average molecular weight of a pendant polymer will depend on the ultimate application of the polymerically coated substrate. Average molecular weights from 3,000 to 1,000,000 or from 3,000 to 500,000 will typically be useful.

The average thickness of the polymeric coating will be from 2 nm to 1 μm in the dry state. Again however, the most preferred average thickness of the polymeric coating will depend on the ultimate application of the substrate. Average thicknesses from 3 nm to 500 nm in the dry state or from 5 nm to 100 nm in the dry state will typically be useful.

In applications where living polymerisation initiators are covalently bound to the macromolecule, the polydispersity of the pendant polymer chains, defined by the ratio of molecular weight to molecular number ($M_w/M_n$), is preferably less than 5. More preferably, the polydispersity is less than 3 and most preferably less than 1.5.

The use of living polymerisation to graft the pendant polymers from the macromolecular coating is preferred. The use of living polymerisation in growing the pendant polymers is advantageous as it allows a greater level of control over the molecular weight and polydispersity of the pendant polymers. Living polymerisation also allows control over the end group of the pendant polymer chains. In living polymerisation, the end group is defined by the structure of the initiator (or RAFT agent derived initiator). This control over the end group results in living polymerisation techniques providing control over the specific architecture of the polymeric coating. For example, multi-block coatings, preferably of three or less blocks, may be synthesised by growing additional polymer blocks from the end of the pendant polymer chain. Such a structure allows multifunctional coating architectures to be applied to the substrate. For example, multi-block coatings allow the construction of coatings which include a first block adjacent to the substrate which prevents protein adsorption and cell attachment and a second block which allows the presentation of specific biologically active moieties. Alternatively, gradient copolymers may be synthesised.

A further advantage of controlled free radical polymerisation initiators is that specific molecules may be covalently coupled to them. As the initiator is present at the end of the pendant polymers, the biologically active compound is incorporated at the end of the pendant polymer chain distal from the substrate surface.

The choice of monomers for use in forming the pendant polymers depends on the desired coating characteristics and activity, which is dictated by the ultimate application of the coated substrate.

One application of the present invention is to apply three-dimensional or two dimensional patterning of substrates. For example, three-dimensional patterning of the surface chemistry of opaque materials may be conducted by using an opaque, porous 3D material and covalently anchoring initiator containing macromolecules to the surface of the 3D structure either throughout the structure or only on the surface (by irradiation). Subsequent immersion in a monomer and irradiation only results in the formation of a polymer coating on the outer surface of the 3D device.

Two dimensional or three dimensional patterning of the surface chemistry of a substrate using a photomask is known in the art and may be used in conjunction with polymeric coatings of the present invention. One such application is using photomasks by moving them over a two-dimensional substrate in the x and y direction, respectively, during subsequent free radical grafting reactions using different monomers or co-monomers, a two-dimensional gradient surface may be created.

The method of the present invention may also be used to apply gradient coatings to a substrate. A substrate material which is surface modified with macromolecules having suitable functional groups for covalent anchoring on the substrate surface and pendant initiators for subsequent controlled free radical polymerisation may subsequently undergo copolymerisation of monomers under conditions that allow the grafting of gradient polymer coatings. Such conditions include varying the composition of the monomer bath during polymerisation such that the polymer chain is rich in one composition closer to the substrate material and rich in an alternative composition at the periphery of the coating. Such an application may be used to apply a gradient cross-link density within the surface coating. In such an application at least one of the co-monomers carries a functional group which can be accessed in a subsequent cross-linking reaction resulting in the production of coatings with gradients in the crosslink densities normal to the substrate surface.

Yet a further application of the present invention is in controlling cell attachment via surface immobilised signalling molecules. Polymerisation or copolymerisation of monomers containing a reactive functional group, such as an active ester group or an epoxy group, may be carried out to yield a coating carrying these functional groups. In a subsequent step, peptides, proteins and other biomolecules which carry appropriate functional groups for the formation of a covalent linkage may be reacted with the reactive functional groups present in the coating. Alternatively, the biomolecules may be chemically modified to include a polymerisable group and be incorporated into the pendant polymers during copolymerisation (for example a polymerisable biotin derivative is illustrated in the examples). In this instance, the activity of the biomolecule may be enhanced by the provision of a covalently linked spacer molecule between the polymerisable group and the biomolecule.

The biomolecule is a molecule which produces a desired biological effect. In one embodiment, the biomolecule is a peptide, antibiotic, antimicrobial or a cell signalling molecule.

A further application is the production of polymerisable biotin coatings. Substrate materials are surface modified with macromolecules that have suitable functional groups for covalent anchoring and pendant initiators for subsequent controlled free radical polymerisation. The subsequent polymerisation/copolymerisation of monomers containing a group that is characterised by a high binding constant with another molecule such as biotin yields a coating which carries these groups. In a subsequent step, the matching compound is incubated with the coating to form a stable linkage. An example is the formation of a linkage between a biotinylated coating and streptavidin. The binding of specific molecules to the coating is possible by either immobilisation of these specific molecules on the matching compound (such as streptavidin) or by using a biotinylated specific compound which can bind to the surface bound matching compound (such as streptavidin). The coating may be characterised in vitro by quantification of the surface bound matching compound (such as avidin) or the specific compound. This is achieved by, for example, Europium labelling of the matching compound (such as streptavidin) or Europium labelling of the biotinylated specific compound.

The following examples provide further non-limiting exemplification of the present invention.

Briefly, Example 1 demonstrates the deposition of a functional group onto a substrate to prepare the surface for attachment of a macromolecule. Example 2 is the synthesis of an initiator (an iniferter) having a covalently bound polymerisable group, which is copolymerised with a diluent monomer into a macromolecule in Example 3. Example 4 demonstrates covalently attaching the macromolecules of Example 3 onto the functionalized substrate of Example 1.

Examples 5 to 8 exemplify grafting different homopolymers from the macromolecular coated substrate of Example 4. The resulting coated substrates are then used in Example 9 to demonstration the ability of the coating to provide a controlled biological response, that of reduced cell attachment.

Examples 10 to 14 exemplify grafting different copolymers from the macromolecular coated substrate of Example 4. In particular, these examples demonstrate the controlled architecture which may be achieved using the present invention.

Example 15 demonstrates an alternative coating containing copolymerised biotin, including the synthesis of a polymerisable biotin derivative for use in preparing the coating.

Example 16 exemplifies a method of making a coating according to an embodiment of the present invention using an ATRP initiator which is incorporated into the macromolecule by copolymerisation.

Example 17 demonstrates synthesis of an alternative coating containing copolymerised N-acryloxysuccinimide and the use of such a coating to bind pentapeptides to modulate cell binding properties of the coated substrate.

Example 18 provides a comparison between polymeric coatings synthesised from macromolecular coatings containing different densities of initiator moieties.

Example 19 demonstrates the stability of coatings made in accordance with the present invention.

Example 20 exemplifies an alternative method for binding a macromolecule to a substrate in order to form a macromolecular coating.

Example 21 demonstrates the synthesis of an alternative coating using Reversible Addition-Fragmentation Chain Transfer (RAFT) polymerisation.

Example 22 demonstrates the synthesis of an alternative coating using star polymer initiators.

Example 23 demonstrates the synthesis of an alternative coating useful for conjugating molecules using click chemistry.

Example 24 demonstrates the effect of masking a sample while carrying out graft polymerisation.

Example 25 demonstrates the synthesis of a coating which incorporates cross-links.

Example 26 demonstrates the synthesis of an alternative coating containing copolymerised oligopeptide.

Example 27 demonstrates the uniformity and evenness of coatings made in accordance with the present invention.

Example 28 demonstrates a coating containing copolymerised biotin and the use of such a coating in ELISA experiments.

Example 29 demonstrates the synthesis of a surface gradient graft polymer coating.

EXAMPLES

Example 1

Figure 1A:
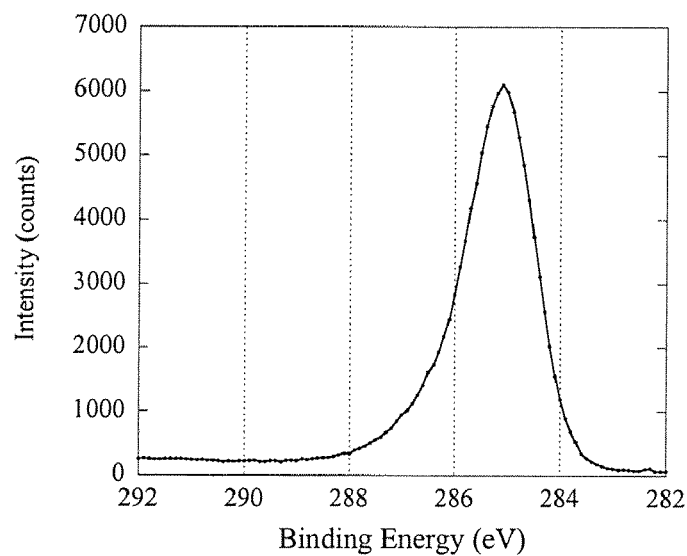
FIG. 1: Representative high resolution (a) C 1s and (b) N 1s XPS spectra obtained from the surface of a Si-HAPP sample.
Figure 1B:
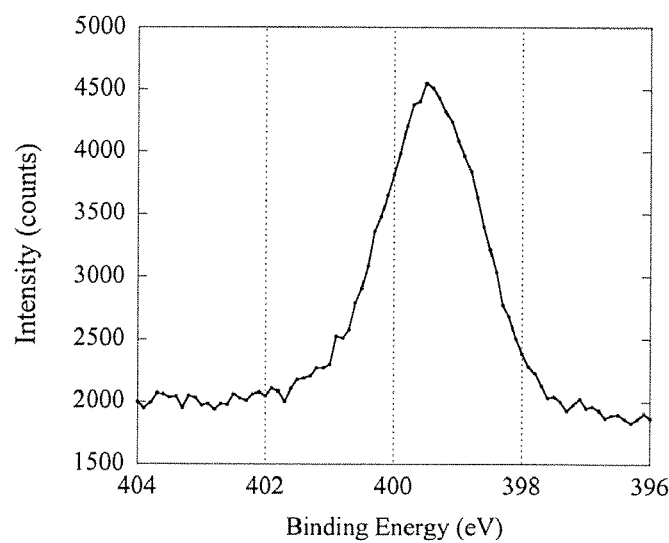

Deposition of an n-Heptylamine Radio Frequency Glow Discharge (RFGD) Thin Film on Silicon Wafer Substrates Silicon wafers (Si) with a size of 1 cm×1 cm were cleaned by sonication in a 2% RBS surfactant solution for 30 min followed by thorough rinsing in Milli-Q™ water and ethanol. After drying with a high velocity, purified $N_2$ stream, the wafers were introduced immediately into a radio frequency glow discharge plasma reactor described elsewhere [Griesser H J., Vacuum 39 (1989) 485]. Deposition of an n-heptylamine plasma polymer (HAPP) thin film was carried out for 30 s at a power of 20 W, a frequency of 200 KHz and an initial monomer pressure of 0.150 Torr. Presented in Table 1 are elemental ratio data before and after HAPP thin film deposition. The elemental ratios were calculated from the surface composition of the two samples obtained using X-ray Photoelectron Spectroscopy (XPS). The first point of interest was that the Si/C ratio was decreased from 12.10 to 0.00 after surface modification, indicating that the HAPP thin film was at least as thick as the XPS sampling depth (approx. 10 nm) and that the coating was pin hole free. Nitrogen was present in the thin film (N/C ratio of 0.086) as well as a small amount of oxygen due to quenching of the radical on removal from the plasma chamber. The O/C ratio was reduced after surface modification due to the small oxygen atomic percentage in the thin film, compared to that present in the native oxide coating on the surface of the Si wafer before modification. The HAPP thin film was largely carbonaceous in nature and the carbon was mostly aliphatic (inferred from the high resolution C 1s spectrum (see FIG. 1(a)), in which the major component was centred on a binding energy of 285 eV). The nitrogen present in the film was due almost entirely to the presence of surface amine groups. This may be inferred from the binding energy of the high resolution N 1s spectrum, i.e. 399.39 eV (see FIG. 1(b)). The presence of amine groups on the surface of the HAPP thin film is useful for subsequent covalent attachment of macromolecules.

TABLE 1

Elemental ratios, calculated from atomic compositions as determined via XPS analysis, before and after surface modification of silicon wafer samples by HAPP thin film deposition.

| Sample | O/C | N/C | Si/C |
|---|---|---|---|
| Si | 2.33 | 0.000 | 12.10 |
| Si-HAPP | 0.040 | 0.086 | 0.000 |

Example 2

Synthesis of Diethyl-Dithiocarbamic Acid 4-Vinyl-Phenyl Ester

A solution of sodium diethyldithiocarbamate trihydrate (3.5 g, $1.55 \times 10^{-2}$ mol) in 20 mL of ethanol was added to a flask equipped with a stirrer, dropping funnel and a reflux condenser. To this solution was added a solution of 4-vinyl-benzyl chloride (3.0 g, $1.96 \times 10^{-2}$ mol) and ethanol (5 mL), dropwise, over a period of 0.5 h at a temperature of 0° C. The resultant solution was stirred at room temperature for 24 h before pouring into a large volume of water and extracting with diethyl ether. The ether phase was washed three times with water, dried over sodium sulphate, before finally removing the diethyl ether by evaporation. The residue was recrystallised three times from methanol, giving a yield of 2.6 grams (83%). $^1$H NMR (CDCl$_3$) δ7.36 (s, 4H, C$_6$H$_4$), 6.70 (dd, J=11.6 and 17.5 Hz, 1H, CH=CH$_2$), 5.73 (d, J=17.5 Hz, 1H, CH=CH$_2$), 5.24 (d, J=11.5 Hz, 1H, CH=CH$_2$), 4.54 (s, 2H, CH$_2$S), 4.04 (q, J=7.3 Hz, 2H, NCH$_2$), 3.73 (q, J=6.6 Hz, 2H NCH$_2$), 1.19 (t, J=ca. 7.0 Hz, 6H CH$_2$CH$_3$).

Example 3

Synthesis of a Polymer Containing Carboxylic Acid Moieties and Iniferter Moieties Acrylic acid (3.0 g, $4.16 \times 10^{-2}$ mol, anhydrous, Fluka) was dissolved in 6 mL of dimethylformamide (DMF) (BDH chemicals), followed by removal of the inhibitor by passage of the solution through a column containing Inhibitor Remover (Aldrich). To the acrylic acid solution was added 1.1 g of diethyl-dithiocarbamic acid 4-vinyl-phenyl ester (4.38× $10^{-3}$ mol) (from Example 2) and 150 mg of AIBN, following which the solution was purged with nitrogen for 10 min and sealed. Heating overnight at 60° C. resulted in the formation of an opaque, viscous gel which was diluted by further addition of 20 mL of DMF. The solution containing the copolymer was then dialysed (Spectrum Spectra/Por 1 molecular porous membrane tubing, MW cutoff 6000-8000) against DMF overnight. The DMF was changed twice during dialysis. The contents of the dialysis tube were then transferred to a flask and made up to a final volume of 50 mL.

The final poly(acrylic acid-co-diethyl-dithiocarbamic acid 4-vinyl-benzyl ester) copolymer (PI) was characterised by quantitative $^{13}$C NMR. ($^{13}$C NMR (DMFH$_7$/DMFD$_7$, 500 MHz; δ 10.7, 11.4, 32.7, 39.78, 40.66, 41.01, 41.44, 46.03, 48.59, 127.41, 128.61, 133.5, 142.6, 169.7 (C=O), 171.55 (C=O), 173.79 (C=O), 175.67 (C=O), 193.66 (C=S)). The relative proportions of diethyl-dithiocarbamic acid 4-vinyl-phenyl ester to acrylic acid residues were obtained by integrating the peaks corresponding to the C=S (from the diethyl-dithiocarbamic acid 4-vinyl-phenyl ester) and C=O (from the acrylic acid) residues. This procedure gave a ratio of 1.0:10.7 for C=S:C=O which corresponded to a polymer containing 8.5:91.5 mol % diethyl-dithiocarbamic acid 4-vinyl-phenyl ester:acrylic acid.

Example 4

Covalent Coupling of Poly(acrylic acid-co-diethyl-dithiocarbamic acid 4-vinyl-benzyl ester) to HAPP Modified Silicon Wafers (Si-HAPP-PI)

Covalent immobilisation of the PI copolymer from Example 3, which was synthesised to have a predetermined molar ratio of around 9:91 mol % diethyl-dithiocarbamic acid 4-vinyl-phenyl ester:acrylic acid, was carried out by incubation of the HAPP coated silicon wafers of Example 1 with solution of the PI copolymer (see below). To a mixture containing 6 mL DMF and 1 mL of Milli-Q™ water was added 2 mL of a DMF solution containing 8.2% (w/v) copolymer (PI). Then 100 mg of N-(3-dimethylaminopropyl)-N-ethylcarbodiimide hydrochloride (Sigma) (EDC) was dissolved in the solution and the freshly HAPP coated silicon wafer was added. Incubation at room temperature overnight was followed by washing thoroughly in DMF and Milli-Q™ water.

Presented in Table 2 are the elemental ratios obtained via XPS analysis of the HAPP modified silicon wafer after covalent immobilisation of the PI copolymer, compared to the HAPP modified silicon wafer. The O/C ratio was significantly higher than that obtained for the HAPP modified silicon wafer. This was due partly to oxidation of the HAPP layer and also to the presence of acrylic acid residues contained within the covalently coupled PI copolymer. Furthermore, the N/C ratio was reduced and sulfur from the PI copolymer layer was detected.

TABLE 2

Elemental ratios obtained via XPS analysis of Si-HAPP and Si-HAPP-PI samples.

| Sample | O/C | N/C | S/C |
|---|---|---|---|
| Si-HAPP | 0.040 | 0.086 | 0.000 |
| Si-HAPP-PI | 0.385 | 0.055 | 0.028 |

Figure 2:
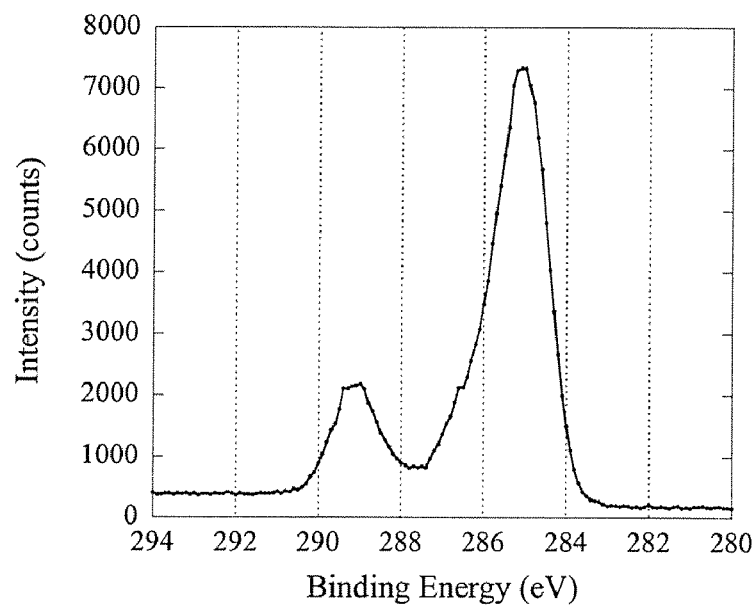
FIG. 2: Representative high resolution C 1s XPS spectrum obtained from the surface of a Si-HAPP-PI sample

A representative high resolution C 1s spectrum obtained from the surface of the Si-HAPP-PI sample is also presented in FIG. 2, which contains features typical of both the underlying HAPP substrate and the covalently immobilised PI copolymer layer, in particular a distinct component of the C 1s spectrum due to the presence of carboxylic acid residues (binding energy of 289.2 eV).

Example 5

Graft Polymerisation of PEGMA (475) Monomer from Si-HAPP-PI Surfaces

Si-HAPP-PI samples of Example 4 were transferred into a custom designed PVDF cell fitted with a quartz glass top. The chamber was filled with a 10% (v/v) solution of poly(ethylene glycol) methacrylate with a molecular weight of 475 (PEGMA (475)) in Milli-Q™ water, from which the inhibitor had been removed, and purified nitrogen was flowed through the cell to remove oxygen from the monomer solution. The cell was then placed underneath an Electro-lite EL-C800 UV/Visible light source at a distance of 10 cm. UV polymerisation was carried out for 30 min. (30 mWcm$^{-2}$ intensity; predominantly 365 nm wavelength). After irradiation, the samples were removed from the cell and washed thoroughly in Milli-Q™ water. Presented in Table 3 are the elemental ratios obtained via XPS analysis of the Si-HAPP-PI sample before and after the grafting of P(PEGMA (475)) from the surface. Here the O/C ratio after grafting was significantly increased due to the large amount of 0 in the P(PEGMA (475)) composition (theoretical O/C=0.667). The N/C ratio was also decreased due to the presence of the P(PEGMA (475)) layer on top of the Si-HAPP-PI substrate.

TABLE 3

Elemental ratios, determined via XPS analysis of Si-HAPP-PI and Si-HAPP-PI-P(PEGMA (475)) samples.

| Sample | O/C | N/C | S/C |
| --- | --- | --- | --- |
| Si-HAPP-PI | 0.385 | 0.055 | 0.028 |
| Si-HAPP-PI-P(PEGMA (475)) | 0.476 | 0.001 | 0.000 |

Figure 3:
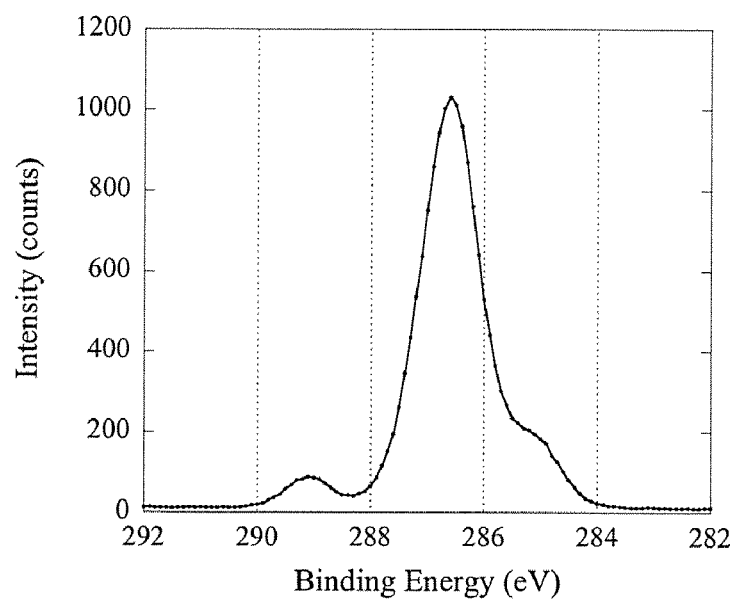
FIG. 3: Representative C 1s high resolution XPS spectrum obtained from the surface of a Si-HAPP-PI-P(PEGMA (475)) sample.
Figure 4:
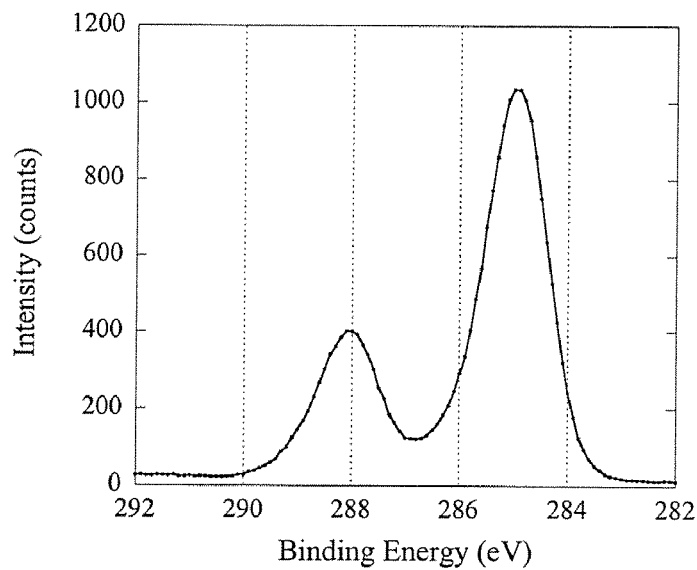
FIG. 4: Representative high resolution C1s XPS spectrum obtained from a Si-HAPP-PI-P(ACRYLAMIDE) surface.

The presence of the P(PEGMA (475)) coating, the thickness of which in this case was very similar to the XPS sampling depth, was confirmed by the large contribution of ether (C-0) carbon in the high resolution C 1s spectrum (see FIG. 3 at a binding energy of 286.6 eV).

Example 6

Graft Polymerisation of Acrylamide Monomer from Si-HAPP-PI Surfaces

Si-HAPP-PI samples of Example 4 were transferred into a custom designed PVDF cell fitted with a quartz glass top. The chamber was filled with a 5% (v/v) solution of Acrylamide in Milli-Q™ water. The cell was then placed underneath a Spectroline SB-100C/F UV/Visible light source at a distance of 10 cm. UV polymerisation was carried out for 20 min. (approx. 280 mW/cm$^{-2}$ intensity). After this time the samples were removed from the cell and washed thoroughly in Milli-Q™ water.

TABLE 4

Elemental ratios obtained via XPS analysis of Si-HAPP-PI samples before and after surface modification by P(ACRYLAMIDE) grafting.

| Sample | O/C | N/C | S/C |
| --- | --- | --- | --- |
| Si-HAPP-PI | 0.385 | 0.055 | 0.028 |
| Si-HAPP-PI-P(ACRYLAMIDE) | 0.317 | 0.277 | 0.001 |

Example 7

Graft Polymerisation of Glucoside MA Monomer from Si-HAPP-PI Surfaces

Si-HAPP-PI samples of Example 4 were transferred into a custom designed PVDF cell fitted with a quartz glass top. The chamber was filled with a 10% (v/v) solution of 2-Methacryloxyethyl glucoside (Glucoside MA, Polysciences) in Milli-Q™ water from which the inhibitor had been removed. The cell was then placed underneath a Spectroline SB-100C/F UV/Visible light source at a distance of 10 cm. UV polymerisation was carried out for 20 min. (approx. 280 mWcm$^{-2}$ intensity). After this time the samples were removed from the cell and washed thoroughly in Milli-Q™ water.

TABLE 5

Elemental ratios, obtained via XPS, of a Si-HAPP-PI sample before and after surface modification by P(Glucoside MA) grafting.

| Sample | O/C | N/C | S/C |
| --- | --- | --- | --- |
| Si-HAPP-PI | 0.385 | 0.055 | 0.028 |
| Si-HAPP-PI-P(GLUCOSIDE MA) | 0.603 | 0.004 | 0.001 |

Figure 5:
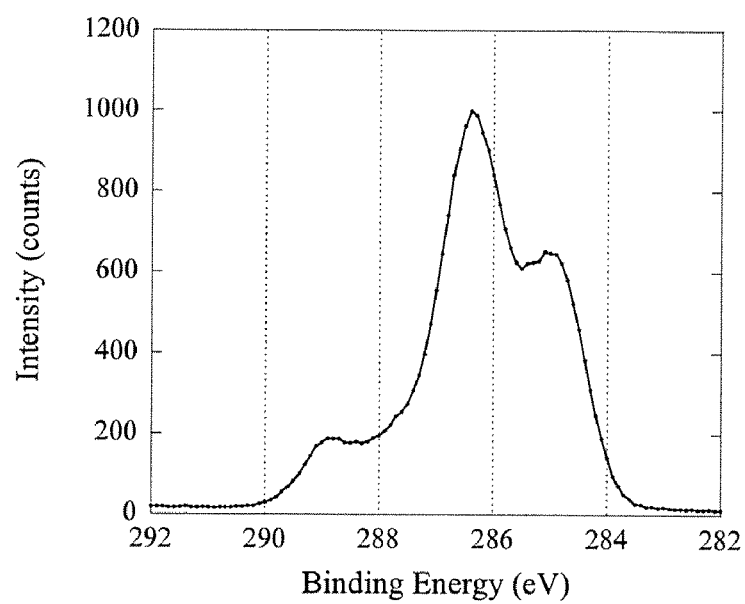
FIG. 5: Representative high resolution C 1s XPS spectrum obtained from the surface of a Si-HAPP-PI-P(GLUCOSIDE MA) sample.

Presented in Table 5 are the elemental ratios obtained from the surfaces of a Si-HAPP-PI sample before and after surface modification via P(Glucoside MA) grafting. The impact of the grafting reaction on the elemental ratios of the surface is clear in that the O/C ratio was increased dramatically (due to the large number of hydroxyl groups on each glucose residue in the coating) and the N/C ratio was reduced due to the presence of the P(Glucoside MA) coating on top of the Si-HAPP-PI substrate. Success of the coating procedure was confirmed by obtaining high resolution C 1s spectra, a representative example of which is presented in FIG. 5. The spectrum contains a distinctive component due to carbon bonded to hydroxyl groups at a binding energy of 286.7 eV.

Example 8

Graft Polymerisation of QUAT AMINE MA Monomer from Si-HAPP-PI Surfaces

Si-HAPP-PI samples of Example 4 were placed in a custom designed PVDF cell fitted with a quartz glass top. The chamber was filled with a 10% (w/v) solution of [3-(methacryloylamino) propyl]-trimethylammonium chloride (QUAT AMINE MA, Aldrich) in Milli-Q™ water, from which the inhibitor had been removed. After purging with nitrogen gas for 10 min to remove dissolved oxygen from the monomer solution, the cell was placed underneath a Spectroline SB-100C/F UV/Visible light source at a distance of 10 cm. UV polymerisation was carried out for 20 min. (approx. 280 mWcm$^{-2}$ intensity). After this time, the samples were removed from the cell and washed thoroughly in Milli-Q™ water.

Presented in Table 6 are the elemental ratios obtained from the surfaces of a Si-HAPP-PI sample before and after surface modification via P(QUAT AMINE MA) grafting. The impact of the grafting reaction on the elemental ratios of the surface is clear in that the O/C ratio was reduced dramatically and the N/C ratio was increased due to the presence of the nitrogen within the P(QUAT AMINE MA) coating on top of the Si-HAPP-PI substrate.

TABLE 6

Elemental ratios, obtained via XPS, of a Si-HAPP-PI sample before and after surface modification by P(QUAT AMINE MA) graft polymerisation.

| Sample | O/C | N/C | S/C |
|---|---|---|---|
| Si-HAPP-PI | 0.385 | 0.055 | 0.028 |
| Si-HAPP-PI-P(QUAT AMINE MA) | 0.203 | 0.139 | 0.004 |

Figure 6:
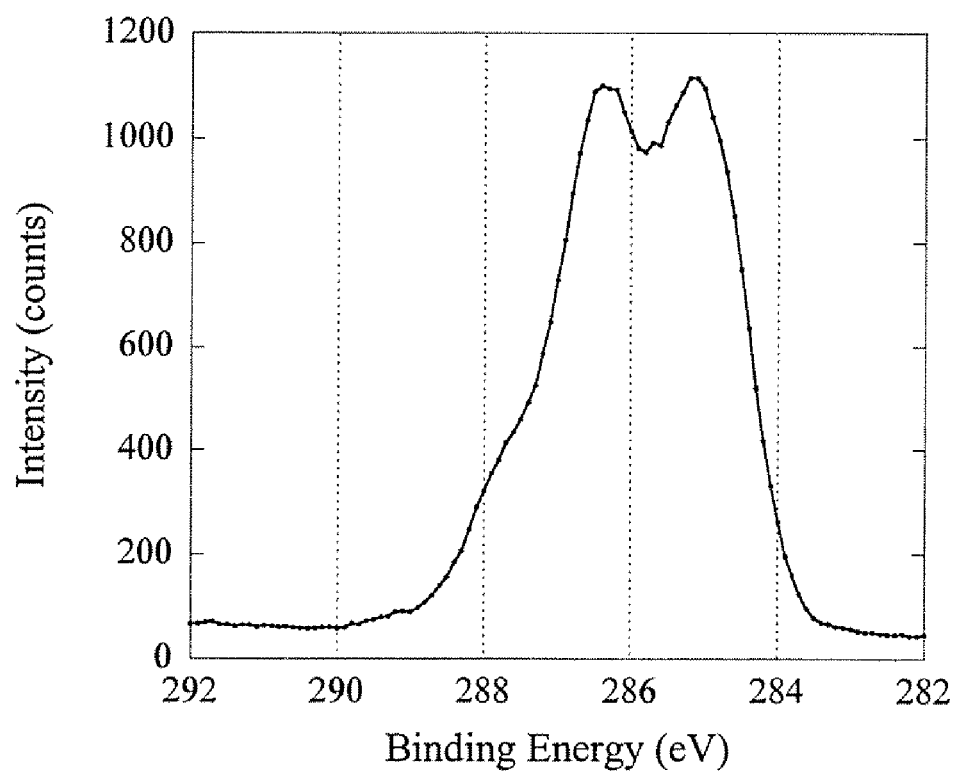
FIG. 6: Representative high resolution C 1s XPS spectrum obtained from the surface of a Si-HAPP-PI-P(QUAT AMINE MA) sample.

Success of the coating procedure was confirmed by obtaining high resolution C 1s spectra, a representative example of which is presented in FIG. 6. The spectrum contains a distinctive component due to C—N bonds within the grafted layer at a binding energy of 286.6 eV as well as a high binding energy component in the N 1s spectrum (data not shown) which is distinctive for quaternarised amines.

Example 9

Cell Culture Experiment

HeLa cells were seeded onto a series of Si wafers with a size of 1 cm×1 cm. Three replicates were used per surface modification. Prior to cell attachment experiments, samples were soaked in 2× pen/strep (100/200 ug/mL) overnight at 4° C. in individual wells of a 24-well tissue culture tray. HeLa cells were then seeded at a density of $2 \times 10^5$ cells per well and cultured for 24 hours. The three replicates were metabolically labelled with MTT for the final four hours of culture. Cell attachment results are expressed relative to the standard cell culture substrate Tissue Culture Polystyrene (TCPS).

Figure 7A:
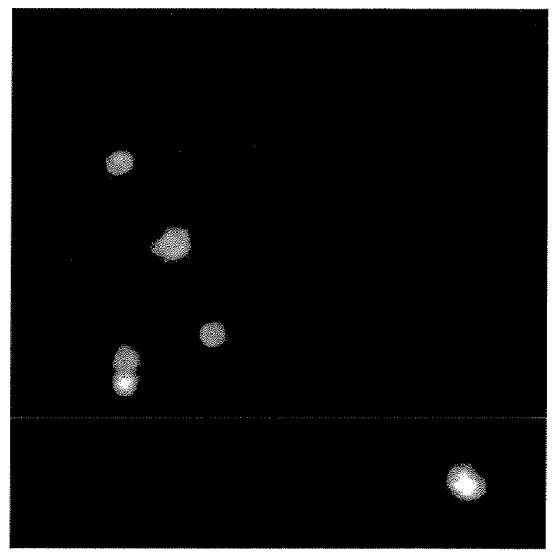
FIG. 7: Representative fields showing HeLa cell attachment to (a) Si-HAPP-PI-P(GLUCOSIDE MA) and (b) the TCPS control surfaces after 24 hours in culture.
Figure 7B:
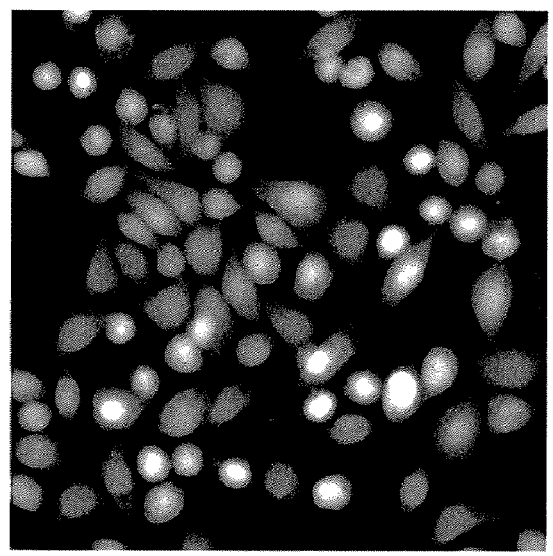

The desired controlled biological response of a significant reduction in cell attachment compared to TCPS control surfaces was achieved for all graft polymers as shown in Table 7. Not only were cell numbers reduced on the graft polymers, but those cells that had remained attached were unable to effectively spread, as indicated by their rounded morphology (FIG. 7). Furthermore, it should be noted that Si, Si-HAPP, and Si-HAPP-PI control surfaces all showed high cell attachment (between 75.2% and 86.5%) relative to TCPS.

TABLE 7

HeLa cell attachment results relative to TCPS in % after 24 h.

| Surface | % Attachment | SD |
|---|---|---|
| TCPS | 100.0 | 4.6 |
| Si | 83.4 | 6.2 |
| Si-HAPP (Example 1) | 75.2 | 12.5 |
| Si-HAPP-PI (Example 4) | 86.5 | 2.4 |
| Si-HAPP-PI-P(PEGMA (475)) (Example 5) | 22.7 | 4.5 |
| Si-HAPP-PI-P(AAM) (Example 6) | 16.6 | 5.6 |
| Si-HAPP-PI-P(GLUCOSIDE MA) (Example 7) | 18.4 | 3.1 |

Example 10

Preparation of Si-HAPP-PI-P(PEGMA (475)-co-WARFARIN MA) Copolymer Coatings

Part A: Synthesis of a Polymerisable Warfarin Derivative (Succinic acid 2-[2-(2-{2-[2-(2-methyl-acryloyloxy)-ethoxy]-ethoxy}-ethoxy)-ethoxy]-ethyl ester 2-oxo-3-(3-oxo-1-phenyl-butyl)-2H-chromen-4-yl ester) (WARFARIN MA)

Warfarin (3.93 g, 12.8 mmol) was suspended in dichloromethane (50 mL) at room temperature. Addition of triethylamine (1.9 mL, 1.4 g, 13.9 mmol) resulted in dissolution of the warfarin. The acid chloride of poly(ethylene glycol (360)) methacrylate succinate (5.43 g, 11.6 mmol) in dichloromethane (ca. 10-15 mL) was added drop-wise at room temperature to the Warfarin solution, which was stirred for about 1 hour. The reaction mixture was washed with water (to remove un-reacted Warfarin), dilute hydrochloric acid and brine before drying (magnesium sulphate).

Removal of the solvent via evaporation gave a pale oil product (9.1 g). This appeared to have a trace of un-reacted Warfarin and dichloromethane. The oil was dissolved in ether and a minimum of dichloromethane and washed twice with 1 M sodium hydroxide, twice with dilute hydrochloric acid and once with brine, before drying and removal of the solvent via evaporation to give clear oil. $^1$H MNR(CDCl$_3$, 200 MHz) δ 1.93 (s, methacrylate methyl, 3Hs), 2.14 (s. methyl, 3Hs), 2.82 (mult, 2Hs), 3.06 (mult, 2Hs), 3.44 (d, J=7.3 Hz, Warfarin CH$_2$, 2Hs), 3.62 (s, PEG CH$_2$s), 3.72 (br. s, PEG CH$_2$, 2Hs), 4.26 (apparent t. J ca. 5 Hz, PEG CH$_2$, 2Hs), 4.80 (br s, 1H), 5.54 (br, s, =CH, 1H), 6.10 (br, s, =CH, 1H), 7.16-7.40 (multi, aromatic), 7.43-7.53 (multi. aromatic) ppm.

Part B: Graft Polymerisation of Mixtures of PEGMA (475) and WARFARIN MA from Si-HAPP-PI Surfaces Si-HAPP-PI samples were transferred into a custom designed PVDF cell fitted with a quartz glass top. The chamber was filled with a solution containing 1.06 g ($2.23 \times 10^{-3}$ mol) PEGMA (475), 0.41 g ($5.66 \times 10^4$ mol) of WARFARIN MA in 20 mL of DMF (the molar ratio of PEGMA (475) to WARFARIN MA was 8:2). After nitrogen purging for 15 min, the cell was placed underneath an Electro-lite EL-C800 UV/Visible light source at a distance of 10 cm. Polymerisation was carried out for 30 min using UV irradiation (30 mWcm$^{-2}$; predominantly 365 nm). The samples were then removed from the cell and washed thoroughly in Milli-Q™ water.

TABLE 8

Elemental ratios obtained via XPS analysis of Si-HAPP-PI, Si-HAPP-PI-P(PEGMA (475)) and Si-HAPP-PI-P(PEGMA (475)-co-WARFARIN MA) samples.

| Sample | O/C | N/C | S/C |
|---|---|---|---|
| Si-HAPP-PI | 0.385 | 0.055 | 0.028 |
| Si-HAPP-PI-P(PEGMA (475)) | 0.476 | 0.001 | 0.000 |
| Si-HAPP-PI-P(PEGMA (475)-co-WARFARIN MA) | 0.436 | 0.004 | 0.000 |

Presented in Table 8 are the elemental ratios obtained from XPS analysis of the Si-HAPP-PI samples before and after grafting a coating of P(PEGMA (475)-co-WARFARIN MA) from the surface. Also included for comparison are the data obtained from grafted P(PEGMA (475)) homopolymer coatings. The O/C ratio obtained was intermediate to that obtained for the Si-HAPP-PI and Si-HAPP-PI-P(PEGMA (475)-co-WARFARIN MA) samples as might be expected for a grafted copolymer layer containing both PEGMA (475) (theoretical O/C=0.477) and WARFARIN MA (theoretical O/C=0.359). Based on the N/C ratios, the dehydrated thickness of the P(PEGMA (475)-co-WARFARIN MA) layer appeared to be slightly lower than the P(PEGMA (475)) layer.

Figure 8:
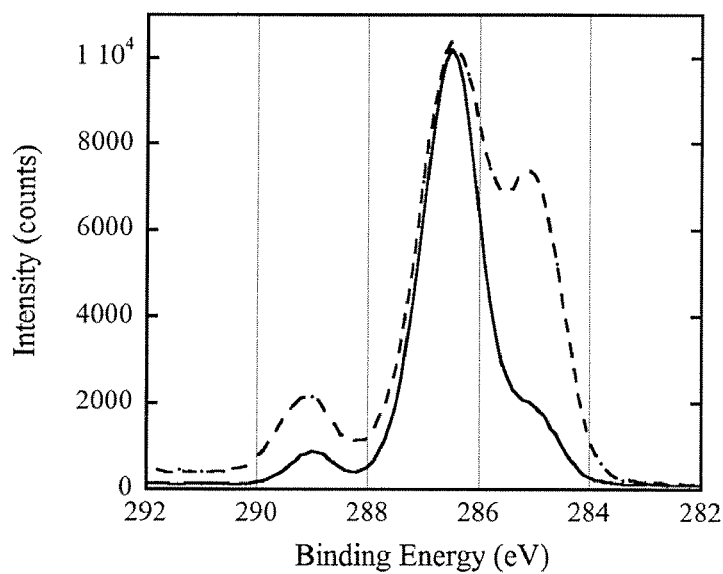
FIG. 8: Representative high resolution C1s XPS spectra obtained from the surfaces of (—) Si-HAPP-PI-P(PEGMA (475)) and ( - - - ) Si-HAPP-PI-P(PEGMA (475)-co-WARFARIN MA) samples.

Presented in FIG. 8 are the high resolution C 1s XPS spectra obtained from the surfaces of Si-HAPP-PI-P(PEGMA (475)) and Si-HAPP-PI-P(PEGMA (475)-co-WARFARIN MA) samples. As with the O/C ratios, the profile of the C 1s spectrum obtained from the Si-HAPP-PI-P(PEGMA (475)-co-WARFARIN MA) sample should be intermediate between the profiles obtained from Si-HAPP-PI-P(PEGMA (475)) and Si-HAPP-PI samples (see Example 4). The features that distinguish the spectra presented in FIG. 7 were an increase in the relative intensity of the aliphatic hydrocarbon and ester contributions to the spectrum obtained from the Si-HAPP-PI-P(PEGMA (475)-co-WARFARIN MA) sample. More detailed analysis of the various contributions to the spectrum indicated that the molar ratio of PEGMA (475) to WARFARIN MA were similar to that present in the monomer feed.

Example 11

Preparation of Si-HAPP-PI-P(PEGMA (475)-b-ACRYLAMIDE) Di-Block Copolymer Coatings Si-HAPP-PI samples were transferred into a custom designed PVDF cell fitted with a quartz glass top. The chamber was filled with a 10% (v/v) solution of PEGMA (475) in Milli-Q™ water from which the inhibitor had been removed. After nitrogen purging for 10 min, the cell was placed underneath an Electro-lite EL-C800 UV/Visible light source at a distance of 10 cm. UV polymerisation was carried out for 30 min. (approx. 30 mWcm$^{-2}$ intensity). After this time the samples were removed from the cell and washed thoroughly in Milli-Q™ water. For the second stage polymerisation, Si-HAPP-PI-P(PEGMA (475)) samples were placed in a clean chamber again and filled with a 5% (w/v) solution of acrylamide in Milli-Q™ water. After nitrogen purging for 10 min, the cell was again placed underneath an Electro-lite EL-C800 UV/Visible light source at a distance of 10 cm. UV polymerisation was carried out for 30 min. (approx. 30 mWcm$^{-2}$ intensity). Finally the samples were removed from the cell and washed thoroughly in Milli-Q™ water.

TABLE 9

Elemental ratios, determined via XPS analysis of Si-HAPP-PI, Si-HAPP-PI-P(PEGMA (475)) and Si-HAPP-PI-P(PEGMA (475))-b-P(ACRYLAMIDE) samples.

| Sample | O/C | N/C | S/C |
| --- | --- | --- | --- |
| Si-HAPP-PI | 0.385 | 0.055 | 0.028 |
| Si-HAPP-PI-P(PEGMA (475)) | 0.476 | 0.001 | 0.000 |
| Si-HAPP-PI-P(PEGMA (475))-b-P(ACRYLAMIDE) | 0.395 | 0.168 | 0.000 |

Figure 9:
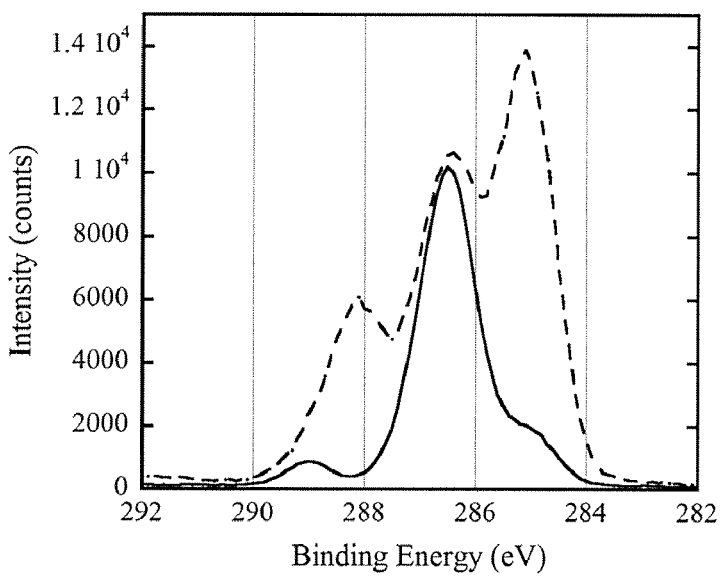
FIG. 9: Representative high resolution C1s XPS spectrum obtained from the surface of (—) Si-HAPP-PI-P(PEGMA (475)) and ( - - - ) Si-HAPP-PI-P(PEGMA (475))-b-P(ACRYLAMIDE) samples.

Presented in Table 9 are the elemental ratios, calculated from the surface composition of the samples as determined by XPS analysis. Here we may see that the two stage coating procedure resulted in a preliminary P(PEGMA (475)) coating (increased O/C, reduced N/C), followed by a second successful P(ACRYLAMIDE) coating (decreased O/C and increased N/C). The ability to produce a second polymer layer on top of the first demonstrates the living nature of the polymerisation in this case (i.e. the initiators are present at the end of the P(PEGMA (475)) chains in the first stage of the coating procedure and are available to initiate polymerisation of the P(ACRYLAMIDE) chains in the second stage. A representative high resolution C 1s XPS spectrum is presented in FIG. 9, compared to a pure P(PEGMA) homopolymer coating. Here we may see that the spectrum obtained from the Si-HAPP-PI-P(PEGMA (475)-b-AAm) coating was reasonably representative of a P(ACRYLAMIDE) coating, however, a feature (ether carbon) from the P(PEGMA (475)) coating underneath was still apparent, indicating that the XPS was sampling the P(PEGMA (475)) coating underneath the P(ACRYLAMIDE) layer.

Example 12

Preparation of Si-HAPP-PI-P(ACRYLAMIDE-b-PEGMA (475)) Di-Block Polymer Coatings

Si-HAPP-PI samples were transferred into a custom designed PVDF cell fitted with a quartz glass top. The chamber was filled with a 5% (v/v) solution of acrylamide in Milli-Q™ water. After nitrogen purging for 10 min., the cell was placed underneath a Spectroline SB-100C/F UV/Visible light source at a distance of 10 cm. UV polymerisation was carried out for 20 min. (approx. 280 mWcm$^{-2}$ intensity). After this time the samples were removed from the cell and washed thoroughly in Milli-Q™ water. For the second stage polymerisation, Si-HAPP-PI-P(ACRYLAMIDE) samples were placed in a clean chamber which was filled with a 10% (w/v) solution of PEGMA (475) in Milli-Q™ water from which the inhibitor had been removed. After nitrogen purging for 10 min, the cell was placed underneath a Spectroline SB-100C/F UV/Visible light source at a distance of 10 cm. UV polymerisation was carried out for 20 min. (approx. 280 mWcm$^{-2}$ intensity). After this time the samples were removed from the cell and washed thoroughly in Milli-Q™ water.

TABLE 10

Elemental ratios, determined by XPS analysis of Si-HAPP-PI, Si-HAPP-PI-P(ACRYLAMIDE) and Si-HAPP-PI-P(ACRYLAMIDE-b-PEGMA (475)) samples.

| Sample | O/C | N/C | S/C |
| --- | --- | --- | --- |
| Si-HAPP-PI | 0.385 | 0.055 | 0.028 |
| Si-HAPP-PI-P(ACRYLAMIDE) | 0.317 | 0.277 | 0.001 |
| Si-HAPR-PI-P(ACRYLAMIDE-b-PEGMA (475)) | 0.452 | 0.090 | 0.001 |

Figure 10:
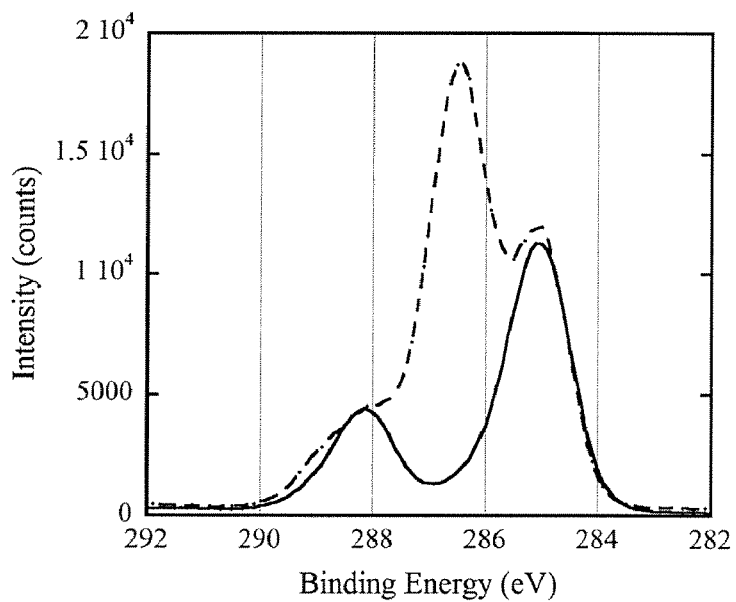
FIG. 10: Representative high resolution, C 1s XPS spectrum obtained from the surface of (—) Si-HAPP-PI-P(ACRYLAMIDE) and ( - - - ) Si-HAPP-PI-P(ACRYLAMIDE-b-PEGMA (475)) coated samples.

In a manner analogous to that presented in Example 11 above, presented in Table 10 are the elemental ratios, determined via XPS analysis of the two stage coating procedure leading to the preparation of Si-HAPP-PI-P(ACRYLAMIDE-b-PEGMA (475)) di-block polymer coatings. In this case, the order of the coating procedure is the reverse of that presented in Example 11. Surface initiated polymerisation in an acrylamide monomer solution resulted in an initial P(ACRYLAMIDE) coating (reduced O/C and increased N/C). The second stage coating with P(PEGMA (475)) resulted in increased O/C and reduced N/C values. The ability to produce a second polymer layer on top of the first demonstrates the living nature of the polymerisation in this case (i.e. the initiators were present at the end of the P(ACRYLAMIDE) chains in the first stage of the coating procedure and were available to initiate polymerisation of the P(PEGMA (475)) chains in the second stage. A representative high resolution C 1s XPS spectrum obtained from the Si-HAPP-PI-P (ACRYLAMIDE-b-PEGMA (475)) coating is presented in FIG. 10 and compared to that of a P(ACRYLAMIDE) coating. Here we may see that the spectrum was reasonably representative of a P(PEGMA (475)) coating, however, features from the P(ACRYLAMIDE) coating underneath was still apparent (higher lower binding energy aliphatic and amide carbon components), indicating that the XPS was sampling the P(ACRYLAMIDE) coating underneath the P(PEGMA) layer.

Example 13

Preparation of
Si-HAPP-PI-P(ACRYLAMIDE-b-QUAT AMINE
MA) Di-Block Polymer Coatings Si-HAPP-PI samples were transferred into a custom designed PVDF cell fitted with a quartz glass top. The chamber was filled with a 5% (v/v) solution of acrylamide in Milli-Q™ water. After nitrogen purging for 10 min., the cell was placed underneath a Spectroline SB-100C/F UV/Visible light source at a distance of 10 cm. UV polymerisation was carried out for 20 min. (approx. 280 mWcm$^{-2}$ intensity). After this time the samples were removed from the cell and washed thoroughly in Milli-Q™ water. For the second stage polymerisation, Si-HAPP-PI-P(ACRYLAMIDE) samples were placed in a clean chamber again and filled with a 10% (w/v) solution of [3-(Methacryloylamino)propyl]-trimethylammonium chloride (QUAT AMINE MA, Aldrich) in Milli-Q™ water. After nitrogen purging for 10 min., the cell was again placed underneath a Spectroline SB-100C/F UV/Visible light source at a distance of 10 cm. UV polymerisation was again carried out for 20 min. (approx. 280 mWcm$^{-2}$ intensity). After this time the samples were removed from the cell and washed thoroughly in Milli-Q™ water.

TABLE 11

Elemental ratios, determined via XPS analysis of Si-HAPP-PI, Si-HAPP-PI-P(ACRYLAMIDE) and Si-HAPP-PI-P(ACRYLAMIDE-b-QUAT AMINE MA) samples.

| Sample | O/C | N/C | S/C |
|---|---|---|---|
| Si-HAPP-PI | 0.385 | 0.055 | 0.028 |
| Si-HAPP-PI-P(ACRYLAMIDE) | 0.296 | 0.214 | 0.001 |
| Si-HAPP-PI-P(ACRYLAMIDE-b-QUAT AMINE MA) | 0.181 | 0.158 | 0.004 |

Figure 11:
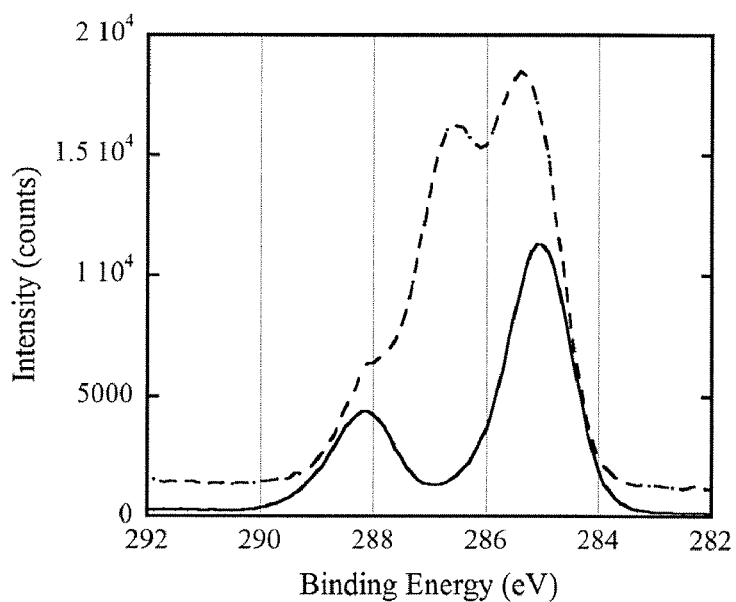
FIG. 11: Representative high resolution C1s XPS spectrum obtained from the surface of (—) Si-HAPP-PI-P(ACRYLAMIDE) and (- - -) Si-HAPP-PI-P(ACRYLAMIDE-b-QUATAMINE MA) samples.

Consideration of the data presented in Table 11 suggests that the successful grafting of P(ACRYLAMIDE) was achieved with a dehydrated layer thickness on the order of 10 nm in the first step, indicated by an increase in the N/C from 0.055 to 0.228, as well as a reduction the O/C value after grafting. The second stage polymer grafting of a layer of poly(QUAT AMINE MA) was also successful, based on the decreased O/C and N/C ratios. However, the elemental ratios suggest that the P(QUAT AMINE MA) dehydrated layer thickness was less than 10 nm. The C 1s high resolution spectrum of a Si-HAPP-PI-P(ACRYLAMIDE-b-QUAT AMINE MA) surface as presented in FIG. 11 supports the conclusions based on the elemental ratios obtained for the various stages of surface coating as components of both P(ACRYLAMIDE) and P(QUAT AMINE MA) layers were present (amide and C—N carbon). Further evidence is provided by the high resolution XPS N 1s spectrum (not shown) which contains both amide (from the P(ACRYLAMIDE) layer) and quaternarised amine (from the P(QUAT AMINE MA) layer) components.

Example 14

Preparation of Si-HAPP-PI-P(PEGMA (475)-b-
(ACRYLAMIDE-co-PEGMA (475))) Di-Block,
Copolymer Coatings Si-HAPP-PI samples were transferred into a custom designed PVDF cell fitted with a quartz glass top. The chamber was filled with a 10% (v/v) solution of PEGMA (475) in Milli-Q™ water from which the inhibitor had been removed. After nitrogen purging for 10 min., the cell was placed underneath an Electro-lite EL-C800 UV/Visible light source at a distance of 10 cm. UV polymerisation was carried out for 30 min. (approx. 30 mWcm$^{-2}$ intensity; predominantly 365 nm wavelength). After this time the samples were removed from the cell and washed thoroughly in Milli-Q™ water. For the second stage polymerisation, Si-HAPP-PI-P(PEGMA (475)) samples were placed in a clean chamber and filled with a 5% (w/v) solution of acrylamide and PEGMA (475), in an 8:2 molar ratio, in Milli-Q™ water. After nitrogen purging for 10 min., the cell was again placed underneath an Electro-lite EL-C800 UV/Visible light source at a distance of 10 cm. UV polymerisation was again carried out for 30 min. (approx. 30 mWcm$^{-2}$ intensity; predominantly 365 nm wavelength). After this time the samples were removed from the cell and washed thoroughly in Milli-Q™ water.

TABLE 12

Elemental ratios, determined via XPS analysis of Si-HAPP-PI, Si-HAPP-PI-P(PEGMA (475)) and Si-HAPP-PI-P(PEGMA (475)-b-(ACRYLAMIDE-co-PEGMA (475))) samples.

| Sample | O/C | N/C | S/C |
|---|---|---|---|
| Si-HAPP-PI | 0.341 | 0.079 | 0.011 |
| Si-HAPP-PI-P(PEGMA (475)) | 0.515 | 0.000 | 0.000 |
| Si-HAPP-PI-P(PEGMA (475)-b-(ACRYLAMIDE-co-PEGMA (475))) | 0.410 | 0.039 | 0.000 |

Figure 12:
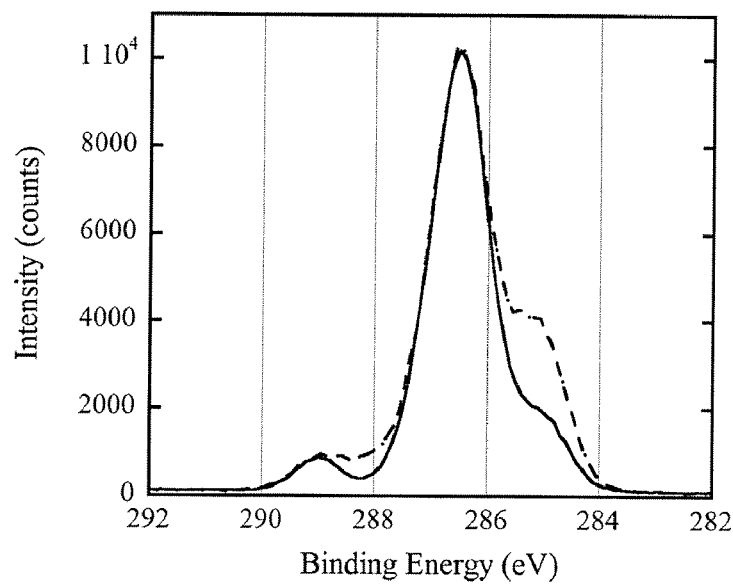
FIG. 12: Representative high resolution C 1s XPS spectrum obtained from the surface of (—) Si-HAPP-PI-P(PEGMA (475)) and (- - -) Si-HAPP-PI-P(PEGMA (475))-b-(P(ACRYLAMIDE)-co-P(PEGMA (475))) samples.

Presented in Table 12 are the atomic ratios obtained via XPS analysis of the samples from the two stages of the graft polymerisation surface modification. For the first stage, i.e. preparation of Si-HAPP-PI-P(PEGMA (475)) homopolymer coatings, the O/C and N/C ratios obtained suggest that a P(PEGMA (475)) coating was obtained with a dehydrated thickness on the order of the XPS sampling depth. The second stage was a copolymerization of acrylamide and PEGMA (475) in the mole ratio of 80:20. The increase in the N/C and decrease in the O/C ratios obtained suggest successful polymerisation of a second block on top of the initial P(PEGMA) layer and that this layer has acrylamide incorporated into it. It is not possible to assess the thickness of the second block due to the presence of PEGMA in both layers. The conclusions based on the elemental ratios data were confirmed by comparison of high resolution C 1s spectra from the two samples (see FIG. 12). The spectrum obtained from the second stage clearly contains features that one would expect from PEGMA (strong ether contribution) and acrylamide (increased aliphatic hydrocarbon and amide contributions).

Example 15

Preparation of Si-ALAPP-PI-P(ACRYLAMIDE-co-Biotin MA) Copolymer Coatings

Part A: Synthesis of a Polymerisable Biotin Derivative (2-Methyl-acrylic acid 2-{2-[5-(2-oxo-hexahydro-thieno[3,4-d]imidazol-4-yl)-pentanoylamino]-ethoxy}-ethyl ester) (Biotin MA)

6-(5-ethyl-2-oxo-imidazolidin-4-yl)-6-mercapto-hexanoic acid [2-(2-hydroxy-ethoxy)-ethyl]-amide (biotinylated alcohol) was synthesised in the manner reported in the literature (Qi, K et al., J. Am. Chem. Soc., 2004, 126, 6599, supporting information section). This compound (1.60 g, 4.85 mmol), methacrylic acid (0.927 g, 10.77 mmol), 4-(dimethylamino)pyridine (1.347 g, 11.02 mmol), 1,3-dicyclohexylcarbodiimide (4.056 g, 15.29 mmol) (DCC) and dichloromethane (125 mL) were placed in a 250 mL round bottom flask equipped with a magnetic stirrer. The reaction was stirred at 35° C. under $N_2$ for 5 days. The reaction mixture was filtered and the filtrate partitioned between chloroform (200 mL) and brine (200 mL). The chloroform layer was separated, dried ($MgSO_4$) and evaporated to dryness to give a white paste. This white paste was washed well with diethyl ether and the washings discarded. The remaining solid contained the product and some DCC-urea by-product. This solid product was then dissolved in a minimum amount of dichloromethane and passed through a chromatography column containing silica gel (silica 9385), which had been preconditioned with 5% methanol in chloroform. The DCC-urea by-product was flushed out first, followed by the desired polymerisable biotin derivative. The eluting solvent system used was 5% methanol in chloroform. All fractions collected were analysed by thin layer chromatography (silica, fractions containing the polymerisable biotin stain light brown with iodine). $^1$H NMR spectra were obtained for all individual fractions to check for purity before combining the fractions containing the purified product. Stabiliser (4-methoxy phenol, 2 mg in dichloromethane) was added to the pure product at this stage before it was evaporated to dryness to give a white solid (1.30 g, yield 66.4%). $^1$H NMR (MeOD, 400 MHz) δ 1.39-1.78 (m, 6H, $CH_2CH_2CH_2CH_2CON$), 1.94 (s, 3H, $CH_3$), 2.20 (t, J=7.27 Hz, 2H, $CH_2CON$), 2.70 (d, J=12.73 Hz, 1H, one of the $CH_2S$ of biotin unit), 2.90 (dd, J=4.60 Hz and 12.73 Hz, 1H, one of the $CH_2S$ of biotin unit), 3.173-3.221 (m, 1H, CHS of biotin unit), 3.34-3.37 (m, 2H, $CH_2N$), 3.55-3.57 (m, 2H, $CH_2O$), 3.70-3.73 (m, 2H, $CH_2O$), 4.27-4.31 (m, 3H, CHCHS of biotin unit and $CH_2O$), 4.47-4.50 (m, 1H, $CHCH_2S$ of biotin unit), 5.63, br.s, 1H, CH vinyl), 6.11, br.s, 1H, CH vinyl) ppm. $^{13}$C NMR (MeOD, 400 MHz) δ 18.59, 26.99, 29.64, 29.89, 36.88, 40.46, 41.18, 48.51, 48.73, 48.94, 49.15, 49.36, 49.58, 49.79, 57.14, 61.78, 63.52, 65.23, 70.06, 70.77 ppm.

Part B: Graft Polymerisation of Mixtures of Acrylamide and Biotin MA from SI-ALAPP-PI Surfaces

Si-ALAPP surfaces were prepared as per Example 1 (for Si-HAPP), except that allylamine was used instead of n-heptylamine. Deposition of the allylamine plasma polymer (AL-APP) thin film was carried out for 30 s at a power of 20 W, a frequency of 200 kHz and an initial monomer pressure of 0.25 Torr. Covalent immobilisation of the PI copolymer was carried out as per Example 4 to produce Si-ALAPP-PI surfaces. These were placed in a custom design PVDF cell fitted with a quartz glass top. To the chamber was added a solution containing (i) 82 mg of polymerisable biotin, 300 mg of acrylamide and 6 mL of DMF (5 mol. %; Si-ALAPP-PI-P(ACRYLAMIDE-co-5% Biotin MA)) or (ii) 174 mg polymerisable biotin, 300 mg acrylamide and 6 mL DMF (10 mol. %; Si-ALAPP-PI-P(ACRYLAMIDE-co-10% Biotin MA)). The monomer solution in each case was purged with pure nitrogen gas for 10 minutes to remove dissolved oxygen. After purging, the inlet and outlet valves were closed and the samples exposed to UV radiation (320-500 nm wavelength; 50 $mWcm^{-2}$ intensity) for 30 minutes using an EXFO Articure 400 lamp. Following irradiation, the samples were removed and washed three times in DMF for 2 hours, soaked in fresh DMF overnight then in fresh DMF for two days with occasional shaking. Finally the samples were washed in MilliQ™ water five times over a five hour period. The Si-ALAPP-PI-P(ACRYLAMIDE-co-10% Biotin MA) samples were also exposed to a solution of NeutrAvidin™ biotin binding protein (50 µg/mL in HEPES buffer) overnight at room temperature, followed by rinsing in 1 M NaCl (twice over two hours then overnight) and HEPES buffer (three times over two hours) and finally rinsing in MilliQ™ water five times over an half hour period before drying. The HEPES buffer contained 150 mM NaCl and 20 mM [4-(2-hydroxyethyl)-1-piperazineethanesulphonic acid, sodium salt] (HEPES) and was adjusted to pH 7.2 using a 1 M NaOH solution.

Presented in Table 13 are the elemental ratios obtained via XPS analysis for the Si-ALAPP sample, and the Si-ALAPP-PI sample. It may be observed that the Si-ALAPP sample contained only C, O and N, and that the O/C ratio obtained was very low. Covalent coupling of the macromolecule containing iniferter moieties (poly(acrylic acid-co-diethyldithiocarbamic acid 4-vinyl-benzyl ester)) to the Si-ALAPP surface resulted in the incorporation of significantly more oxygen (O/C=0.186), a reduced nitrogen content and the incorporation of sulphur from the presence of iniferter moieties. The O/C and N/C elemental ratios obtained for the Si-ALAPP-PI-P(ACRYLAMIDE-co-5% Biotin MA) and Si-ALAPP-PI-P(ACRYLAMIDE-co-10% Biotin MA) surfaces were significantly higher than those obtained for the Si-ALAPP-PI surface, suggesting that the polymerisation reaction was successful in both cases. In addition, the N/C ratio obtained for the Si-ALAPP-PI-P(ACRYLAMIDE-co-10% Biotin MA) was lower than that obtained for the Si-ALAPP-PI-P(ACRYLAMIDE-co-5% Biotin MA) suggesting that, as expected, less acrylamide was incorporated into the polymer chains during the polymerisation. The elemental ratios obtained for both Si-ALAPP-PI-P(ACRYLAMIDE-co-5% Biotin MA) and Si-ALAPP-PI-P(ACRYLAMIDE-co-10% Biotin MA) surfaces were significantly different to that obtained for the Si-ALAPP-PI-P(ACRYLAMIDE) surface, suggesting that biotin was successfully incorporated into the coatings. Also included in Table 13 are the elemental ratios obtained for the Si-ALAPP-PI-P(ACRYLAMIDE-co-10% Biotin MA) surface after exposure to a biotin binding protein, NeutrAvidin™. If the biotin moieties incorporated into the grafted polymer chains were biologically active (i.e. could interact via a ligand receptor interaction with the NeutrAvidin molecules) then the NeutrAvidin™ molecules will be very strongly bound to the Si-ALAPP-PI-P(ACRYLAMIDE-co-Biotin MA) surfaces after incubation with the NeutrAvidin solution. Comparison of the elemental ratios obtained for the Si-ALAPP-PI-P(ACRYLAMIDE-co-10% Biotin MA) sample before and after incubation with NeutrAvidin™ (increased O/C, N/C and reduced S/C) clearly suggests that there was a significant amount of NeutrAvidin™ bound to the polymer coating, that was still present after extensive rinsing procedures.

Figure 13:
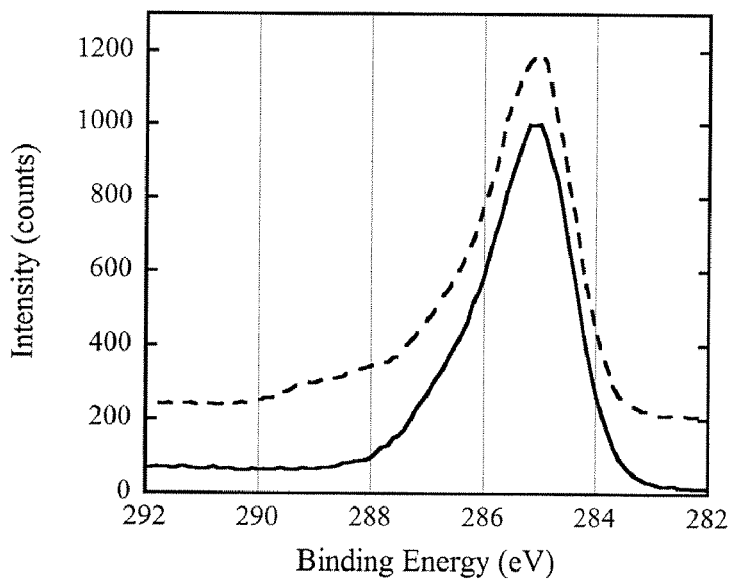
FIG. 13: Representative high resolution C 1s XPS spectra obtained from the surface of (—) Si-ALAPP and (- - -) Si-ALAPP-PI samples.

Additional information can be obtained from high resolution XPS analysis of the samples. Representative high resolution C 1s spectra obtained from the surface of the Si-ALAPP and Si-ALAPP-PI samples are presented in FIG. 13. The peak shapes obtained were very different for the two samples. In particular, a higher binding energy component, typical of carboxylic acids, was present in the spectrum from the Si-ALAPP-PI, indicating that the coupling of the macromolecule containing iniferter moieties (PI copolymer) to the Si-ALAPP surface was successful, in support of the interpretation of the low resolution analysis presented above (see Table 13). Furthermore, the differences between the various high resolution C 1s spectra were quantified by deconvolution of the various spectral components via curve-fitting routines (see Table 14). In this table, the various spectral contributions are termed C1+C2/C (hydrocarbon), C3 (C—O/C—N), C4 (C=O) and C5 (O—C=O) with correspondingly higher binding energies. A comparison of the high resolution spectra obtained from Si-ALAPP-PI-P(ACRYLAMIDE), Si-ALAPP-P(ACRYLAMIDE-co-5% Biotin MA), Si-ALAPP-PI-P(ACRYLAMIDE-co-10% Biotin MA) samples as well as Si-ALAPP-PI-P(ACRYLAMIDE-co-10% Biotin MA) samples after overnight exposure to a solution of NeutrAvidin™ (NA) Biotin MA binding protein (50 μg/mL in HEPES buffer) are presented in FIG. 14(a).

TABLE 13

Elemental ratios, determined via XPS analysis, of Si-ALAPP, Si-ALAPP-PI, Si-ALAPP-PI-P(ACRYLAMIDE), Si-ALAPP-P(ACRYLAMIDE-co-5% Biotin MA), Si-ALAPP-PI-P(ACRYLAMIDE-co-10% Biotin MA) samples as well as Si-ALAPP-PI-P(ACRYLAMIDE-co-10% Biotin MA) samples after overnight exposure to a solution of NeutrAvidin ™ (NA) biotin binding protein (50 μg/mL in HEPES buffer).

| Sample | O/C | N/C | S/C |
|---|---|---|---|
| Si-ALAPP | 0.036 | 0.176 | 0.000 |
| Si-ALAPP-PI | 0.167 | 0.120 | 0.001 |
| Si-ALAPP-P(ACRYLAMIDE) | 0.290 | 0.237 | 0.001 |
| Si-ALAPP-P(ACRYLAMIDE-co-5% Biotin MA) | 0.291 | 0.237 | 0.014 |
| Si-ALAPP-P(ACRYLAMIDE-co-10% Biotin MA) | 0.317 | 0.188 | 0.023 |
| Si-ALAPP-P(ACRYLAMIDE-co-10% Biotin MA)-NA | 0.315 | 0.240 | 0.007 |

Figure 14A:
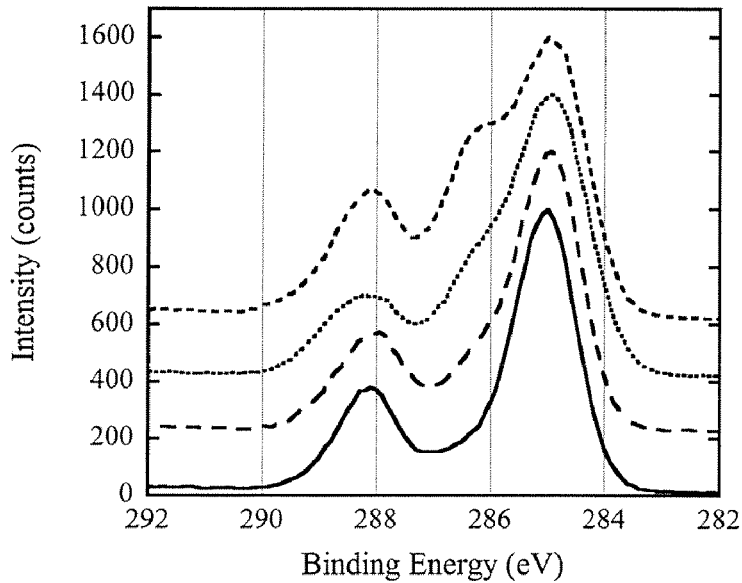
FIG. 14: (a) Representative high resolution C 1s XPS spectra obtained from the surface of (—) Si-ALAPP-PI-P(ACRYLAMIDE), (— — —) Si-ALAPP-P(ACRYLAMIDE-co-5% Biotin MA), (...) Si-ALAPP-PI-P(ACRYLAMIDE-co-10% Biotin MA) samples as well as (- - -) Si-ALAPP-PI-P(ACRYLAMIDE-co-10% Biotin MA) samples after overnight exposure to a solution of NeutrAvidin™ (NA) biotin binding protein (50 μg/mL in HEPES buffer); and (b) representative high resolution C 1s XPS spectra obtained for samples of Si-ALAPP-PI-P(ACRYLAMIDE) (—) before and after exposure to solutions of (- - -) human serum albumin (HSA, 100 μg/mL in PBS, 37° C. for 2 hours) and (...) NeutrAvidin™ (50 μg/mL in HEPES buffer, overnight at room temperature).
Figure 14B:
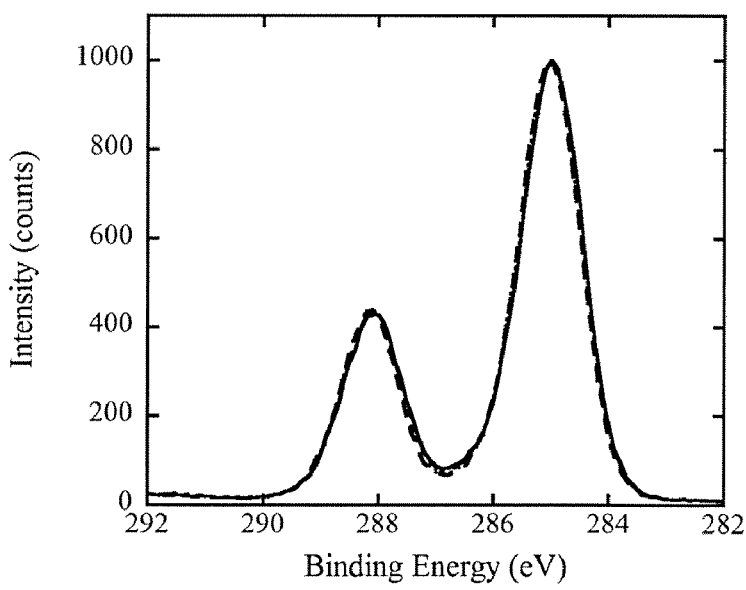

There are clear differences in the shapes of the spectra obtained for each of the samples and presented in FIG. 14(a). For example, the Si-ALAPP-P(ACRYLAMIDE) sample has two major components at 285 and 288.2 eV. Incorporation of the biotin moiety resulted in an increase in the C3 component, which became more pronounced as the amount of biotin incorporated was increased from 5 to 10 mol %. Exposure of the Si-ALAPP-PI-P(ACRYLAMIDE-co-10% Biotin MA) sample to a solution of NeutrAvidin™, resulted in increases in both the C3 and C4 components, a result which is typical for the presence of protein. These differences have been quantified by curve-fitting routines and are presented in Table 14 for comparative purposes. For samples of Si-ALAPP-PI-P(ACRYLAMIDE), exposure to a solution of NeutrAvidin™ (50 μg/mL in HEPES buffer overnight at room temperature) does not significantly change the high resolution C 1s spectrum (see FIG. 14(b)), indicating that it is the presence of the biotin moieties in the coating which results in binding of NeutrAvidin™. In addition, the resistance of the Si-ALAPP-PI-P(ACRYLAMIDE) to protein adsorption was further illustrated by exposure to a solution of human serum albumin (HSA, 100 μg/mL in phosphate buffered saline (PBS), 37° C. for 2 hours). It may be seen from FIG. 14(b) that the three spectra (sample of Si-ALAPP-PI-P(ACRYLAMIDE), sample before and after exposure to human serum albumin (HSA), and sample before and after exposure to NeutrAvidin™ overlay almost perfectly, indicating that no protein adsorption was detectable with the XPS technique (<~10 ng/cm$^2$).

TABLE 14

High resolution C 1s spectral components, obtained from curve-fitting C1s XPS spectra obtained from Si-ALAPP, Si-ALAPP-PI, Si-ALAPP-PI-P(ACRYLAMIDE), Si-ALAPP-P(ACRYLAMIDE-co-5% Biotin MA), Si-ALAPP-PI-P(ACRYLAMIDE-co-10% Biotin MA) samples as well as Si-ALAPP-PI-P(ACRYLAMIDE-co-10% Biotin MA) samples after overnight exposure to a solution of NeutrAvidin ™ (NA) biotin binding protein (50 μg/mL in HEPES buffer).

| Sample | (C1 + C2)/C | C3/C | C4/C | C5/C |
|---|---|---|---|---|
| Si-ALAPP | 0.720 | 0.260 | 0.020 | 0.010 |
| Si-ALAPP-PI | 0.550 | 0.197 | 0.227 | 0.026 |
| Si-ALAPP-P(ACRYLAMIDE) | 0.677 | 0.085 | 0.221 | 0.017 |
| Si-ALAPP-P(ACRYLAMIDE-co-5% Biotin MA) | 0.622 | 0.141 | 0.180 | 0.057 |
| Si-ALAPP-P(ACRYLAMIDE-co-10% Biotin MA) | 0.604 | 0.204 | 0.150 | 0.041 |
| Si-ALAPP-P(ACRYLAMIDE-co-10% Biotin MA)-NA | 0.504 | 0.264 | 0.204 | 0.028 |

Example 16

Preparation of Si-ALAPP-PATRPI-P(PEGMA (475)) Coatings Using ATRP Initiation

Part A: Synthesis of a Polymerisable ATRP Initiator (2-Methyl-acrylic acid-(2-bromo-2-methyl-propionyloxy)-ethyl ester)

2-Bromoisobutyryl bromide (5.79 g, 0.0252 mol, 1.1 molar equivalents (ME)) in ethyl acetate (15 mL) was added dropwise to a solution of 2-hydroxyethyl methacrylate (HEMA) (2.978 g, 0.02289 mol, 1 ME) and triethylamine (2.77 g, 0.0275 mol, 1.2 ME) in ethyl acetate (50 mL) in a 3-necked round bottom flask which was pre-cooled to ~0° C. under N$_2$. The reaction mixture was warmed to room temperature and stirred overnight. The reaction mixture was then evaporated to dryness, dissolved in dichloromethane (50 mL), washed (2% K$_2$CO$_3$) and passed through a plug of silica gel (1.09385.1000, Merck). The filtrate was evaporated to dryness to give a clear colourless oil product (4.3 g, 67.4% yield). 4-Methoxy phenol (MEHQ) (1 mg) was added as an inhibitor. $^1$H NMR (CDCl$_3$, 400 MHz) δ 1.91 (s, 6H, (CH$_3$)$_2$C(Br)COO—), 1.93 (s, 3H, CH$_3$C(CH$_2$)COO—), 4.40 (br.s, 4H, —OCH$_2$CH$_2$O—), 5.57 (s, 1H, vinyl CH), 6.12 (s, 1H, vinyl CH) ppm. $^{13}$C NMR (CDCl$_3$, 400 MHz) 18.17, 30.59, 30.68, 55.29, 61.84, 63.46, 126.06, 135.81, 166.90, 171.34 ppm.

Part B: Synthesis of a Copolymer Containing Carboxylic Acid and ATRP Initiator Moieties (PATRPI Copolymer)

Acrylic acid (1.5 g, 2.08×10$^{-2}$ moles, anhydrous) was added to 5 mL dimethyl formamide (DMF) followed by removal of the inhibitor by passage of the solution through a column containing Inhibitor Remover (Aldrich). After the addition of 0.581 g (2.0815×10$^{-3}$ mol) of 2-methyl-acrylic acid-(2-bromo-2-methyl-propionyloxy)-ethyl ester (10 mol %) and 75 mg of 2-2'-azobisisobutyronitrile (AIBN), the solution was purged with nitrogen for 10 min and sealed. Heating overnight at 60° C. resulted in a white precipitate which was dissolved by addition of a further 10 mL of DMF. The solution containing the copolymer was then dialysed (Spectrum Spectra/Por 1 molecularporous membrane tubing MW cut off 6000-8000) against DMF overnight.

The DMF was changed twice during dialysis. The contents of the dialysis tube were then transferred to a flask and made up to a final volume of 25 mL. Quantitative $^{13}C$ NMR spectra were obtained of the resultant copolymer: $^{13}C$ NMR ($DMFH_7/DMFD_7$, 500 MHz) δ 18.10, 19.44, 41.32, 45.91, 56.94, 60.15, 62.03, 63.65, 171.07, 171.87, 176.05. By obtaining the ratio of the integrals of the carbonyl peaks at 171.87 (O=C-0) and 176.05 (O=C—OH) ppm, the stoichiometry of the copolymer was found to be 92.8:7.2 acrylic acid:ATRP initiator.

Part C: Covalent Coupling of Poly(acrylic acid-co-ATRP Initiator) onto Si-HAPP Surfaces (Si-HAPP-PATRPI)

A solution which contained 20:70 $H_2O$ (pH 5):dimethyl formamide (DMF) and 2 mg/mL of PATRPI copolymer was prepared and dispensed into a series of cleaned glass vials. Into each vial was weighed the appropriate amount of 1-(3-dimethylaminopropyl)-3-ethylcarbodiimide hydrochloride (EDC) to make a solution concentration of 2.07 mg/mL. The vials were gently shaken to ensure that the EDC was completely dissolved and a Si-HAPP sample (see Example 1) placed in the vial (the HAPP thin film was freshly deposited). The vials were gently shaken overnight and then rinsed six times with a solution of 2:7 $H_2O$:DMF (v/v) (with at least 15 minutes between rinses), followed by rinsing with MilliQ™ purified water at a pH of 4 and finally three times with MilliQ™ water.

The results of XPS analysis of the Si-HAPP and Si-HAPP-PATRPI are presented in Table 15. Here it is apparent that grafting of the PATRPI copolymer onto the Si-HAPP surface resulted in the incorporation of a large amount of oxygen (O/C changed from 0.188 to 0.394) as well as bromine, the majority of oxygen incorporated arising from the acrylic acid residues in the polymer and the bromine arising from the ATRP initiator. Examples of representative, high resolution C 1s XPS spectra, obtained from the Si-HAPP and Si-HAPP-PATRPI samples are presented in FIG. 15. Here one can clearly see the difference in the shape of the spectra from the Si-HAPP and Si-HAPP-PATRPI samples, in particular, the presence of a high binding energy spectral component (binding energy approx. 289 eV) that corresponds to the introduction of acrylic acid residues onto the surface, confirming that the coupling reaction was successful.

Part D: Graft Polymerisation of Poly(poly(ethylene glycol methacrylate)(475)) from Si-HAPP-PATRPI Surfaces The procedure for the grafting of poly(poly(ethylene glycol methacrylate) (475) from the surface of Si-HAPP-PATRPI surfaces was largely taken from the literature (Feng, W. et al, Macromol. Rapid Commun. 2005, 26, 1383) with a few minor modifications. PEGMA (475) was used as received; however, the inhibitor was removed by passage through a chromatography column containing inhibitor removing resin (Aldrich). A solution of PEGMA (475) in methanol (2 M) (16 mL in total), containing 23.0 mg of Cu(1)Br (0.16 mmol) and 4.6 mg of 2,2'-bipyridine (0.03 mmol) was prepared. The oxygen in this solution was removed by $N_2$ bubbling for 20 mins before transfer to a glove bag filled with high purity $N_2$. To this solution was added nitrogen saturated ethyl 2-bromoisobutyrate (23.5 mL, 0.16 mmol) with gentle mixing. Aliquots of this solution were transferred to glass tubes that contained Si-HAPP-PATRPI surfaces, the tubes stoppered and the grafting reaction allowed to proceed at room temperature for two hours. The reaction was terminated by removing the tubes from the glove bag and allowing the introduction of $O_2$ into the tubes. The samples were rinsed with methanol four times and four times with MiliQ™ water before drying with a high purity $N_2$ stream for XPS analysis.

Figure 15:
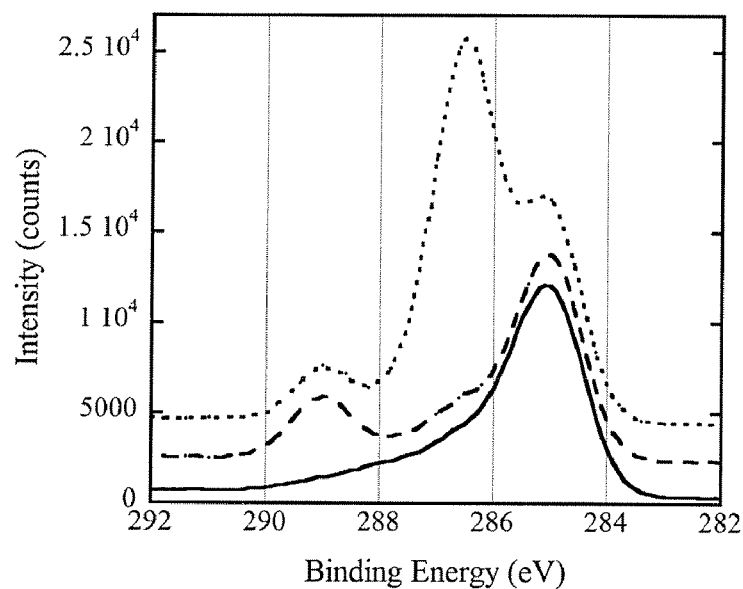
FIG. 15: High resolution C 1s XPS spectra obtained from the surface of (—) Si-HAPP, (— — —) Si-HAPP-PATRPI and (- - -) Si-HAPP-PATRPI-P(PEGMA (475)) samples.

Also presented in Table 15 and FIG. 15 are the elemental ratios obtained via XPS analysis and the high resolution C 1s XPS spectrum for the Si-HAPP-PATRPI-P(PEGMA (475)) sample. Based on the observed increase in the O/C ratio and the decrease in the N/C ratio, the grafting reaction was successful. The presence of a nitrogen signal, however, indicated that the coating produced was less than 10 nm thick when dehydrated in vacuo. Confirming this interpretation was the shape of the high resolution C 1s spectrum from the Si-HAPP-PATRPI-P(PEGMA (475)) sample, with the introduction of a significant component due to the presence of C—O groups in the coating (binding energy 286.6 eV) when compared to the spectra obtained for the Si-HAPP and Si-HAPP-PATRPI samples.

TABLE 15

Elemental ratios determined via XPS analysis of Si-HAPP and Si-HAPP-PATRPI and Si-HAPP-PATRPI-P(PEGMA (475)) surfaces.

| Sample | O/C | N/C | Br/C |
|---|---|---|---|
| Si-HAPP | 0.188 | 0.055 | 0.000 |
| Si-HAPP-PATRPI | 0.394 | 0.042 | 0.009 |
| Si-HAPP-PATRPI-P(PEGMA (475)) | 0.421 | 0.019 | 0.000 |

Example 17

Preparation of Si-HAPP-PI-P(ACRYLAMIDE-co-NHS A) Coatings Using a Polymerisable NHS Ester

Part A: Graft Polymerisation of Poly(ACRYLAMIDE-co-NHS A) from Si-HAPP-PI Surfaces Si-HAPP surfaces were prepared as per Example 1. Covalent immobilisation of the PI copolymer (from Example 3) was carried out as per Example 4 to produce Si-HAPP-PI surfaces. These were placed in a custom design PVDF cell fitted with a quartz glass top. To the chamber was added a solution containing (i) 59 mg of N-acryloxysuccinimide (NHS A), 250 mg of acrylamide and 5 mL of DMF (10 mol. %; Si-HAPP-PI-P(ACRYLAMIDE-co-10% NHS A)) or (ii) 120 mg NHS A, 250 mg acrylamide and 5 mL DMF (20 mol. %; Si-HAPP-PI-P(ACRYLAMIDE-co-20% NHS A)). The monomer solution in each case was purged with pure nitrogen gas for 10 minutes to remove dissolved oxygen. After purging, the inlet and outlet valves were closed and the samples exposed to UV radiation (320-500 nm wavelength; 50 mWcm$^{-2}$ intensity) for 30 minutes using an EXFO Articure 400 lamp. Following irradiation, the samples were removed and washed three times in DMF for 2 hours, soaked in fresh DMF overnight then in fresh DMF for one more day with occasional shaking. Finally the samples were dried for XPS analysis and cell culture experiments (see Part B).

Presented in Table 16 are the elemental ratios obtained via XPS analysis for the Si-HAPP-PI sample, the Si-HAPP-PI-P (ACRYLAMIDE-co-10% NHS A) and Si-HAPP-PI-P (ACRYLAMIDE-co-20% NHS A) samples as well as a Si-HAPP-PI-P(ACRYLAMIDE) homopolymer sample which serves as a control both for XPS analysis and cell culture experiments. Comparison of the elemental ratios obtained for the two NHS A coatings with that obtained for the Si-HAPP-PI sample, indicates that the graft coating of the samples was successful, for example, the N/C ratio was increased (0.055 for the Si-HAPP-PI sample to 0.220 and 0.202 respectively for the 10 and 20% NHS A cases and 0.274 for the acrylamide homopolymer case). The N/C value was also higher for the 10% case suggesting that the coating contained more acrylamide than the 20% NHS A sample and both NHS A containing coatings had a lower N/C ratio than the poly(acrylamide) homopolymer.

TABLE 16

Elemental ratios determined via XPS analysis of Si-HAPP-PI, Si-HAPP-PI-P(ACRYLAMIDE-co-10% NHS A), Si-HAPP-PI-P(ACRYLAMIDE-co-20% NHS A) and Si-HAPP-PI-P(ACRYLAMIDE) samples.

| Sample | O/C | N/C | S/C |
|---|---|---|---|
| Si-HAPP-PI | 0.385 | 0.055 | 0.028 |
| Si-HAPP-PI-P(ACRYLAMIDE) | 0.281 | 0.274 | 0.000 |
| Si-HAPP-PI-P(ACRYLAMIDE-co-10% NHS A) | 0.342 | 0.220 | 0.000 |
| Si-HAPP-PI-P(ACRYLAMIDE-co-20% NHS A) | 0.358 | 0.202 | 0.000 |

Figure 16:
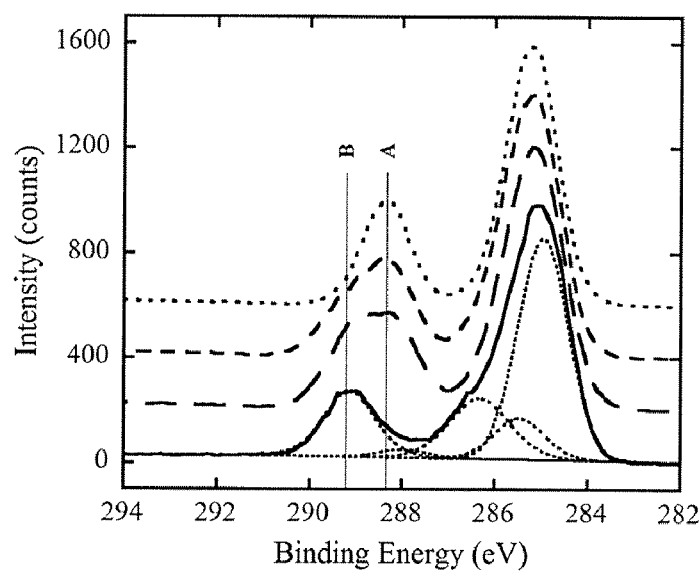
FIG. 16: High resolution C 1s XPS spectra obtained from the surface of (—) Si-HAPP-PI (PI) (dotted lines under this curve represent curve-fitted components), (...) Si-HAPP-PI-P(ACRYLAMIDE) (PAAm), (— — —) Si-HAPP-PI-P(ACRYLAMIDE-co-10% NHS A) (10% NHS) and (- - -) Si-HAPP-PI-P(ACRYLAMIDE-co-20% NHS A) (20% NHS). Labels A and B refer to the binding energies associated with C=O/N—C=O and O—C=O respectively.

In order to obtain additional information regarding the coatings, high resolution C 1s XPS spectra were also obtained. In FIG. 15 are presented representative spectra obtained from Si-HAPP-PI, Si-HAPP-PI-P(ACRYLAMIDE-co-10% NHS A), Si-HAPP-PI-P(ACRYLAMIDE-co-20% NHS A) and Si-HAPP-PI-P(ACRYLAMIDE) samples. In the case of the Si-HAPP-PI spectrum, the deconvoluted spectral components are also included, obtained via curve-fitting routines. The spectral components are denoted C1 to C5 with increasing binding energy. In FIG. 16 distinct differences between the shapes of the various spectra can be observed. For example, the Si-HAPP-PI sample has a very distinct, high binding energy component (C5 BE=289.25 eV) which corresponds to O—C=O groups. The Si-HAPP-PI-P (ACRYLAMIDE) spectrum, on the other hand, has a distinct component (C4, BE=288.1 eV) which corresponds to C=O/N—C=O groups (the latter being more important for poly (acrylamide)). The two NHS A coatings of course contain elements of both types of functionality. In the spectra from the NHS A coatings one may observe that the relative intensities of the C4 and C5 components shifts depending on whether there is more or less acrylamide or NHS A in the coating. Quantification of the spectral components of the high resolution C 1s spectra is included in Table 17.

TABLE 17

High resolution C 1s spectral components, obtained from curve-fitting C1s XPS spectra obtained from Si-HAPP-PI, Si-HAPP-PI-P(ACRYLAMIDE), Si-HAPP-PI-P(ACRYLAMIDE-co-10% NHS A) and Si-HAPP-PI-P(ACRYLAMIDE-co-20% NHS A).

| Sample | (C1 + C2)/C | C3/C | C4/C | C5/C |
|---|---|---|---|---|
| Si-HAPP-PI | 0.630 | 0.183 | 0.017 | 0.170 |
| Si-HAPP-PI-P(ACRYLAMIDE) | 0.550 | 0.197 | 0.227 | 0.026 |
| Si-HAPP-PI-P(ACRYLAMIDE-co-10% NHS A) | 0.677 | 0.085 | 0.221 | 0.017 |
| Si-HAPP-PI-P(ACRYLAMIDE-co-20% NHS A) | 0.622 | 0.141 | 0.180 | 0.057 |

The provision of NHS reactive groups within a polymer coating with controlled non-specific adsorption properties, controlled grafting density, molecular weight and architecture polymer allows for the immobilisation of amine containing compounds such as peptides. The inclusion of such peptides in the coatings may provide control over the response of cells cultured with the surfaces (see Part B).

Part B: Cell Culture Experiments

To test the efficacy of the NHS moiety reactivity following copolymerization of N-acryloxysuccinimide (NHS A) into a P(ACRYLAMIDE) coating, the pentapeptide Lys-Asp-Gly-Glu-Ala (KDGEA) was chosen. KDGEA is a cell binding recognition sequence for $\alpha 2\beta 1$ integrin found in types I and IV collagens and has been shown to effectively block the attachment of bovine corneal epithelial (BCEp) cells to collagen mimetic surfaces. By utilising the NHS moieties to immobilize KDGEA to the P(ACRYLAMIDE) surface, a poor supporter of cell attachment, it was expected that BCEp cells seeded onto that surface would be able to attach and spread via the anchored pentapeptide. The non cell-supportive analogue of KDGEA, Lys-Asp-Gly-Ala-Ala (KDGAA) was also used for comparison. It is particularly important that in order to discriminate between the effect of the KDGEA and KDGAA peptides on cell attachment, the attachment on the polymeric scaffold must be low. This is best achieved by fabricating the scaffold using methodologies where the polymeric chain grafting density, molecular weight, polydispersity, composition and conformation of the polymer chains are readily controlled. The methodologies described within are ideally suited to achieve this control.

Samples of Si-HAPP-PI-P(ACRYLAMIDE-co-20% NHS A) were transferred to tissue culture polystyrene culture plates (TCPS, 24-well) and tested for their ability to support 24 hour attachment and spreading of bovine corneal epithelial (BCEP) cells, after treatment in one of the following ways: (a) soaking in a solution of Phosphate Buffered Saline (PBS, pH 7.4) containing 500 µg/mL of the pentapeptide Lys-Asp-Gly-Glu-Ala (KDGEA) for 1 hr at 37° C.; (b) Soaking in a solution of PBS (pH 7.4) containing 500 µg/ml of the pentapeptide Lys-Asp-Gly-Ala-Ala (KDGAA) for 1 hr at 37° C.; (c) Soaking in a solution of PBS (pH 8.0) for 1 hr at 37° C. to inactivate the NHS moieties and (d) Si-HAPP-PI-P(ACRYLAMIDE) control samples were also soaked in PBS at pH 7.4 or pH 8.0 for 1 hr at 37° C., whilst TCPS was used as a reference control surface.

Following the various soaking regimes the solutions were removed and each sample washed with sterile PBS (pH 7.4). BCEp cells at a concentration of $2 \times 10^5$ cells/well were then added to each sample well in a culture medium composed of Dulbecco's Modified Eagles Medium/Ham's F12 (DMEM/F12, 50:50) supplemented with 10% (v/v) foetal bovine serum (FBS). The cells were then incubated for 24 hours in a humidified atmosphere of 5% $CO_2$ in air at 37° C.

To visualise the cells on the opaque Si-wafer-based samples they were labelled with CellTracker™ Green (Invitrogen Corp.) for the final hour of incubation. Cells were then fixed with a solution of 4% formol-saline before viewing by fluorescence microscopy using an absorbance wavelength of 488 nm. Representative images of cells on each sample type were recorded digitally.

Figure 17A:
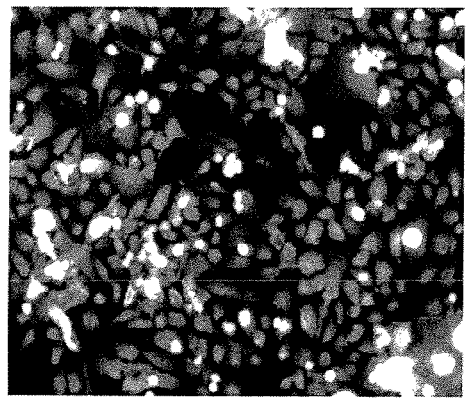
FIG. 17: Representative fields showing BCEp cell attachment to (a) Si-HAPP-PI-P(ACRYLAMIDE-co-20% NHS A) with covalently coupled KDGEA peptide (b) Si-HAPP-PI-P(ACRYLAMIDE-co-20% NHS A) with covalently coupled KDGAA peptide c) Si-HAPP-PI-P(ACRYLAMIDE-co-20% NHS A) after hydrolysis and (d) Si-HAPP-PI-P(ACRYLAMIDE) surfaces after 24 hours in culture.
Figure 17B:
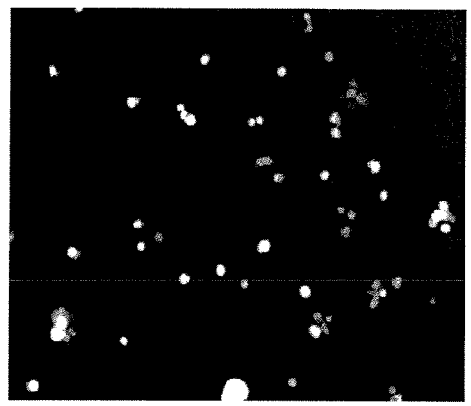
Figure 17C:
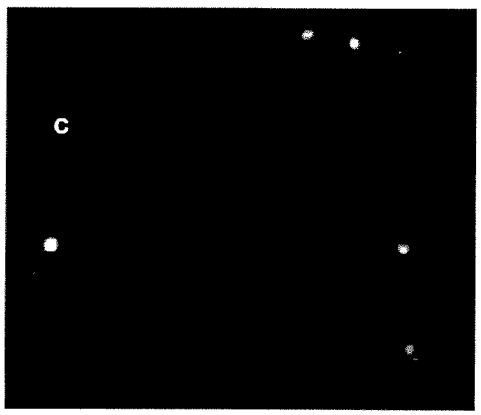
Figure 17D:
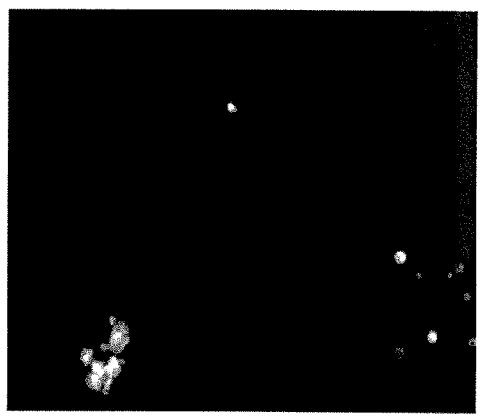
Figure 18A:
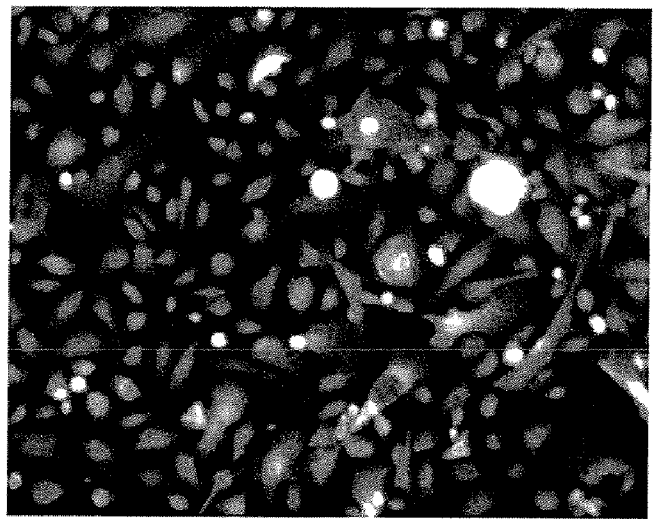
FIG. 18: Representative fields showing BCEp cell attachment to TCPS control surfaces after 24 hours in culture.
Figure 18B:
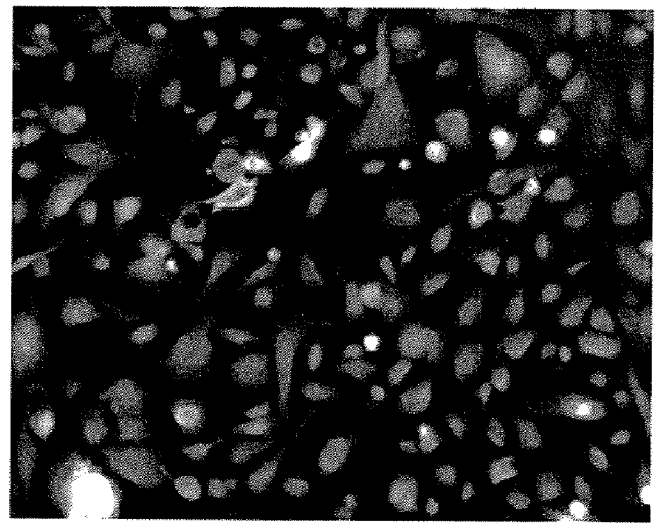

Excellent cell attachment with a well spread morphology was observed on the Si-HAPP-PI-P(ACRYLAMIDE-co-20% NHS A)-KDGEA surfaces (FIG. 17a, KDGEA), similar to the TCPS control surface (FIGS. 18 a and b). Minimal cell attachment was observed on the Si-HAPP-PI-P(ACRYLA-MIDE-co-20% NHS A)-KDGAA sample (FIG. 17b, KDGAA) compared to the KDGEA sample, but with slightly higher cell numbers than the control surfaces where no peptides had been used (FIGS. 17c and d). Those cells that were present, however, all displayed a rounded morphology. This is not unexpected as with only one amino acid change in the sequence there may still be a weak affinity for KDGAA by the BCEp cell membrane $\alpha 2\beta 1$ integrin. Very low cell attachment was observed on the Si-HAPP-PI-P(ACRYLAMIDE-co-20% NHS A) samples which had been hydrolysed at pH 8.0 (FIG. 17c, NHS pH 8.0). Minimal cell attachment was found on the Si-HAPP-PI-P(ACRYLAMIDE) control surface which had been exposed to PBS at pH 8.0: (FIG. 17d, pAAm pH[8.0]).

These results indicate that the surface density and conformational integrity of the Si-HAPP-PI-P(ACRYLAMIDE-co-20% NHS A) surface was sufficient to covalently immobilize the KDGEA peptide in such a fashion as to provide good cell attachment to that surface. Not only did BCEp attach in high numbers, but they did so whilst retaining a well spread morphology after 24 hours in culture. The non-cell binding analogue KDGAA failed to provide a similar anchorage point for BCEp cell attachment and was effectively equivalent to the non-supportive, hydrolysed Si-HAPP-PI-P(ACRYLA-MIDE-co-20% NHS A) and the Si-HAPP-PI-P(ACRYLA-MIDE) control.

Example 18

Preparation of Si-HAPP-PI-P(ACRYLAMIDE) Coatings from Covalently Coupled Macromolecules, Comprising Carboxylic Acid Moieties and Iniferter Moieties, of Different Compositions Part A: Synthesis of a Poly(acrylic acid-co-diethyl-dithiocarbamic acid 4-vinyl-benzyl ester) Copolymer with a Different Molar Ratio of Diethyl-dithiocarbamic acid 4-vinyl-phenyl Ester and Acrylic Acid (Compared to Example 3)

A poly(acrylic acid-co-diethyl-dithiocarbamic acid 4-vinyl-benzyl ester) copolymer with a lower mole ratio of acrylic acid-co-diethyl-dithiocarbamic acid 4-vinyl-benzyl ester, compared to that outlined in Example 3 was synthesised according to the method outlined in Example 3 (PI (2)). Acrylic acid (4.0 g, $5.55 \times 10^{-2}$ mol, anhydrous, Fluka) was dissolved in 8 mL of dimethylformamide (DMF) (BDH chemicals), followed by removal of the inhibitor by passage of the solution through a column containing Inhibitor Remover (Aldrich). To the acrylic acid solution was added 0.60 g of diethyl-dithiocarbamic acid 4-vinyl-phenyl ester ($2.26 \times 10^{-3}$ mol) (from Example 2) and 200 mg of AIBN, following which the solution was purged with nitrogen for 10 min. and sealed. Heating overnight at 60° C. resulted in the formation of an opaque, viscous gel which was diluted by further addition of 20 mL of DMF. The solution containing the copolymer was then dialysed (Spectrum Spectra/Por 1 molecular porous membrane tubing, MW cutoff 6000-8000) against DMF overnight. The DMF was changed twice during dialysis. The contents of the dialysis tube were then transferred to a flask and made up to a final volume of 100 mL.

The PI (2) copolymer was characterised by quantitative $^{13}$C NMR. This composition corresponded to a copolymer containing 3.4:96.6 mol. % diethyl-dithiocarbamic acid 4-vinyl-phenyl ester:acrylic acid. This composition may be compared to the copolymer synthesised in Example 3 where the composition was found to be 8.5:91.5 mol % diethyl-dithiocarbamic acid 4-vinyl-phenyl ester:acrylic acid (PI (1)).

Part B: Covalent Coupling of Poly(acrylic acid-co-diethyl-dithiocarbamic acid 4-vinyl-benzyl ester) Copolymers to HAPP Modified Silicon Wafers (Si-HAPP-PI)

Coupling of the PI (2) copolymer to the HAPP coated silicon wafers of Example 1 was carried out according to the method outlined in Example 4.

Presented in Table 18 are the elemental ratios determined via XPS analysis of SI-HAPP, Si-HAPP-PI (1) (from Example 4) and Si-HAPP-PI (2) samples. The covalent coupling of this copolymer was successful as indicated by the increased O/C and reduced N/C ratios (compared to the Si-HAPP sample), a similar N/C to the Si-HAPP-PI (1) sample and the presence of sulphur (as indicated by the S/C ratio). The S/C ratio obtained was lower for the Si-HAPP-PI (2) sample than that obtained for the Si-HAPP-PI (1) sample, indicating that the covalently grafted layer contained less of the incorporated iniferter moieties. Given uniform coverage of the two copolymers on the surface of the Si-HAPP samples, the reduced molar ratio of diethyl-dithiocarbamic acid 4-vinyl-benzyl ester in the covalently coupled copolymer will result in a larger spacing between the initiation sites for graft polymerisation.

Part C: Graft Polymerisation of Acrylamide Monomer from Si-HAPP-PI (1) and Si-HAPP-PI (2) Surfaces Graft polymerisation of poly(acrylamide) from the surface of Si-HAPP-PI (2) samples was carried out according to the method outlined in Example 6, however, after purging the monomer solution with a Nitrogen stream, the inlet and outlet valves were closed and the samples were exposed to UV radiation (320-500 nm wavelength at an intensity of 50 mWcm$^{-2}$) for 30 minutes using an EXFO Articure 400 lamp.

Also presented in Table 18 are the elemental ratios obtained by XPS analysis of the Si-HAPP-PI (2)- P(ACRY-LAMIDE) samples, compared to those obtained for the Si-HAPP-PI (1)-P(ACRYLAMIDE) samples. As outlined above, the two Si-HAPP-PI (1) and (2) samples will have different spacings between the initiation sites for graft polymerisation. Given that the polymerisation reactions produce polymers of similar molecular weight, and that the distance between the grafted chains was lower in the case of the Si-HAPP-PI (2)-P(ACRYLAMIDE) sample than for the Si-HAPP-PI (1)-P(ACRYLAMIDE) sample, the mass of poly(acrylamide) grafted to the Si-HAPP-PI (2) will be lower than that obtained from the Si-HAPP-PI (1) sample. After drying the samples and placing in the ultra high vacuum chamber of the XPS instrument, the thickness of the grafted layer on the Si-HAPP-PI (2) sample will be lower than that grafted on the Si-HAPP-PI (1) sample. This effect is demonstrated by analysis of the XPS elemental ratio results presented in Table 18. Here one can see that the O/C and N/C ratios obtained for the Si-HAPP-PI (2)-P(ACRYLAMIDE) sample are lower than those obtained for the Si-HAPP-PI (1)-P(ACRYLAMIDE) sample, consistent with the thickness of the poly(acrylamide) grafted layers on the Si-HAPP-PI (2) sample indeed being lower than that obtained for the Si-HAPP-PI (1) sample.

TABLE 18

Elemental ratios obtained via XPS analysis of Si-HAPP, Si-HAPP-PI (1) (from Example 4), Si-HAPP-PI (2), Si-HAPP-PI (1)-P(ACRYLAMIDE) and Si-HAPP-PI (2)-P(ACRYLAMIDE) samples.

| Sample | O/C | N/C | S/C |
|---|---|---|---|
| Si-HAPP | 0.040 | 0.086 | 0.000 |
| Si-HAPP-PI (1) | 0.385 | 0.055 | 0.028 |
| Si-HAPP-PI (2) | 0.323 | 0.050 | 0.007 |
| Si-HAPP-PI (1)-P(ACRYLAMIDE) | 0.317 | 0.277 | 0.001 |
| Si-HAPP-PI (2)-P(ACRYLAMIDE) | 0.245 | 0.125 | 0.000 |

Example 19

Coating Stability

Effect of Autoclaving

Si-HAPP-PI-P(ACRYLAMIDE) coatings were prepared as per the method described in Example 6. Samples of the coated surface were placed in an autoclave and the autoclave put through a normal sterilisation cycle. Samples were removed and rinsed eight times with MilliQ™ water before drying for XPS analysis. Non-autoclaved samples, which had been extensively rinsed with MilliQ™ water were also dried and analysed with XPS for comparison. It is clear from the data presented in Table 19 that the elemental ratios obtained for the Si-HAPP-PI-P(ACRYLAMIDE) surfaces before and after autoclaving were very similar. Since the samples were subjected to elevated temperature and pressure during autoclaving, with no change in composition, this is good evidence that the coatings are stable and do not, for example, delaminate on sterilisation.

TABLE 19

Elemental ratios, determined via XPS analysis of Si-HAPP-PI-P(ACRYLAMIDE) coatings before and after autoclaving.

| Sample | O/C | N/C |
|---|---|---|
| Si-HAPP-P(ACRYLAMIDE) | 0.332 | 0.222 |
| Si-HAPP-P(ACRYLAMIDE) After Autoclave | 0.359 | 0.238 |

Figure 19:
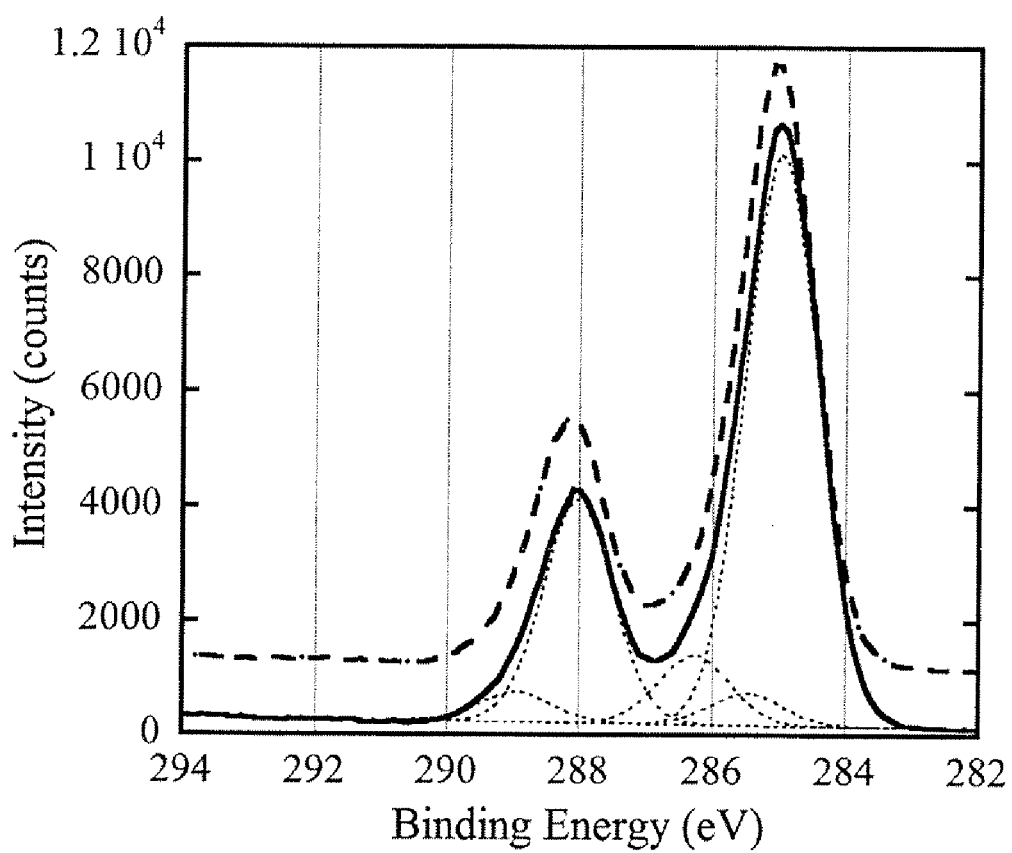
FIG. 19: High resolution XPS C 1s spectra obtained for Si-HAPP-PI-P(ACRYLAMIDE) samples (—) before and (- - -) after autoclaving. Also included (...) are the curve-fitted spectral components obtained for the non-autoclaved sample.

Presented in FIG. 19 are the high resolution C 1s XPS spectra obtained for the Si-HAPP-PI-P(ACRYLAMIDE) samples before and after autoclave. The spectra obtained were very similar in both cases, confirming that the samples were stable to the autoclaving process. Also included in FIG. 19 are the curve-fitted spectra components of the C 1s spectrum obtained for the Si-HAPP-PI-P(ACRYLAMIDE) sample before autoclaving. This procedure allows quantitation of the contributions to the overall spectra which arise from chemical shifts associated with different functional groups or chemical environments, Curve fitted components of the C 1s spectrum obtained for the sample after autoclave have not been included in FIG. 19 for reasons of clarity. However, they are listed for both samples in Table 20. Again the respective components for both samples were very similar, demonstrating the stability of the coatings when autoclaved.

TABLE 20

High resolution XPS C 1s spectral components obtained by curve fitting routines for Si-HAPP-PI-P(ACRYLAMIDE) coatings before and after autoclaving. Starting from lowest to highest binding energy, C1 and C2 arise from hydrocarbon, C3 from C—O/C—N, C4 from C=O/N—C=O and C5 from O—C=O species.

| Sample | (C1 + C2)/C | C3/C | C4/C | C5/C |
|---|---|---|---|---|
| Si-HAPP-P(ACRYLAMIDE) | 0.655 | 0.076 | 0.236 | 0.033 |
| Si-HAPP-P(ACRYLAMIDE) After Autoclave | 0.645 | 0.079 | 0.226 | 0.051 |

Example 20

Coating of Polymeric Substrates

Azide based surface immobilisation

Part A: Derivatisation of PI Copolymer with Azidoaniline Hydrochloride

Whilst working in dark room conditions, 5.0 mL of a DMF solution containing 4.1% PI copolymer (described in Example 3) was mixed with 0.5 mL PBS buffer solution. To this solution was added 100 mg azidoaniline hydrochloride and 200 mg N-(3-dimethylaminopropyl)-N-ethylcarbodiimide hydrochloride (EDC). The reaction mixture was then stirred using a magnetic stirrer for 1 hour under dark room conditions at room temperature. The resulting azidoaniline modified PI [PI(AZIDE)] copolymer solution was used in subsequent experiments without further purification.

Part B: Surface Immobilisation of PI(AZIDE) Copolymer

Poly(ethylene terephthalate) (PET) films were used as substrates for the surface immobilisation of the PI(AZIDE) copolymer. PET films were used as received and cut to a size of 1 cm×1.5 cm. An allylamine plasma polymer was then deposited according to the procedure described in Example 15b.

Samples were then incubated with the PI(AZIDE) containing solution described above over 30 min in the dark at room temperature. Samples for covalent immobilisation [PET-PI (AZIDE) covalent] were washed briefly with a 9:1 (v/v) DMF/water solution, dried and exposed to irradiation (EXFO Articure 400, 400-500 nm filter, 50 W) for 10 seconds. During UV exposure, the PI(AZIDE) polymer was covalently anchored on the substrate surface due to the formation of highly reactive nitrene groups and their reaction with the PET substrate polymer.

Control samples included samples which were washed repeatedly (5 times for 30 min) with a 9:1 (v/v) DMF/water solution and in addition with water (5 times for 30 min) followed by drying of the samples after PI(AZIDE) adsorption as described above [PET-PI(AZIDE) adsorbed].

Part C: Graft Polymerisation of Acrylamide Monomer from PET-PI(AZIDE) Covalent Surfaces PET-PI(AZIDE) covalent samples were then introduced into a polymerisation chamber (as described in previous Examples) filled with a 5% (w/v) aqueous acrylamide solution. Graft polymerisation of acrylamide from the surface bound iniferter moieties was then carried out by UV irradiation (EXFO Articure 400, 320-500 nm filter, 50 W) for 30 min After UV polymerisation, samples were washed with water (three times 30 min and in addition for 16 hours) before drying (PET-PI(AZIDE) covalent-P(ACRYLAMIDE)).

Presented in Table 21 are the elemental ratios obtained by XPS for these samples.

TABLE 21

Elemental ratios obtained via XPS analysis of PET, PET-PI(AZIDE) adsorbed, PET-PI(AZIDE) covalent and PET-PI(AZIDE) covalent-P(ACRYLAMIDE) samples.

| Sample | O/C | N/C | S/C |
|---|---|---|---|
| PET | 0.385 | 0.000 | 0.000 |
| PET-PI(AZIDE) adsorbed | 0.366 | 0.000 | 0.000 |
| PET-PI(AZIDE) covalent | 0.256 | 0.119 | 0.008 |
| PET-PI(AZIDE) covalent-P(ACRYLAMIDE) | 0.282 | 0.272 | 0.000 |

The results show the typical composition of PET and clearly show that adsorbed PI(AZIDE) was completely washed off if the samples were not irradiated. PET-PI (AZIDE) covalent samples in comparison, showed a significant increase in the N/C ratio and a significant decrease in the O/C ratio as expected from the structure of the PI(AZIDE) copolymer. The appearance of sulphur for this sample gives further evidence for the successful covalent immobilisation of the PI(AZIDE) copolymer. The analysis results obtained for the PET-PI(AZIDE) covalent-P(ACRYLAMIDE) sample indicated successful grafting of P(ACRYLAMIDE) with a coating thickness of more than 10 nm (the analysis depth of the XPS method) as indicated by the high O/C and N/C ratios and the absence of a sulphur signal.

Figure 20A:
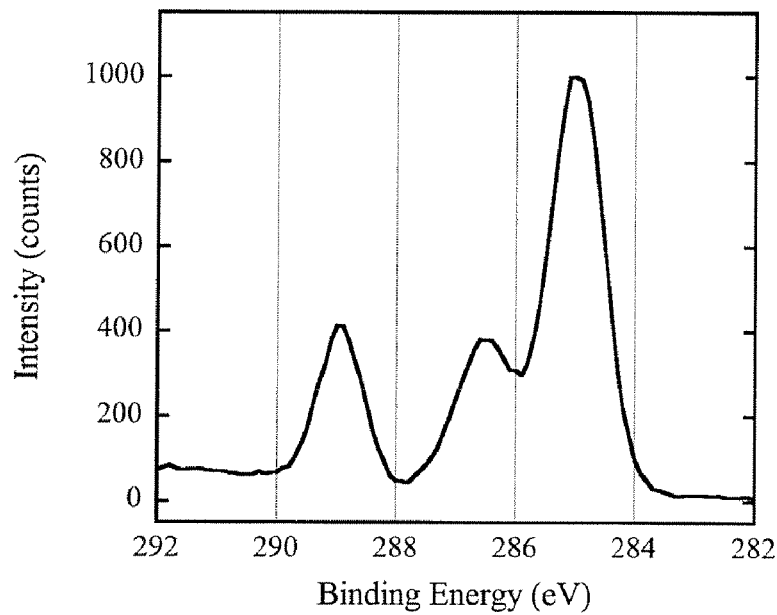
FIG. 20: Representative high resolution C 1s XPS spectra obtained for (A) PET and (B) PET-PI(AZIDE) covalent-P(ACRYLAMIDE) samples.
Figure 20B:
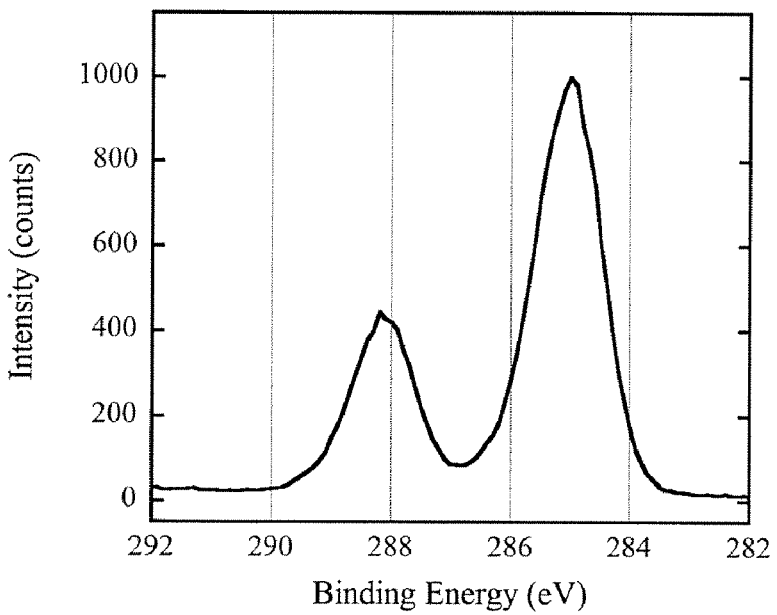
Figure 21A:
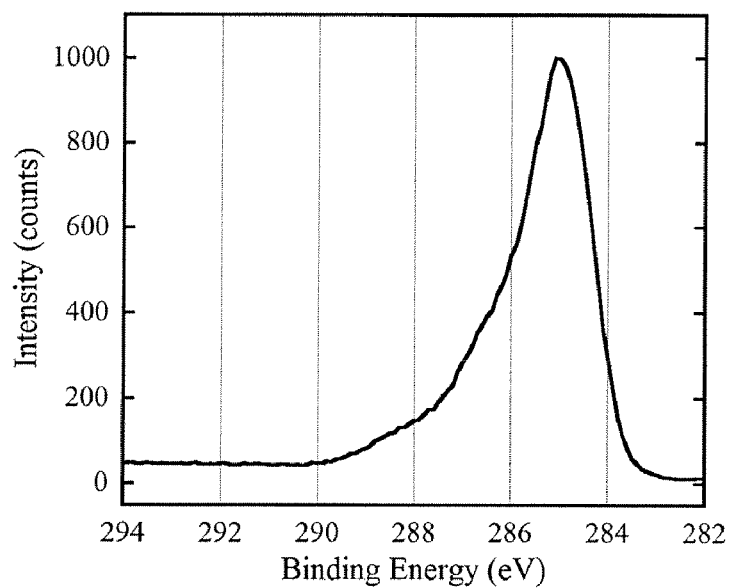
FIG. 21: Representative high resolution C 1s spectra obtained from the surfaces of (a) Si-ALAPP (b) Si-ALAPP-HDI (c) Si-ALAPP-Star-PEG-PI and (d) Si-ALAPP-HDI-Star-PEG-PI-P(ACRYLAMIDE) samples.
Figure 21B:
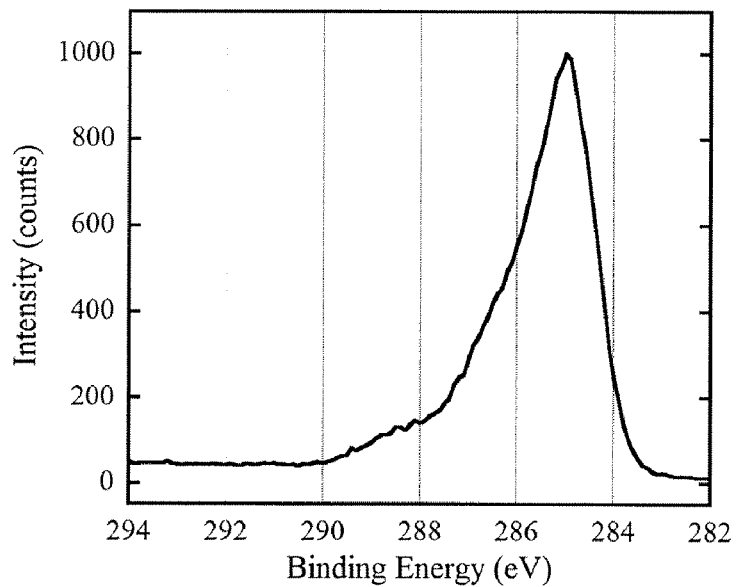
Figure 21C:
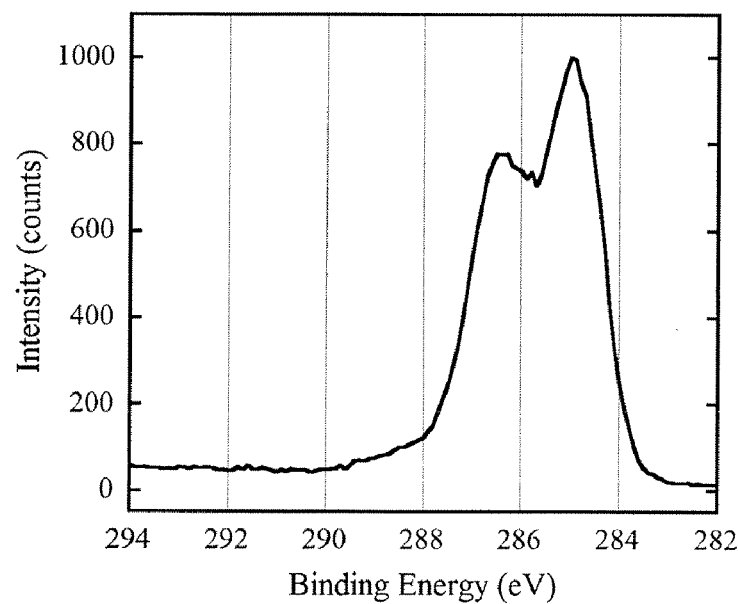
Figure 21D:
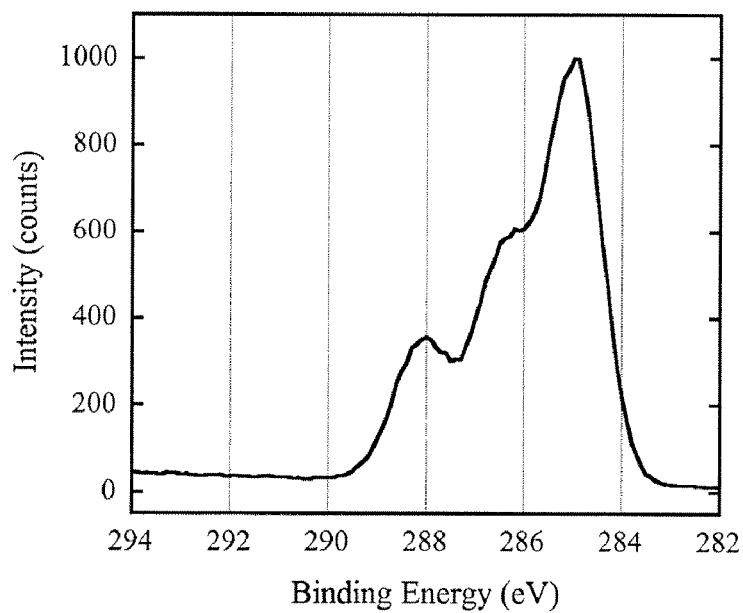

This result is further supported by the C 1s high resolution XPS spectra of the samples listed above. A representative high resolution C 1s spectrum obtained from the surface of the PET-PI(AZIDE) covalent-P(ACRYLAMIDE) sample (presented in FIG. 20(A)) showed the typical features of a thick P(ACRYLAMIDE) coating. Also presented in FIG. 20(B) for comparison is a representative high resolution C 1s spectrum obtained for PET.

Control experiments carried out by irradiation of PET and PET-PI(AZIDE) adsorbed samples in an acrylamide solution (data not shown here) did not result in any significant grafting as indicated by a N/C ratio of 0.016 or less.

Example 21

Preparation of Si-ALAPP-PRAFT-P(ACRYLAMIDE) Graft Coatings Using Reversible Addition-Fragmentation Chain Transfer (RAFT) Polymerisation Part A: Synthesis of a Copolymer Containing Carboxylic Acid Moieties and 4-Chloromethylstyrene Moieties Acrylic acid (4.0 g, $5.6 \times 10^{-2}$ mol, anhydrous, Fluka) was dissolved in 12 mL of dimethyl formamide (DMF, BDH Chemicals), followed by passage of the solution through a column containing Inhibitor Remover resin (Aldrich). To this was added 1-(chloromethyl)-4-vinylbenzene (CMVB, 0.84 g, $5.5 \times 10^{-3}$ mol, Aldrich). This solution was purged with dry nitrogen gas for ten minutes, followed by the addition of 0.2 g azobisisobutyronitrile (AIBN). The flask containing the reaction mixture was sealed with a rubber septum, purged with dry nitrogen gas for a further five minutes and finally heated overnight at 60° C. After the polymerisation solution was cooled, it was transferred to a dialysis tubing (Spectrum SpectraPor 1, molecular weight cut off 6-8 kDa) and dialysed against DMF for two days with multiple changes of DMF. This solution was then placed in a 10 mm NMR tube and a quantitative $^{13}C$ spectrum obtained: $^{13}C$ NMR (125.77 MHz, DMF-$h_7$) δ 177.9-172.2 (8.3C, C=O), 145.3-143.8 (1C, ArC), 136.2 (1H, ArC), 129.2 (2C, ArCH), 128.5 (2C, ArCH), 46.6 (1C, $CH_2Cl$), 42.4-40.9, (9.3C, VBC backbone CH, AA backbone $CH_2$), 38.5-34.8 (AA backbone CH, VBC backbone $CH_2$, partially obscured by DMF). Analysis of the integrals obtained for the various peaks indicated that the molar composition of the polymer was 89:11 for acrylic acid:C-MVB residues, in good agreement with the monomer feed ratio used.

Part B: Synthesis of Ethyltrithiocarbamate Anion

Under a nitrogen atmosphere, ethanethiol (1.46 g, $23.5 \times 10^{-3}$ mol, Aldrich) and carbon disulphide (2.69 g, $35.4 \times 10^{-3}$ mol, Ajax Chemicals) were added to 20 mL of chloroform in a round bottom flask. To this solution, triethylamine (2.80 g, $27.7 \times 10^{-3}$ mol, Aldrich) was added dropwise. The reaction mixture was stirred for two hours then left to react overnight at room temperature.

Part C: Synthesis of a Copolymer Containing Carboxylic Acid Moieties and Reversible Addition-Fragmentation Chain Transfer Agent Moieties (PRAFT Copolymer)

To the copolymer solution formed above in Part A was added 14 mL of the ethyltrithiocarbamate salt solution formed above in Part B. The reaction mixture was stirred at room temperature for two hours before being transferred to a dialysis membrane (Spectrum SpectraPor 1, molecular weight cut off 6-8 kDa) and dialysed against DMF for two days with multiple changes of DMF. The polymer solution inside the dialysis tubing was yellow in colour. This colour was maintained over the period of dialysis. At the end of the dialysis time period, no yellow colour was noted in the dialysate. The volume of polymer solution inside the dialysis tube was then removed and made up to 40 mL total volume with additional DMF. A sample of this polymer solution was removed for quantitative $^{13}C$ NMR analysis: $^{13}C$ NMR (125.77 MHz, DMF-$h_7$) δ 225.2 (1C, C=S), 178.2-173.4 (9.3C, C=O), 146.4-144.0 (1C, ArC), 133.6 (1H, ArC), 130.2 (2C, ArCH), 129.1 (2C, ArCH), 46.6 (1C, $CH_2Cl$), 43.4-41.2, (VBR backbone CH, AA backbone $CH_2$, $CH_2CH_3$), 38-35 (AA backbone CH, VBR backbone $CH_2$, partially obscured by DMF), 13.7 (1C, $CH_3$).

Analysis of the integrals obtained from the spectra indicate that (i) the reaction between the CMVB moieties on the copolymer chain and the ethyltrithiocarbamate anions was essentially quantitative and (ii) that the stoichiometry between the acrylic acid and ethyltrithiocarbamate residues on the copolymer chain was the same as that obtained for the ratio of acrylic acid: CMVB residues obtained in Part A.

Part D: Covalent Coupling of PRAFT Copolymer to ALAPP Modified Silicon Wafers (Si-ALAPP-PRAFT)

Si-ALAPP surfaces were prepared as per Example 15 and covalent coupling of the PRAFT copolymer onto the Si-ALAPP surfaces was carried out as per Example 4. In short, five pieces of ALAPP treated silicon wafer (approx 1 cm×1 cm) were placed in a solution comprising 1.5 mL of the solution of the PRAFT copolymer prepared in Part C, along with DMF (4.5 mL), H₂O (0.8 mL) and N-(3-dimethylaminopropyl)-N-ethylcarbodiimide hydrochloride (EDC, 0.075 g, Sigma). The reaction was allowed to proceed overnight, following which the silicon wafer pieces were washed in DMF (twice over a day followed by an overnight wash) and purified water (three times over one day) before drying in a laminar flow cabinet.

Confirmation that the PRAFT copolymer was covalently coupled to the Si-ALAPP substrates was obtained via XPS analysis. In Table 22 it can be seen that the O/C ratio obtained for the Si-ALAPP-PRAFT sample was significantly higher than that obtained for the Si-ALAPP control samples (arising from the presence of a high proportion of carboxylic acid residues in the PRAFT copolymer). In addition, a reduction in the N/C ratio for the Si-ALAPP-PRAFT sample (indicating the presence of an over-layer on top of the Si-ALAPP surface which does not contain N) as well as the presence of S (from the trithiocarbamate in the copolymer). Furthermore, XPS high resolution spectral analysis indicated the presence of carboxylic acid groups on the surfaces, consistent with the presence of a macromolecular coating containing acrylic acid groups.

Part E: Graft Polymerisation of Acrylamide from Si-ALAPP-PRAFT Surfaces (Si-ALAPP-PRAFT-P(ACRYLAMIDE))

Si-ALAPP-PRAFT treated silicon wafers were placed into a vial containing 10 mL of 5 wt % acrylamide monomer solution. This was degassed for 5 minutes with nitrogen before adding 2,2'-Azobis-(2-amidinopropane) dihydrochloride (Vaso® 50, 0.025 g). The solution was purged with nitrogen for a further five minutes before sealing the vial and heating at 35° C. for 30 minutes. The samples were washed three times, soaked for two days water followed by a final rinse in MilliQ™ purified water. Finally the samples were dried in a laminar flow cabinet using a dry, filtered, high velocity stream of nitrogen before analysis with XPS.

Presented in Table 22 are the results obtained via XPS analysis of the Si-ALAPP-PRAFT-P(ACRYLAMIDE) samples. Successful grafting of poly(acrylamide) from the surface of the Si-ALAPP-PRAFT samples was verified by an increase in the N/C atomic ratio from 0.046 to a value of 0.114. It should also be noted that before and after poly(acrylamide) grafting, the S/C ratio obtained was very similar, indicating that a similar amount of S was still present in the coating. This verifies that the polymerisation reaction has occurred via the RAFT mechanism, since the acrylamide monomers are added to the polymer chain in such a way to leave the active RAFT group on the terminal end of the polymer chain. Since the intensity of photoelectrons liberated during XPS analysis is attenuated by the presence of an over-layer, the S must be on the end of the polymer chains (i.e. at the extremity of the poly(acrylamide) coating.

TABLE 22

Elemental ratios, determined by XPS analysis of Si-ALAPP, Si-ALAPP-PRAFT and Si-ALAPP-PRAFT-P(ACRYLAMIDE) samples.

| Sample | O/C | N/C | S/C |
| --- | --- | --- | --- |
| Si-ALAPP | 0.036 | 0.176 | 0.000 |
| Si-ALAPP-PRAFT | 0.245 | 0.046 | 0.043 |
| Si-ALAPP-PRAFT-P(ACRYLAMIDE) | 0.252 | 0.114 | 0.047 |

Further evidence that the poly(acrylamide) grafting reaction was successful was obtained from high resolution XPS analysis. For the Si-ALAPP-PRAFT-P(ACRYLAMIDE) sample, high resolution C 1s XPS spectra contained a component due to the presence of amide functionality that was not present in the spectra obtained for the Si-ALAPP-PRAFT samples. It should be noted that the thickness of the poly(acrylamide) graft coating was less than the thickness of the XPS sampling depth which may be due to the slower kinetics of RAFT polymerisation, compared to iniferter (see Example 6).

Example 22

Preparation of Si-ALAPP-HDI-Star-PEG-PI-P(ACRYLAMIDE) Coatings

Part A: Synthesis of 1-((diethylcarbamothioylthio)methyl)benzoic Acid

4-Chloromethylbenzoic acid (4 g, 0.0234 mol, 1.0 equiv.) was dissolved in warm ethanol (20 mL). Diethyldithiocarbamic acid, sodium salt trihydrate (7.92 g, 0.0328 mol, 1.5 equiv.) was also separately dissolved in warm ethanol (20 mL). The solution of the carbamic acid was then added to the solution of the carboxylic acid. The resulting mixture was then stirred at 40-50° C. for 2 h, then stirred overnight at r.t. The reaction mixture was then evaporated to dryness and separated between dichloromethane and brine. The aqueous layer was separated and acidified with conc. HCl to a pH value of 2. The precipitate that formed on acidification was filtered and air-dried to give a white solid, 4.1 g (yield 62%). $^1$H NMR (acetone-d$_6$, 400 MHz) δ 1.26, br.s, 6H, 2×CH$_3$; 3.82, br.s, 2H, CH$_2$N; 4.5, br.s, 2H, CH$_2$N; 4.67, s, 2H, CH$_2$S; 7.56 (d, J=8 Hz, 2H, aromatic); 7.98 (d, J=8 Hz, 2H, aromatic) ppm. $^{13}$C NMR (acetone-d$_6$, 400 MHz) δ 11.78, 12.98, 41.53, 47.55, 50.45, 130.26, 130.45, 130.69, 143.74, 167.40, 194.94 ppm.

Part B: Synthesis of 1-((diethylcarbamothioylthio)methyl)benzoic Acid Chloride 1-((Diethylcarbamothioylthio)methyl)benzoic acid (0.1 g) was refluxed in a solution of thionyl chloride (1 mL, in excess) and dichloromethane (10 mL) for 2 h. The reaction was then evaporated to dryness and the product obtained as a pale yellow liquid (yield 100%). The product was diluted with dichloromethane to a volume of 1.00 mL (standard solution of 0.353 M) for subsequent reaction with OH terminated Star-PEG MW 116,000 (see below). Conversion of the carboxylic acid to the acid chloride was further verified by the observation that the starting material was a white solid, which was partially insoluble in dichloromethane, whilst the product was a pale, yellow liquid which was completely soluble in dichloromethane. $^1$H NMR (CD$_2$Cl$_2$, 400 MHz) δ 1.27-1.29 (br.m, 6H, 2×CH$_3$), 3.76 (br.q, J=7.0 Hz, 2H, CH$_2$N), 4.04 (br.q, J=7.0 Hz, 2H, CH$_2$N), 4.66 (s, 2H, CH$_2$S), 7.53 (d, J=8.4 Hz, 2H, aromatic, 8.04 (d, J=8.4 Hz, 2H, aromatic) ppm. $^{13}$C(CD$_2$Cl$_2$, 400 MHz) δ 11.8, 12.9, 41.3, 47.5, 50.5, 53.5, 53.7, 54.0, 54.3, 54.5, 130.4, 132.0, 132.5, 146.6, 168.4, 194.3 ppm.

Part C: Chemical Modification of OH-Terminated Star-PEG to Incorporate Iniferter Moieties (Star-PEG-PI)

Hydroxy terminated Star-PEG, MW 116,000 (Star-462, 24 arms, Shearwater Polymers, Inc.) (0.5 g, 0.0043 mmol of polymer) was dissolved in dichloromethane (15 mL) under a $N_2$ atmosphere. The resulting solution was cooled in an ice bath and triethylamine (0.0053 g, 12.6 equiv.) was added. Then 1-((diethylcarbamothioylthio)methyl)benzoic acid chloride (160.5 μL of a 0.0353 M solution containing 0.00171 g) was added dropwise to the reaction vessel. The reaction was stirred overnight and evaporated to dryness to give a pale orange powder. This powder was analysed by FTIR and the reaction between the terminal OH groups of the Star-PEG and the acid chloride confirmed by the presence of an ester C═O stretch absorption band (1720 $cm^{-1}$) only in the spectrum of the reaction product. It should be noted that, in terms of the number of moles of hydroxyl groups in the star-PEG, approximately 0.5 equivalents of 1-((diethylcarbamothioylthio)methyl)benzoic acid chloride were added to the reaction mixture, leaving approximately half of the terminal hydroxyl groups available for further reaction (see below).

Part D: Graft Polymerisation of Acrylamide Monomer from Si-ALAPP-HDI-Star-PEG-PI Surfaces (Si-ALAPP-HDI-Star-PEG-PI-P(ACRYLAMIDE))

Silicon wafers (Si) with a size of 1 cm×1 cm were coated with an ALAPP thin film as per Example 15B (Si-ALAPP). Data from XPS analysis of the samples (as elemental ratios) before and after ALAPP deposition are presented in Table 23 for comparative purposes. It should be noted that the Si/C ratio was decreased from 12.10 to 0.00 after surface modification, indicating that the ALAPP thin film was at least as thick as the XPS sampling depth (approx. 10 nm) and that the coating was pin hole free. Nitrogen was present in the thin film (N/C ratio of 0.149) as well as oxygen due to quenching of radicals on removal from the plasma chamber. The O/C ratio was reduced after surface modification due to the small oxygen atomic percentage in the thin film, compared to that present in the native oxide coating on the surface of the Si wafer before modification. The ALAPP thin film was largely carbonaceous in nature and the carbon was mostly aliphatic (inferred from the high resolution C 1s spectrum (see FIG. 21 (a)), in which the major component was centred on a binding energy of 285.0 eV). The nitrogen present in the film was due almost entirely to the presence of surface amine groups. This was inferred from the binding energy of the high resolution N 1s peak (at 399.4 eV) (data not shown).

The next stage in the methodology was to covalently attach molecules with functional groups which could react both with the free amine groups on the Si-ALAPP surface as well as the hydroxyl groups on the iniferter modified Star-PEG (Star-PEG-PI). To this end, the SI-ALAPP samples were placed immediately after production into hexamethylenediisocyanate (HDI, Fluka). The samples were left overnight at room temperature in sealed containers, excluding the presence of water. Subsequently, the samples were washed three times for ten minutes in dry acetonitrile (Merck) and dried under a steam of nitrogen. The elemental ratios determined via XPS analysis of the HDI modified Si-ALAPP substrates (Si-ALAPP-HDI) demonstrated successful covalent coupling of the HDI to the Si-ALAPP surface. For example, a small increase in the N/C ratio (from 0.149 to 0.160) was observed. Due to the presence of only a thin layer of HDI on the surface, almost no change was detected when the XPS C 1s high resolution spectra (see FIGS. 21 (a) and 21 (b)) obtained from the Si-ALAPP and Si-ALAPP-HDI surfaces were compared.

The covalent surface immobilisation of Star-PEG-PI from Part C onto the surface of Si-ALAPP-HDI samples was carried out by incubation of a solution containing the Star-PEG-PI polymer (4 mg/mL) in acetonitrile (Merck) at 45° C. for 16 hours with freshly prepared Si-ALAPP-HDI surfaces. To wash off unbound polymer, samples were subsequently washed with MilliQ™ purified water twice for 1 hour and in addition overnight before drying under a stream of nitrogen.

The elemental ratios calculated from the elemental composition, obtained via XPS analysis, of the Si-ALAPP-HDI-Star-PEG-PI surface (Table 23) illustrate a significant increase in the O/C ratio (from 0.155 to 0.222) and a significant decrease in the N/C ratio (0.160 to 0.108) compared to the Si-ALAPP-HDI surface, indicating the successful surface immobilisation of the Star-PEG-PI polymer. Further evidence that (i) the Star-PEG was indeed chemically functionalised with iniferter moieties and (ii) that the Star-PEG-PI was covalently immobilised on the surface of the Si-ALAPP-HDI samples was given by the presence of S on the surface after immobilisation of the Star-PEG-PI (S/C ratio of 0.003).

TABLE 23

Elemental ratios, calculated from atomic compositions as determined via XPS analysis, before and after surface modification of silicon wafer samples by ALAPP thin film deposition.

| Sample | O/C | N/C | Si/C | S/C |
|---|---|---|---|---|
| Si | 2.33 | 0.000 | 12.10 | 0.000 |
| Si-ALAPP | 0.142 | 0.149 | 0.000 | 0.000 |
| SI-ALAPP-HDI | 0.155 | 0.160 | 0.000 | 0.000 |
| Si-ALAPP-HDI-Star-PEG-PI | 0.222 | 0.108 | 0.000 | 0.003 |
| Si-ALAPP-HDI-Star-PEG-PI-P(ACRYLAMIDE) | 0.296 | 0.169 | 0.000 | 0.000 |

A representative high resolution C 1s spectrum obtained from the surface of the Si-ALAPP-HDI-Star-PEG-PI sample also confirmed the covalent immobilisation of the Star-PEG-PI polymer onto the surface of the Si-ALAPP-HDI sample (FIG. 21 (c)), demonstrating in particular a significant increase in the C—O component (binding energy of 286.5 eV).

Si-ALAPP-HDI-Star-PEG-PI samples from above were then transferred into a custom designed stainless steel cell sealed with an o-ring and fitted with a quartz glass top. The chamber was filled with a 5% (w/v) solution of acrylamide (AAM) in Milli-Q™ water. The monomer solution was then purged with nitrogen gas for 15 minutes in order to remove dissolved oxygen from the solution and the inlet and outlet valves closed. The samples within the cell were then exposed to UV irradiation (320-500 nm wavelength; 50 $mWcm^{-2}$ intensity) for 30 minutes. After this time samples were removed from the cell and washed three times in Milli-Q™ water and finally in Milli-Q™ water overnight to remove non-bound polymer and residual monomer before drying with a nitrogen stream prior to XPS analysis.

In Table 23 are also presented the elemental ratios calculated from the surface composition of the S-ALAPP-HDI-Star-PEG-PI-P(ACRYLAMIDE) samples obtained via XPS analysis. After graft polymerisation of P(ACRYLAMIDE) from the surface of the Si-ALA-HDI-Star-PEG-PI samples, the N/C ratio was increased (from 0.108 to 0.169) and the O/C ratio was also increased (from 0.222 to 0.296), indicating successful graft polymerisation. Further evidence was also obtained from high resolution C 1s XPS spectra (see FIG. 21 (d)). Here, the presence of a P(ACRYLAMIDE) graft layer was indicated by the reduction of the intensity of the C—O peak (binding energy 286.5 eV) as well as the presence of a peak corresponding to amides (binding energy 288 eV) that was not present before the graft polymerisation reaction.

Example 23

Preparation of Si-ALAPP-PI-P(CLICK-MA) Coatings

Part A: Synthesis of 4-(2-(Methacryloyloxy)ethoxy)-4-oxobutanoic Acid

2-Hydroxyethyl methacrylate (25 g, 0.195 mol) and succinic anhydride (19.5 g, 0.195 mol) were added to dichloromethane (200 mL) under nitrogen. Triethylamine (28.5 ml, 20.72 g, 1.05 equiv.) was then added dropwise over 20 minutes and the reaction mixture was refluxed for 1.5 hours. The reaction mixture was then diluted with dichloromethane (200 mL), washed with 2 M HCl (150 mL) and then finally with brine (100 mL). The organic phase was separated from the aqueous phase, dried ($MgSO_4$ and $Na_2SO_4$) and evaporated to dryness, yielding a viscous, colourless liquid (34.9 g, 77.8% yield). $^1$H NMR (1.89 (s, 3H, $CH_3$), 2.59-2.67 (m, 4H, 2×$CH_2$CO), 4.31 (br.s, 4H, 2×$CH_2$OCO), 5.55 (s, 1H, vinyl CH), 6.08 (s, 1H, vinyl CH). $^{13}$C NMR δ 17.96, 28.64, 28.73, 62.15, 62.29, 126.12, 135.79, 167.11, 171.90, 177.73.

Part B: Synthesis of 2-(Methacryloyloxy)ethyl 4-Chloro-4-oxobutanoate

This oil product obtained in Part A above (4-(2-(methacryloyloxy)ethoxy)-4-oxobutanoic acid) was refluxed with thionyl chloride (54 g, 33 mL, 0.454 mol., 3 equiv.) in dichloromethane (200 mL) for 2 h. The reaction mixture was evaporated to dryness to yield a clear, pale yellow liquid (37.5 g, 99.6% yield). $^1$H NMR δ1.92 (s, 3H, $CH_3$), 2.68 (t, J=6.6 Hz, 2H, $CH_2$COO), 3.20 (t, J=6.6 Hz, 2H, $CH_2$COCl), 4.33 (br.s, 4H, 2×$CH_2$O), 5.58 (s, 1H, vinyl CH), 6.10 (s, 1H, vinyl CH). $^{13}$C NMR δ 18.12, 29.16, 41.60, 62.11, 62.74, 126.06, 135.79, 166.96, 170.59, 172.82 ppm.

Part C: Synthesis of 2-(Methacryloyloxy)ethyl Prop-2-ynyl Succinate (Click-MA)

Propargyl alcohol (0.903 g, 1.0 equiv., 0.937 mL) was dissolved in dichloromethane (30 mL). Triethylamine (1.795 g, 1.1 equiv., 2.47 mL) was then added to the solution. The solution was cooled to <0° C. and 2-(methacryloyloxy)ethyl 4-chloro-4-oxobutanoate (4.0 g, 0.01613 mol, 1 equiv.) in $CH_2Cl_2$ (10 mL) was then added dropwise to the solution. The reaction mixture was stirred overnight at room temperature and the progress of the reaction was monitored using thin layer chromatography. The crude reaction mixture obtained was then filtered and the filtrate was evaporated to dryness. The resulting dark yellow oil was dissolved in $CH_2Cl_2$, washed with water (2×20 mL), diluted HCl (2×20 mL), and brine (2×20 mL), dried ($Na_2SO_4$) and evaporated to dryness to give a clear colourless oil. This oil was further purified via radial chromatography (silica) to give the desired product as a clear, colourless oil (2.5 g). $^1$H NMR δ 1.91 (s, 3H, $CH_3$), 2.46 (t, J=2.4 Hz, 1H, alkyne CH), 2.65 (s, 4H, 2×($CH_2$CO), 4.32 (s, 4H, 2×$CH_2$OCO), 4.66 (d, J=2.4 Hz, 2H, $OCH_2$CCH), 5.56 (br.s, 1H, vinyl CH), 6.09 (s, 1H, vinyl CH). $^{13}$C NMR δ 18.19, 28.76, 28.78, 52.16, 62.26, 62.41, 74.99, 77.40, 126.01, 135.87, 167.02, 171.31, 171.74 ppm.

Part D: Synthesis of Trifluoro-4-(azidomethyl)benzoate (TFAB)

Trifluoroethanol (1.01 g, 0.72 mL, 0.010 mol, 1 equiv.) was dissolved in dichloromethane (20 mL) under a $N_2$ atmosphere. The solution was cooled to 0° C. and triethyl amine (1.07 g, 1.48 mL) was added. 4-(Chloromethyl)benzoyl chloride (2.0 g, 0.0106 mol, 1.05 equiv.) in dichloromethane (10 mL) was then added dropwise and the reaction was stirred overnight. The reaction mixture was then washed with water (20 mL) and brine (20 mL). The organic layer was separated, dried ($MgSO_4$) and evaporated to dryness to give a white solid (2.40 g) which was determined to be 95% pure by $^1$H NMR. $^1$H NMR ($CDCl_3$, 400 MHz) δ4.62 (s, 2H, $CH_2$Cl), 4.70 (q, J=8.4 Hz, 2H, $CH_2$O), 7.50 (d, J=8.4 Hz, 2H, aromatic), 8.07 (d, J=8.4 Hz, 2H, aromatic) ppm. $^{13}$C NMR ($CDCl_3$, 400 MHz) δ45.41 ($CH_2$Cl), 61.12 (q, $J_{CF}$=37.23 Hz, $CH_2$O), 123.33 (q, $J_{CF}$=276.72 Hz, $CF_3$), 128.57 (aromatic), 128.94 (aromatic), 130.70 (aromatic), 143.59 (aromatic), 164.68 (—COO—) ppm.

The white solid obtained above was dissolved in DMSO (30 mL) and KI (0.005 g) was added. The reaction was stirred at r.t. and sodium azide (2.18 g, 0.0336 mol) was added portion-wise. The reaction was then stirred overnight. The reaction was worked up by the addition of water (200 mL). The organic components were extracted with dichloromethane (3×50 mL), dried ($MgSO_4$) and the solvent was evaporated to give a clear colourless oil. This oil was further purified by radial chromatography (silica gel, pet. spirit: dichloromethane, 1:1) to yield a clear colourless oil. This oil was finally purified via radial chromatography (solvent gradient, starting with petroleum spirit 40-60°:dichloromethane, 1:1 and finishing with dichloromethane (100%). The product obtained was a clear colourless liquid (2.05 g). $^1$H NMR ($CDCl_3$, 400 MHz) δ4.44 (s, 2H, $CH_2N_3$), 4.71 (q, J=8.4 Hz, 2H, $CH_2$O), 7.43 (d, J=8.4 Hz, 2H, aromatic), 8.10 (d, J=8.4 Hz, 2H, aromatic). $^{13}$C NMR ($CDCl_3$, 400 MHz) δ54.16 (—$CH_2N_3$), 60.83 (q, $J_{CF}$=36.74, —$CH_2$O—), 123.04 (q, $J_{CF}$=277.31, —$CF_3$), 128.06 (aromatic), 128.24 (aromatic), 130.52 (aromatic), 141.82 (aromatic), 164.74 (—COO—) ppm.

Part E: Graft Polymerisation of Click-MA Monomer from Si-ALAPP-PI Surfaces (Si-ALAPP-PI-P(Click-MA))

Si-ALAPP-PI surfaces with a size of 1 cm×1 cm were prepared as per Example 15. Freshly prepared Si-ALAPP-PI samples were transferred into a custom designed stainless steel cell sealed with an o-ring and fitted with a quartz glass top. The chamber was filled with a 10% (w/v) solution of the Click-MA monomer in dimethylsulfoxide (DMSO). The monomer solution was then purged with nitrogen gas for 15 minutes in order to remove dissolved oxygen from the solution and the inlet and outlet valves were closed. The samples within the cell were then exposed to UV irradiation (320-500 nm wavelength; 50 mWcm$^{-2}$ intensity) for 30 minutes. After this time samples were removed from the cell and washed three times in DMSO, followed by washing twice with Milli-Q™ water and finally in Milli-Q™ water overnight to remove non-bound polymer and residual monomer before drying with a nitrogen stream.

The elemental ratios calculated from the elemental composition, obtained via XPS analysis, of the Si-ALAPP-PI-P (Click-MA) surface (Table 24) illustrate a significant increase in the O/C ratio (from 0.161 to 0.390) and a significant decrease in the N/C ratio (0.133 to 0.034) compared to the Si-ALAPP-PI surface, indicating successful graft polymerisation of the Click-MA monomer.

Figure 22A:
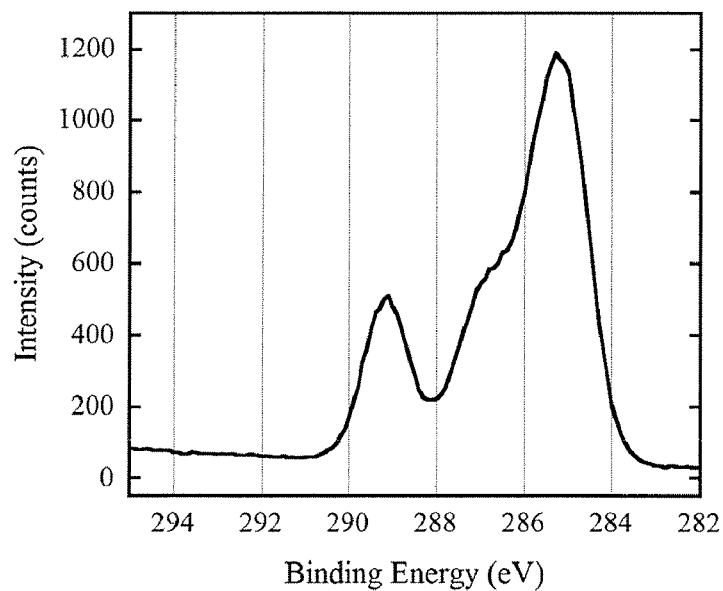
FIG. 22: Representative high resolution C 1s spectra obtained from the surfaces of (a) Si-ALAPP-PI-P(Click-MA) and (b) Si-ALAPP-PI-P(Click-MA)-TFAB samples.
Figure 22B:
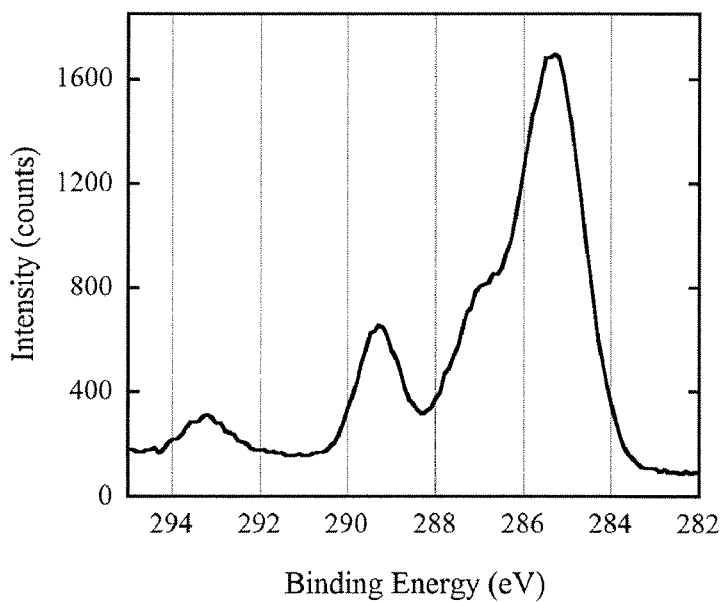

Further evidence for the successful graft polymerisation of the Click-MA monomer was obtained from high resolution C 1s XPS spectra (see FIG. 22 (*a*)). Here, the presence of the graft polymer layer was indicated by the presence of a C—O peak (binding energy 286.7 eV) as well as an O—C=O (ester) peak (binding energy 289.1 eV), both of which were not present before the graft polymerisation reaction.

TABLE 24

Elemental ratios, calculated from atomic compositions as determined via XPS analysis.

| Sample | O/C | N/C | S/C | F/C |
|---|---|---|---|---|
| SI-ALAPP-PI | 0.161 | 0.133 | 0.007 | 0.000 |
| Si-ALAPP-PI-P(Click-MA) | 0.390 | 0.034 | 0.000 | 0.000 |
| Si-ALAPP-PI-P(Click-MA)-TFAB | 0.371 | 0.105 | 0.000 | 0.118 |

Part F: Surface Immobilisation of TFAB on Si-ALAPP-PI-P(Click-MA) Surfaces (Si-ALAPP-PI-P(Click-MA)-TFAB)

Fresh Si-ALAPP-PI-P(Click-MA)) samples were prepared as described above. The samples were immersed in a 4:1 (v/v) Milli-Q™ water:DMSO solution containing sodium ascorbate (40 mM), copper (II) sulphate (20 mM) as well as trifluoro-4-(azidomethyl)benzoate (TFAB). After purging of the solution with nitrogen gas for 15 minutes in order to remove dissolved oxygen, the reaction vessel was sealed and incubated for 48 hours at a temperature of 50° C. in the dark. Following the reaction, samples were washed three times for 2 hours each in a 4:1 (v/v) Milli-Q™ water:DMSO solution, twice with Milli-Q™ water for 30 minutes and finally in Milli-Q™ water overnight before drying with a nitrogen stream.

The elemental ratios calculated from the elemental composition, obtained via XPS analysis, of the Si-ALAPP-PI-P(Click-MA)-TFAB surface (Table 24) clearly illustrate the successful copper-mediated 1,3-dipolar cycloaddition of the terminal alkyne on the surface with the azide group of the trifluoro-4-(azidomethyl)benzoate in solution. The successful reaction is illustrated by the significant increase in the N/C ratio (from 0.034 to 0.105) and a significant increase in the F/C ratio (0.000 to 0.118) compared to the Si-ALAPP-PI-P(Click-MA) surface.

Further evidence for the successful cycloaddition reaction was obtained from high resolution C 1s XPS spectra (see FIG. 22 (b)). Due to the fact that the trifluoro group of the surface immobilised TFAB appears at a high binding energy, this group is clearly visible in XPS C1s high resolution spectra and can be used as a label to analyse surface immobilisation reactions. Here, the surface immobilisation of the TFAB label was clearly indicated by the presence of the $CF_3$ peak (binding energy 293.2 eV), which was not present before the immobilisation reaction.

Example 24

Graft Polymerisation of PEGMA (475) from Masked and Unmasked Si-ALAPP-PI Surfaces Part A: Graft Polymerisation of PEGMA (475) from Masked and Unmasked SI-ALAPP-PI Surfaces Si-ALAPP surfaces were prepared as per Example 15 and covalent coupling of the PI copolymer onto the Si-ALAPP surfaces was carried out as per Example 4. However, in this example, clean glass microscope slides were used as substrates instead of silicon wafer pieces. In short, six ALAPP treated glass microscope slides were placed in a solution comprising 9 mL of the PI solution (see Example 3), DMF (27 mL), MilliQ™ purified $H_2O$ (4.5 mL) and N-(3-dimethylaminopropyl)-N-ethylcarbodiimide hydrochloride (EDC, 0.45 g, Sigma). The reaction was allowed to proceed overnight at room temperature, following which the glass microscope slides were washed in DMF (twice over a day followed by an overnight wash) and purified water (three times over one day) before drying in a laminar flow cabinet.

Figure 23:
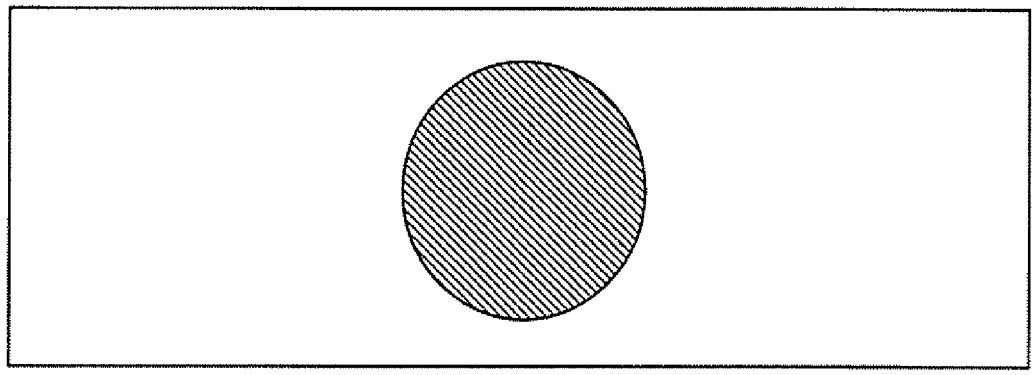
FIG. 23: Schematic indicating position of PTFE circular mask (hatched circle) on Si-ALAPP-PI coated glass microscope slides.

The Si-ALAPP-PI slides prepared above were then placed in a custom designed stainless steel cell fitted with an o-ring sealed quartz glass top. To this cell was added monomer solution (de-inhibited PEGMA (475), 10% w/v) which had been degassed with Nitrogen for 30 mins. In the centre of each microscope slide was then placed a clean, PTFE (18 mm diameter) circular mask (suitable for preventing UV irradiation of the underlying surface) as indicated in FIG. 23. The cell was then sealed and the samples exposed to UV radiation (320-500 nm wavelength; 50 mWcm$^{-2}$ intensity) for 30 minutes using an EXFO Articure 400 lamp. Following irradiation, the samples were removed, washed copiously with MilliQ™ purified water, soaked for two days in MilliQ™ purified water with intermittent changes and finally rinsed again with MilliQ™ purified water. The samples were then dried in a laminar flow cabinet before XPS analysis.

Presented in Table 25 are the elemental ratios determined via XPS analysis of regions directly under the circular PTFE mask as well as that obtained from regions surrounding the circular PTFE mask. It is clear from this data that the elemental ratios obtained were very different in the two areas (i.e. O/C, 0.202 versus 0.447: N/C, 0.122 versus 0.013 for under and surrounding the mask respectively). In addition it can be seen that the elemental ratios obtained for the regions under and surrounding the mask were very similar to those obtained for the Si-ALAPP-PI (from Example 15) and Si-HAPP-PI-P(PEGMA (475)) (from Example 5) samples, as expected.

TABLE 25

Elemental ratios, determined by XPS analysis of Si-ALAPP-PI (from Example 15), Si-HAPP-PI-P(PEGMA (475)), the region underneath the PTFE hemispherical mask and the regions surrounding the PTFE hemispherical mask.

| Sample | O/C | N/C | S/C |
|---|---|---|---|
| Under Mask | 0.202 | 0.122 | 0.004 |
| Si-HAPP-PI-(P(PEGMA (475)) (from Example 5) | 0.476 | 0.001 | 0.000 |
| Around Mask | 0.447 | 0.013 | 0.000 |

Figure 24A:
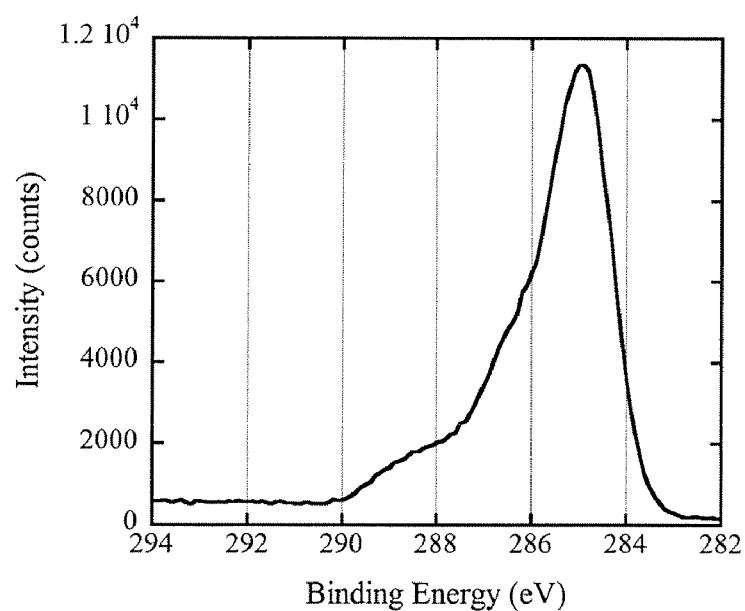
FIG. 24 (a): High resolution C1s XPS spectrum obtained from region under PTFE hemisphere and (b): High resolution C1s XPS spectrum obtained from region surrounding PTFE hemisphere.
Figure 24B:
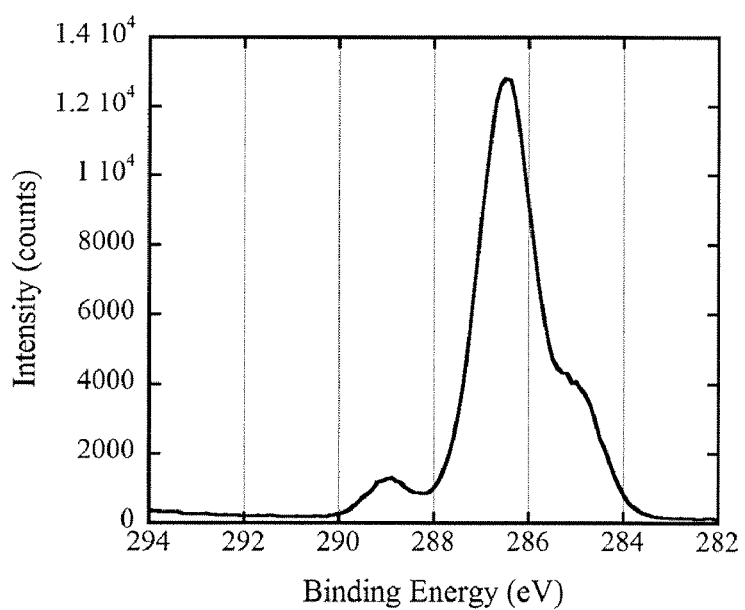

Thus it can be concluded that graft polymerisation of P(PEGMA (475)) from the Si-ALAPP-PI surface occurred only in the regions surrounding the PTFE mask. It may be further concluded that UV irradiation was required for graft polymerisation to occur, verifying that the presence of iniferter groups on the PI copolymer covalently attached to the Si-ALAPP surface were responsible for initiating the graft polymerisation reaction. Further evidence that graft polymerisation occurred only in these regions was obtained from high resolution XPS analysis in the two different areas of the sample. Presented in FIGS. 24 (a) and (b) are high resolution C 1s spectra obtained from regions underneath and surrounding the hemispherical PTFE mask respectively. It may be readily observed from comparison of the C 1s profiles obtained, that they are very different. In particular, the spectra from regions surrounding the mask were dominated by a spectral contribution at a binding energy of 286.5 eV, which corresponds to the presence of a high proportion of C—O functionality (i.e. ethers from the P(PEGMA (475)) graft polymerisation coating. On the other hand, the spectra obtained from the area underneath the mask were dominated by spectral contributions centred on a binding energy of 285.0 eV, which arise mainly from the hydrocarbon content of the ALAPP coating.

Part B: Determination of Differences in HeLa Cell Attachment in Regions of Masked and Unmasked Si-ALAPP-PI-P(PEGMA (475)) Surfaces Graft polymer coated glass slides (Si-ALAPP-PI-P (PEGMA (475))) containing both masked and unmasked regions were transferred to 4-chamber culture trays (Nunc, Roskilde, Denmark) and each slide soaked in a sterile solution of phosphate buffered saline (PBS, pH7.4) containing penicillin and streptomycin (120 μg/mL and 200 μg/mL, respectively) for four hours at room temperature.

The sterilizing solution from the step above was removed and HeLa cells were seeded at a density of $1 \times 10^6$ cells/chamber in a culture medium composed of Dulbecco's Modified Eagles Medium/Ham's F12 (DMEM/F12, 50:50) supplemented with 10% (v/v) foetal bovine serum (FBS). Cells were incubated for 24 hours at 37° C. in humidified air containing 5% $CO_2$.

HeLa cells were viewed after 18 and 24 hours incubation by phase contrast microscopy (Olympus IX81, Olympus, Japan) and representative images recorded digitally.

Figure 25:
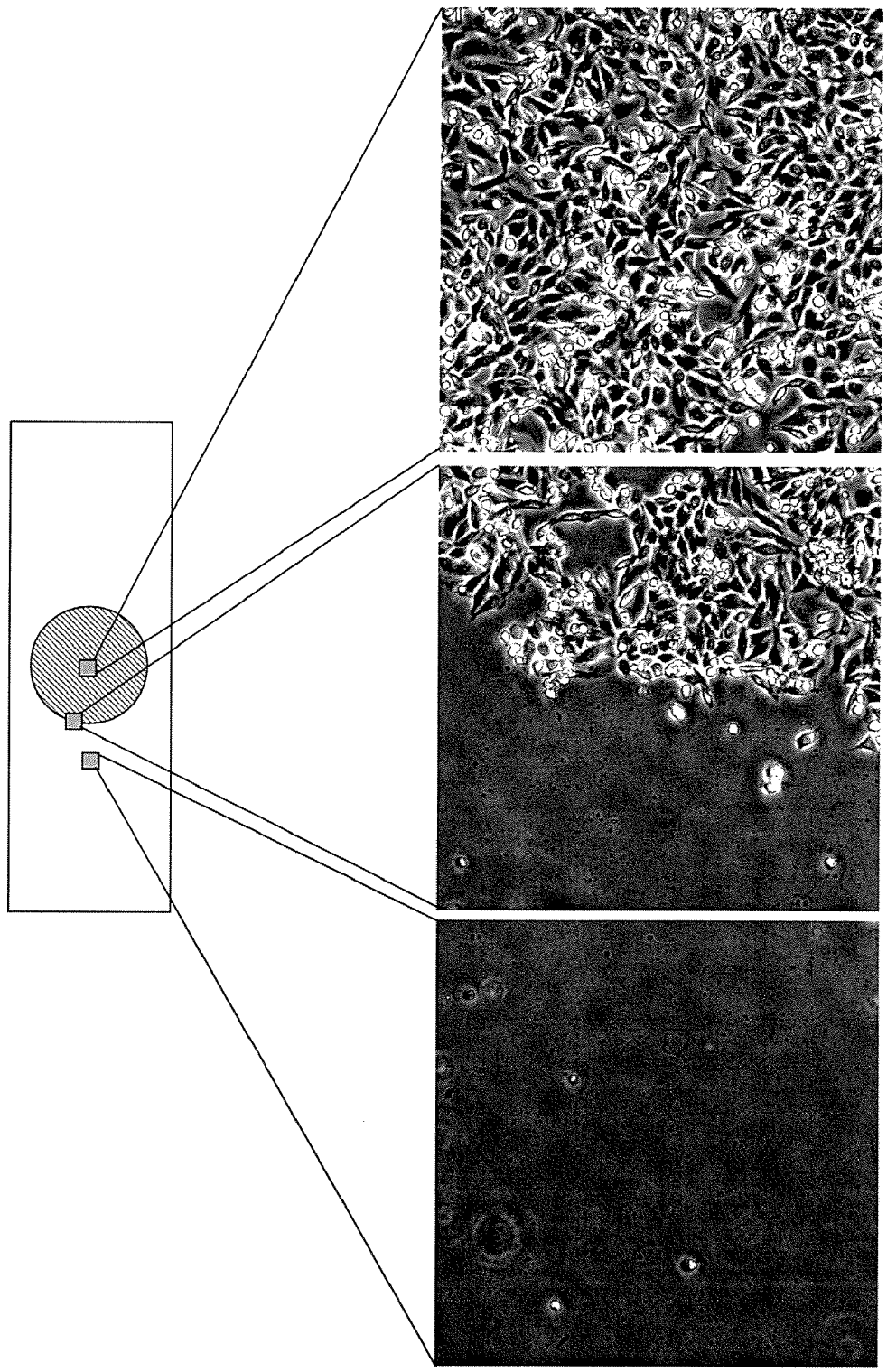
FIG. 25: Representative fields (4× objective magnification) showing HeLa cell attachment to (▨) masked and (□) unmasked areas during graft polymerisation of P(PEGMA (475)) from the surface of a Si-ALAPP-PI coated glass slide. Grey squares indicate region of image compared to the entire slide.

Presented in FIG. 25 are representative fields demonstrating cell HeLa cell attachment after 18 hours cell culture in a region (a) underneath the circular PTFE mask and (b) from a region surrounding the mask. It is clear from these images that there was a high cell attachment density in the region of the glass slide which was masked during the graft polymerisation of P(PEGMA (475) and a very low cell attachment in the area which was not masked during the graft polymerisation reaction. The cell attachment and morphology in the masked region was very similar to that obtained with TCPS controls (see Figure W (d)—Gradient Graft Polymer Example 29)

Recall that in part A it was demonstrated, via XPS analysis of the various regions, that the surface underneath the mask during graft polymerisation was very similar composition and high resolution C 1s spectrum to a Si-ALAPP-PI surface, and that the composition and high resolution C 1s spectra of the areas surrounding the mask during graft polymerisation was most similar to a Si-ALAPP-P(PEGMA (475)) surface. In addition, it has been previously demonstrated, in Example 9, that HeLa cells attached and spread readily on a Si-HAPP-PI surface and did not attach or spread on a Si-HAPP-PI-P (PEGMA (475)) graft polymer surface. Thus, one can conclude that the HeLa cells attach and spread in the masked area due to the lack of a graft P(PEGMA (475)) coating and do not attach and spread in the unmasked areas due to the presence of a thick (~10 nm in the dry state) graft P(PEGMA (475)) coating.

Example 25

Preparation of Si-ALAPP-PI-P(ACRYLAMIDE-co-ACRYLIC Acid) Copolymer Coatings and Incorporation of Cross-Links in Coating Si-ALAPP surfaces were prepared as per Example 15 and covalent coupling of the PI copolymer onto the Si-ALAPP surfaces was carried out as per Example 4. ALAPP coated silicon wafer pieces (1×1 cm) were placed in a solution comprising 6 mL of the PI solution (see Example 3), DMF (18 mL), MilliQ™ purified $H_2O$ (3 mL) and N-(3-dimethylaminopropyl)-N-ethylcarbodiimide hydrochloride (EDC, 0.30 g, Sigma). The reaction was allowed to proceed overnight at room temperature, following which the silicon wafer pieces were washed in DMF (twice over a day followed by an overnight wash) and purified water (three times over one day) before drying in a laminar flow cabinet.

The Si-ALAPP-PI samples prepared above were then placed in a custom designed stainless steel cell fitted with an o-ring sealed quartz glass top. To this cell was added a solution of monomers (acrylamide and acrylic acid, 5% w/v in total, molar ratio acrylamide:acrylic acid 90:10). The monomer solutions were then de-oxygenated with Nitrogen gas for 15 minutes, the inlet and outlet valves were closed and UV irradiation of the samples was carried out for fifteen minutes (320-500 nm wavelength; 50 mWcm$^{-2}$) using an EXFO Articure 400 lamp. After irradiation, the samples were removed, washed copiously with MilliQ™ purified water, soaked for two days in MilliQ™ purified water with intermittent changes and finally rinsed again with MilliQ™ purified water. A portion of the Si-ALAPPi-PI-P(ACRYLAMIDE-co-ACRYLIC ACID) samples were further reacted with hexamethylene diisocyanate (HDI) (Fluka), in order to form cross links between the graft copolymer chains. The samples from above (Si-ALAPP-PI-P(ACRYLAMIDE-co-ACRYLIC ACID)) were exchanged into dry DMF (final volume 1 mL per sample), HDI added (0.5 mL) and the reaction allowed to proceed overnight at 45° C. The samples to which HDI had been added were then washed in DMF (×3) and then soaked for 8 hours in DMF with occasional agitation. Finally the samples were washed copiously in water. The samples were then dried in a laminar flow cabinet before XPS analysis.

TABLE 26

Elemental ratios, determined by XPS analysis of Si-ALAPP-PI, Si-ALAPP-PI-P(ACRYLAMIDE-co-ACRYLIC ACID) and Si-ALAPP-PI-P(ACRYLAMIDE-co-ACRYLIC ACID)-HDI samples.

| Sample | O/C | N/C | S/C |
| --- | --- | --- | --- |
| Si-ALAPP-PI | 0.158 | 0.132 | 0.004 |
| Si-ALAPP-PI-P(ACRYLAMIDE-co-ACRYLIC ACID) | 0.284 | 0.251 | 0.000 |
| Si-ALAPP-PI-P(ACRYLAMIDE-co-ACRYLIC ACID)-HDI | 0.280 | 0.275 | 0.000 |

Figure 26A:
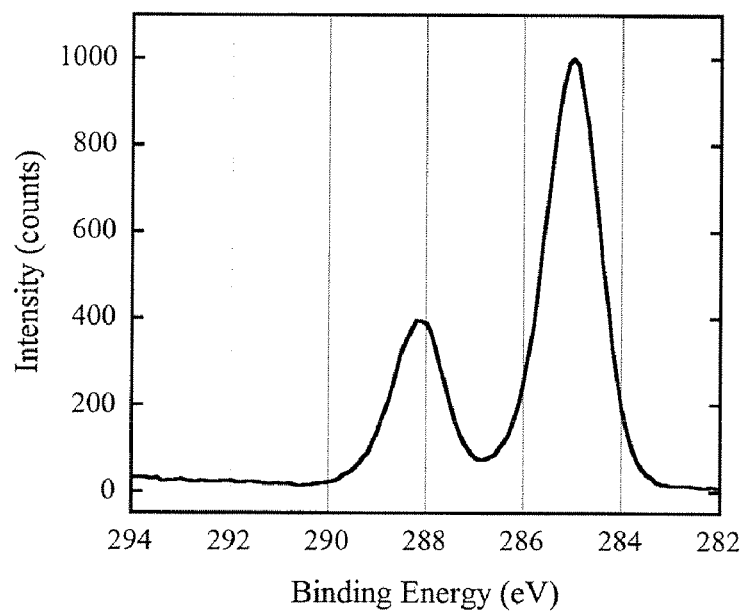
FIG. 26: High resolution C 1s XPS spectra obtained from the surface of (a) Si-ALAPP-PI-P(ACRYLAMIDE-co-ACRYLIC ACID) and (b) Si-ALAPP-PI-P(ACRYLAMIDE-co-ACRYLIC ACID)-HDI samples.
Figure 26B:
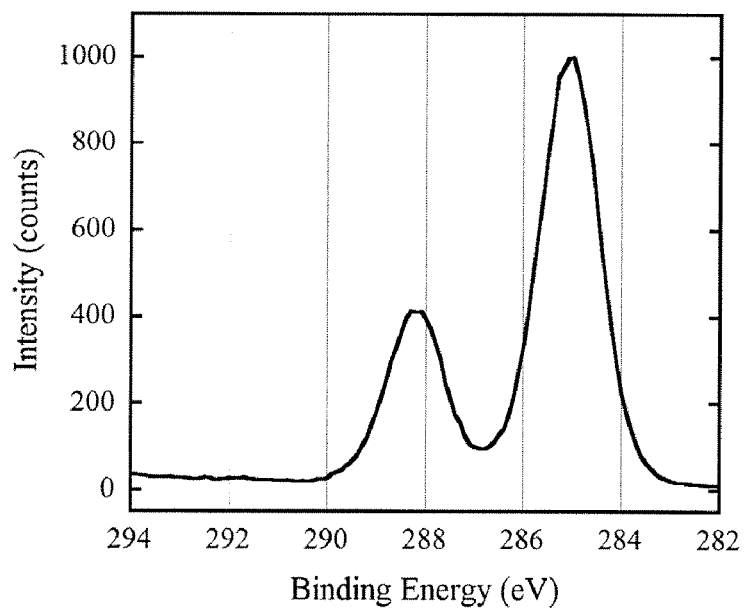

Presented in Table 26 are the elemental ratios determined via XPS analysis of Si-ALAPP-PI, Si-ALAPP-PI-P(ACRYLAMIDE-co-ACRYLIC ACID) and Si-ALAPP-PI-P (ACRYLAMIDE-co-ACRYLIC ACID)-HDI. Analysis of the elemental ratios allowed confirmation that the graft copolymerisation of P(ACRYLAMIDE-co-ACRYLIC ACID) from the surface of the Si-ALAPP-PI samples was successful. Increased O/C and N/C values (0.284 and 0.251 respectively) were obtained for the Si-ALAPP-PI-P(ACRYLAMIDE-co-ACRYLIC ACID) samples compared to the values obtained for the Si-ALAPP-PI samples (O/C 0.158, N/C 0.132). Further evidence of successful graft polymerisation was obtained from analysis of high resolution C 1s XPS spectra. In this case, a spectral component due to the presence of amide functionality was observed (see FIG. 26 (a)) which was not present on the Si-ALAPP-PI samples (refer to FIG. 13 for a representative high resolution C 1 s XPS spectrum for Si-ALAPP-PI sample). After addition of HDI to the Si-ALAPP- PI-P(ACRYLAMIDE-co-ACRYLIC ACID) samples, a small increase in the N/C ratio was noted (a value of 0.275, compared to the value obtained before addition of HDI, i.e. a value of 0.251). This observed increase is consistent with the addition of N to the coating from reaction of the isocyanate groups of the HDI with the acid groups of the acrylic acid residues in the graft copolymer chains. A small decrease in the O/C ratio was also noted, consistent with incorporation of additional neutral carbon (from the hexamethylene chains of the HDI) into the coating. The high resolution C 1s spectrum obtained for the Si-ALAPP-PI-P(ACRYLAMIDE-co-ACRYLIC ACID)-HDI sample was very similar to that obtained for the Si-ALAPP-PI-P(ACRYLAMIDE-co-ACRYLIC ACID) as only amides and hydrocarbon were incorporated into the coating after cross linking with HDI, both of which were present in the coating beforehand.

Example 26

Preparation of Si-ALAPP-PI-P(PEGMA (475)-co-OLIGOPEPTIDE) Graft Coatings Formed Using an Oligopeptide Monomer Part A: Synthesis of an Oligopeptide Monomer (Methacryloyl-glygly or MA-glygly)

A polymerisable oligopeptide was synthesised using the method of Drobnik, et al. (Drobnik, J. et al., *Makromol. Chem.*, 1976, 177, 2833). In short, sodium hydroxide (0.1515 g, 0.0038 mol, 1.0 equiv.) was added to a solution of glycylglycine (glygly), (0.50 g, 0.0038 mol, 1.0 equiv.) in water (3 mL). The resulting solution was cooled to 0° C. Methacryloyl chloride (0.396 g, 0.0038 mol, 1.0 equiv.) and sodium hydroxide (0.1515 g, 0.0038 mol, 1.0 equiv., in 3 mL water) were then added dropwise, simultaneously to the cooled solution. The reaction mixture was stirred at room temperature for an additional hour and then acidified dropwise with conc. HCl to a pH value of 2. Ethyl acetate (20 mL) and water (10 mL) were added and the mixture was shaken in a separating funnel. Colourless crystals precipitated from solution at the interface of the two phases in the separating funnel. These crystals were filtered, washed with water and air-dried. A small amount of the desired product (0.06 g) was obtained (yield 8%). The unreacted glycylglycine was recovered from the aqueous phase. $^1$H NMR (DMSO-$d_6$, 200 MHz) $\delta$1.86 (s, 3H, $CH_3$,), 3.73 (s, 2H, $CH_2$), 3.76 (s, 2H, $CH_2$), 5.36 (s, 1H, vinyl CH), 5.72 (s, 1H, vinyl CH), 8.05-8.17 (br.s, 2H, 2×NH), 12.53 (br.s, 1H, COOH) ppm. $^{13}$C (DMSO-$d_6$, 200 MHz) $\delta$18.97, 41.04, 42.56, 120.15, 139.89, 168.00, 169.77, 171.58 ppm.

Part B: Graft Polymerisation of P(PEGMA (475)-co-methacryloyl-glygly) Copolmer Coatings from Si-ALAPP-PI Surfaces (Si-ALAPP-PI-P(PEGMA (475)-co-MA-glygly)

Si-ALAPP surfaces were prepared as per Example 15 and covalent coupling of the PI copolymer was carried out as per Example 4. The resulting Si-ALAPP-PI surfaces were then transferred into a custom designed stainless steel cell fitted with an o-ring sealed quartz glass top. To the chamber was added a solution containing 42 mg of MA-glygly, 900 mg of de-inhibited PEGMA (475), 10 mL of purified water and 1 mL of DMF with a resulting monomer molar ratio of 10:90 MA-glygly:PEGMA (475). The PEGMA (475) monomer was de-inhibited via passage through a column containing Inhibitor Remover resin (Aldrich) before making up the monomer solution and addition to the UV polymerisation cell. The monomer solution was purged with high purity nitrogen gas for 15 minutes to remove dissolved oxygen. After purging, the inlet and outlet valves were closed and the samples were exposed to UV irradiation (320-500 nm wavelength; 50 mWcm$^{-2}$ intensity) for 30 minutes using an EXFO Articure 400 lamp. Following irradiation, the samples were removed from the monomer solution and washed with purified water (3×), soaked overnight in water and finally rinsed an additional three times. After washing, the samples were blown dry using a high velocity, filtered, high purity $N_2$ stream and stored in a laminar flow cabinet prior to XPS analysis. In addition, control samples of Si-ALAPP-PI-P (PEGMA (475)) were prepared as above, i.e. without the MA-glygly monomer.

TABLE 27

Elemental ratios, determined by XPS analysis of Si-ALAPP-PI, Si-ALAPP-PI-P(PEGMA (475)-co-MA-glygly) and Si-ALAPP-PI-P(PEGMA (475)).

| Sample | O/C | N/C | S/C |
|---|---|---|---|
| Si-ALAPP-PI | 0.158 | 0.132 | 0.004 |
| Si-ALAPP-PI-P(PEGMA (475)-co-MA-glygly) | 0.472 | 0.009 | 0.000 |
| Si-ALAPP-PI-P(PEGMA (475)) | 0.470 | 0.000 | 0.000 |

Figure 27A:
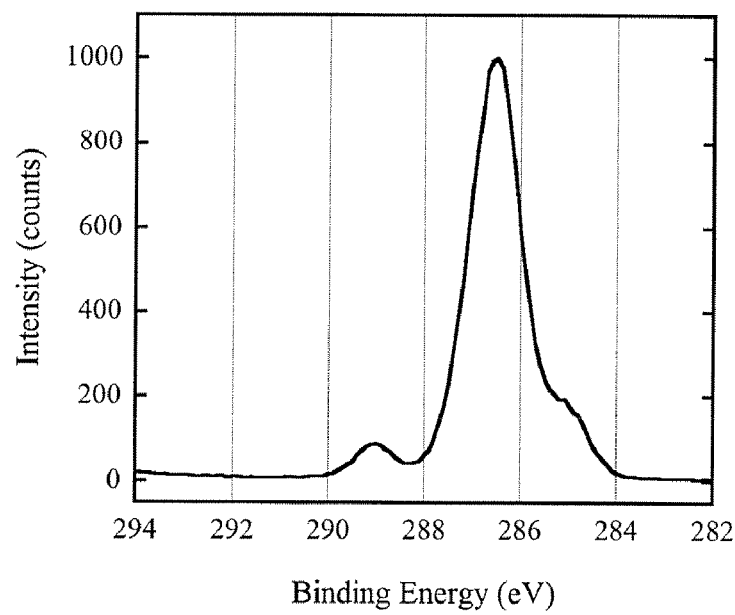
FIG. 27: Representative high resolution C 1s XPS spectra from the surface of (a) Si-ALAPP-PI-P(PEGMA (475)) and (b) Si-ALAPP-PI-P(PEGMA (475)-co-MA-GlyGly) samples.
Figure 27B:
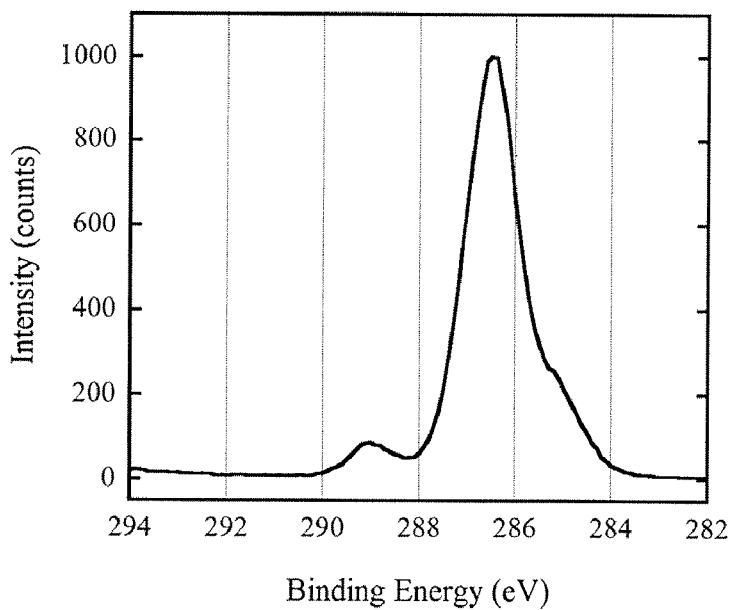

Analysis of the elemental ratios presented in Table 27 allowed confirmation that both graft polymerisations were successful. In the case of the Si-ALAPP-PI-P(PEGMA (475)) control samples, the O/C and N/C ratios obtained were very similar to those obtained in other examples (e.g. see Example 5), indicating a graft polymer coating that was greater than the XPS sampling depth in the dry state. In addition, the high resolution C 1s XPS spectra obtained (see FIG. 27 (*a*) were very similar to those obtained previously and were indicative of a P(PEGMA (475)) coating of greater than 10 nm thickness (in the dry state). In particular the dominant spectral component at a binding energy of 286.5 eV was indicative of a coating containing a high proportion of C—O. The elemental ratios obtained for the Si-ALAPP-PI-P (PEGMA (475)-co-MA-glygly) graft copolymer coated sample were different to those obtained for the P(PEGMA (475)) graft homopolymer coated sample, with a significant increase in the N/C ratio. This is evidence that the peptide monomer (MA-glygly) was incorporated into the polymer chains during the graft polymerisation reaction. The high resolution C 1s XPS spectra obtained for the Si-ALAPP-PI-P(PEGMA (475)-co-MA-glygly) graft copolymer coated sample (see FIG. 27 (*b*) were very similar to those obtained from the Si-ALAPP-PI-P(PEGMA (475)) coatings, as expected, based on the elemental compositions and ratios. There were some small differences between the spectra in the neutral hydrocarbon region (at 285 eV).

Example 27

Preparation of Si-ALAPP, Si-ALAPP-PI and Si-ALAPP-P(PEGMA (475)) Surfaces

A Study of Uniformity and Evenness

Si-ALAPP surfaces were prepared as per Example 15 and covalent coupling of the PI copolymer onto the Si-ALAPP surfaces was carried out as per Example 4. Briefly, silicon wafer pieces were cleaned by ultrasonication in a surfactant solution (2% RBS 35, Pierce Biotechnology, Inc.) for one hour, rinsed copiously in MilliQ™ purified water and blown dry using a high velocity, filtered nitrogen stream. The silicon wafer pieces were then coated with an ALAPP thin film as per Example 15B. Each silicon wafer piece was then placed in a clean Teflon vial and an aliquot (2 mL for small wafer pieces, 4 mL for larger wafer pieces) of a solution comprising 3.6 mL of the PI solution (see Example 3), DMF (10.8 mL), MilliQ™ purified $H_2O$ (1.8 mL) and N-(3-dimethylaminopropyl)-N-ethylcarbodiimide hydrochloride (EDC, 0.18 g, Sigma). The reaction was allowed to proceed overnight with gently shaking at room temperature, following which the silicon wafer pieces were washed in DMF (twice over a day followed by an overnight wash) and purified water (three times over one day) before drying in a laminar flow cabinet. An ALAPP coated control sample was placed in the solution above but without EDC or PI and washed using the same procedure as outlined above.

A subset of the Si-ALAPP-PI samples prepared above was then placed in a custom designed stainless steel cell fitted with an o-ring sealed quartz glass top. To this cell was added monomer solution (de-inhibited PEGMA (475), (10% w/v) and the cell was sealed. Oxygen was removed from the monomer solution by passing nitrogen through the monomer solution for 15 minutes. The inlet and outlet ports of the cell were then sealed and the samples were exposed to UV radiation (320-500 nm wavelength; 50 mWcm$^{-2}$ intensity) for 30 minutes using an EXFO Articure 400 lamp. Following irradiation, the samples were removed, washed copiously with MilliQ™ purified water, soaked overnight in MilliQ™ purified water with intermittent changes and finally rinsed again with MilliQ™ purified water. The samples were then dried in a laminar flow cabinet before XPS analysis.

TABLE 28

Elemental ratios, determined by XPS analysis of Si-ALAPP (n (ie, number of sample points) = 10, from one substrate sample), Si-ALAPP-PI (n = 10, from 3 substrate samples) and Si-ALAPP-PI-P(PEGMA (475)) (n = 16, from 3 substrate samples) samples.

| Sample | O/C | N/C | S/C |
|---|---|---|---|
| Si-ALAPP | 0.131 ± 0.002 | 0.131 ± 0.003 | 0.0000 ± 0.0000 |
| Si-ALAPP-PI | 0.158 ± 0.003 | 0.132 ± 0.003 | 0.0035 ± 0.0003 |
| Si-ALAPP-PI-P(PEGMA (475)) | 0.462 ± 0.006 | 0.000 ± 0.000 | 0.0000 ± 0.0000 |

Figure 28A:
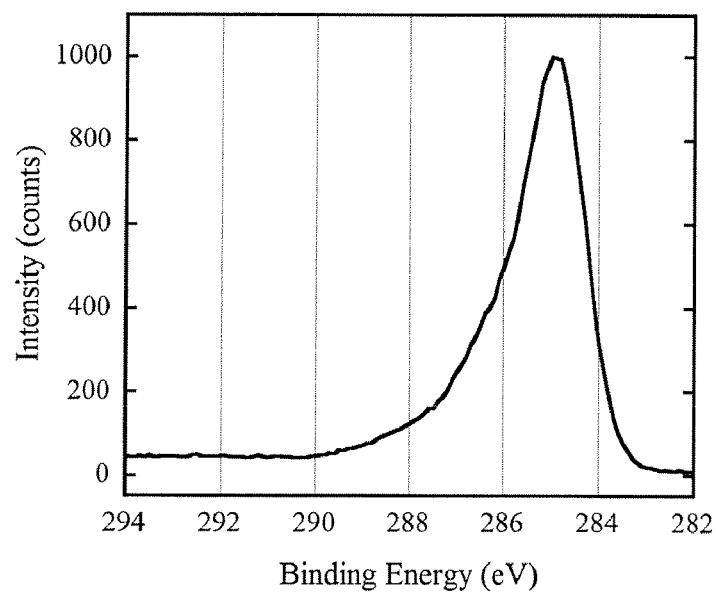
FIG. 28: Representative high resolution C 1s XPS spectra obtained from the surface of (a) Si-ALAPP, (b) Si-ALAPP-PI and (c) Si-ALAPP-PI-P(PEGMA (475)) samples.
Figure 28B:
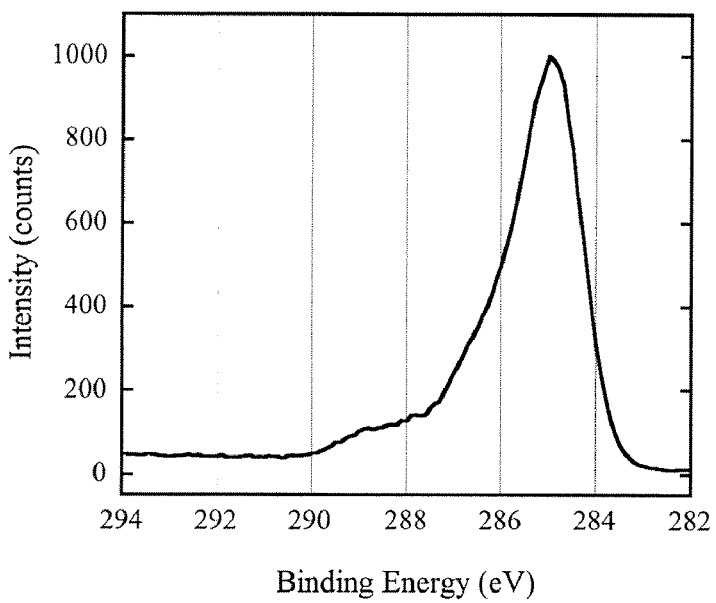
Figure 28C:
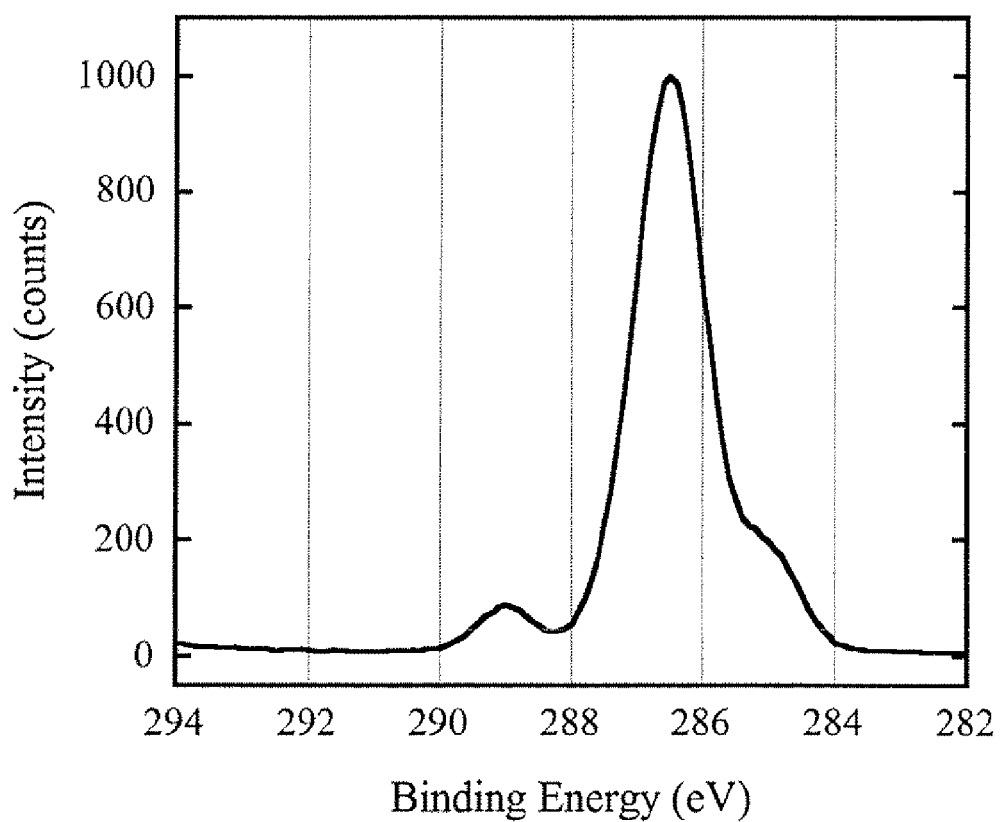
Figure 29A:
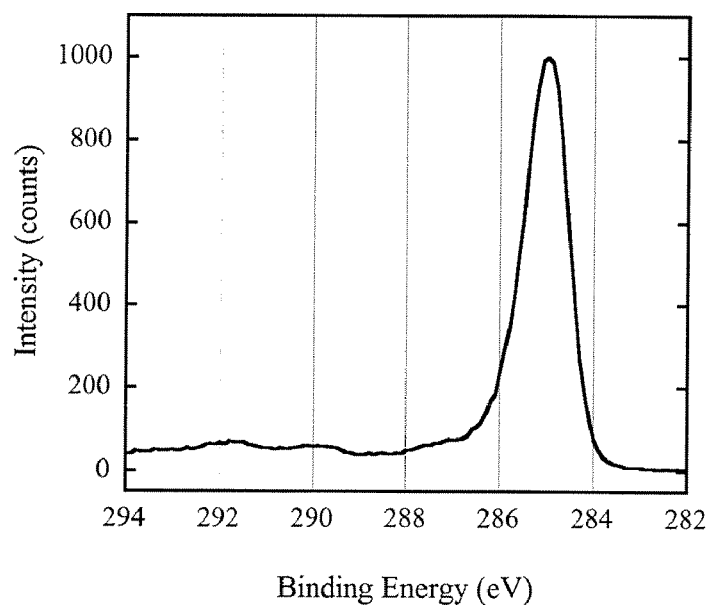
FIG. 29: Representative high resolution C 1s spectra obtained from the surfaces of (a) PS (b) PS-ALAPP (c) PS-ALAPP-PI (d) PS-ALAPP-PI-P(ACRYLAMIDE) (e) PS-ALAPP-PI-P(ACRYLAMIDE-co-biotin MA) (f) PS-ALAPP-PI-P(ACRYLAMIDE-co-biotin MA)-NA samples.
Figure 29B:
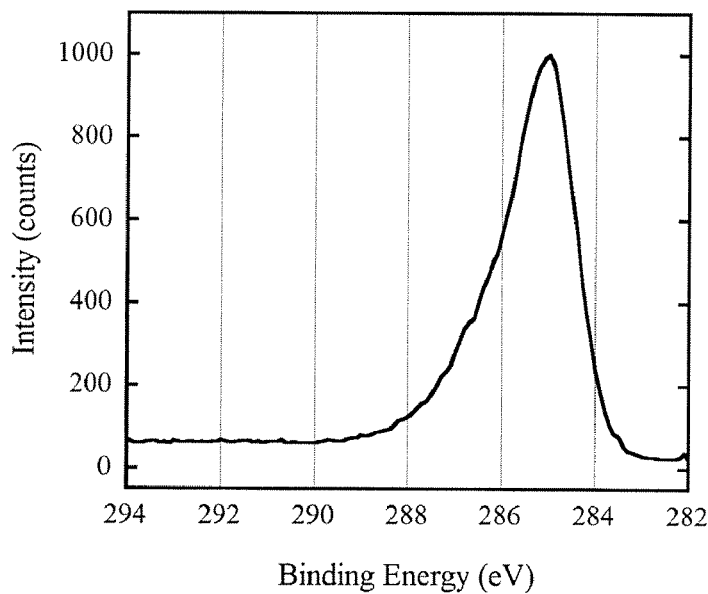
Figure 29C:
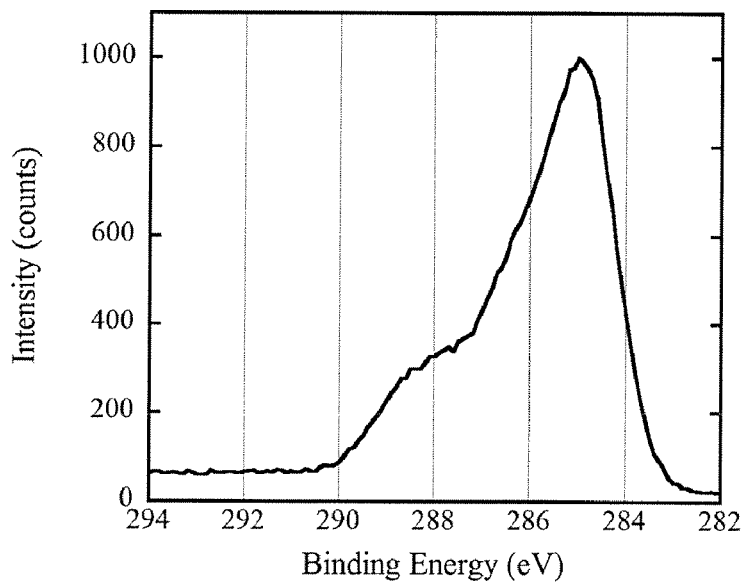
Figure 29D:
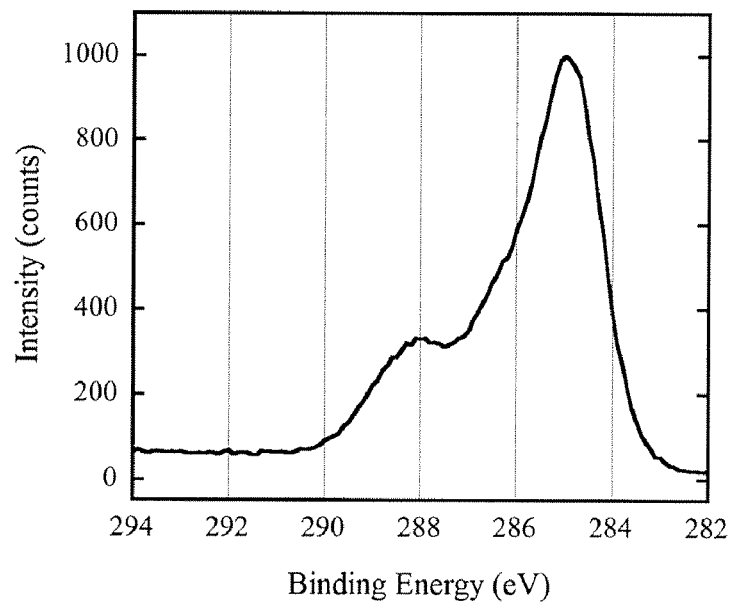
Figure 29E:
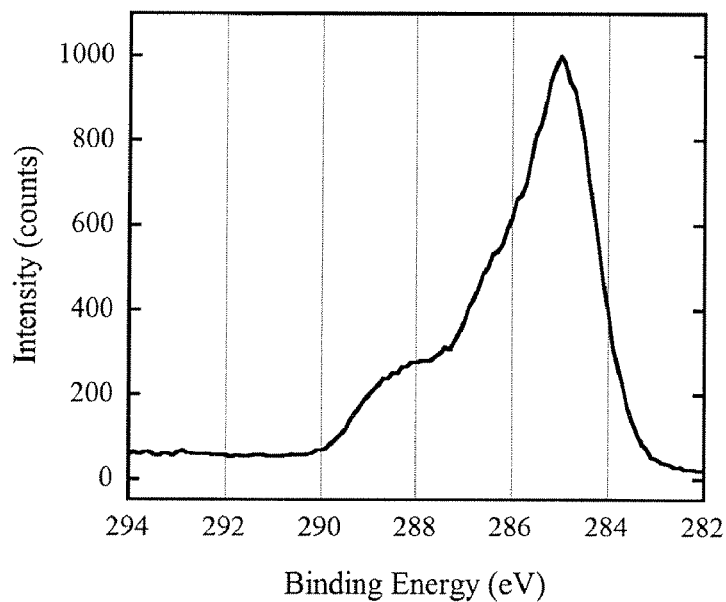
Figure 29F:
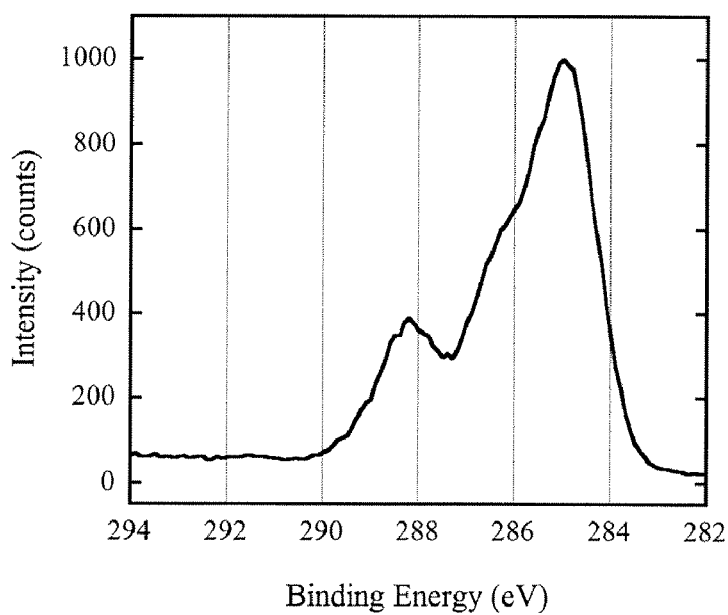

Analysis of the elemental ratios and the magnitudes of the standard deviations presented in Table 28 demonstrate that the samples produced were even and uniform in composition. Representative high resolution C 1s XPS spectra are shown in FIG. 28.

It should be pointed out that, throughout the examples presented in this specification, there were some small differences in the elemental ratios presented. These small differences arise from the fact that the elemental compositions determined by XPS are relative. That is the atomic percentages from all the elements must add up to 100 percent. Therefore, for example, changes in the oxidation of the ALAPP thin film will affect the atomic concentrations of all the other elements. In addition, changes in experimental conditions can have an impact on for example the S/C ratio.

Example 28

Preparation of Si-ALAPP-PI-P(ACRYLAMIDE-co-Biotin MA) Copolymer Coatings in 96 Well Plates and Use in an Enzyme Linked Immunosorbent Assay Part A: Graft Polymerisation of ACRYLAMIDE and Mixtures of ACRYLAMIDE and Biotin-MA from Poly(styrene) Surfaces Coated with ALAPP-PI (PS-ALAPP-PI)

Tissue culture polystyrene (PS) plates in a 96 well format (Nunc, Nunclon™ Δ treated, #167008) were coated with an ALAPP thin film according to the method presented in Example 15D. Typical elemental ratios obtained for the PS and PS-ALAPP sample via XPS analysis are presented in Table 29. The surface of a PS well was carbonaceous in nature with the incorporation of oxygen (O/C=0.152) from the surface modification used in the manufacture of these plates. Coating of the PS surface with an ALAPP thin film resulted in the introduction of N(N/C 0.155), which arose from the nitrogen containing groups in the ALAPP layer. In addition, the O/C ratio was reduced (from 0.152 to 0.099) due to the lower degree of oxidation of the ALAPP thin film, compared to the PS surface. The polystyrene nature (with a moderate degree of oxidation) was confirmed by analysis of high resolution C 1s XPS spectra (see FIG. 29 (a): note the presence of aromatic 'shake up' peaks at higher binding energies). Deposition of an ALAPP thin film on the PS surface resulted in a broader high resolution C 1s spectrum due to the presence of numerous C, N and O species. A coating the full thickness of the XPS sampling depth (10 nm) was verified but the elimination of aromatic 'shake up' peaks at higher binding energies by the ALAPP overlayer.

The PI copolymer was then covalently coupled to the surface of the PS-ALAPP samples as per Example 15B except that DMSO was used in place of DMF as the solvent and no water was added as a co-solvent. Typical elemental ratios for the PS-ALAPP-PI samples, obtained via XPS analysis, are presented also in Table 29. Here it may be observed that the O/C ratio was increased and the N/C ratio was decreased compared to the PS-ALAPP sample, consistent with the presence of an overlayer of PI copolymer covalently grafted to the PS-ALAPP surface. In addition, S from the semithiocarbamate moieties in the PI copolymer was also present on the PS-ALAPP-PI sample but not on the PS-ALAPP sample, confirming covalent attachment. Further evidence of successful covalent coupling of the PI copolymer onto the surface of the PS-ALAPP samples was obtained via analysis of high resolution C 1s XPS spectra (see FIG. 29 (c)), the main feature of interest being the presence of a high binding energy contribution to the spectra due to the presence of carboxylic acid residues from the covalently attached PI overlayer. This spectral component was not present in the high resolution C 1s spectra obtained for the PS-ALAPP samples (see FIG. 29 (b)). PS-ALAPP-PI coated plates, in the 96 well format, were prepared as above. Solutions of (i) acrylamide monomer (10% w/v, 300 mg in 3 mL DMSO) and (ii) acrylamide monomer (150 mg) and Biotin-MA (87 mg, synthesised according to the method presented in Example 15B) in 3 mL DMSO were prepared and de-oxygenated using Nitrogen gas for 20 minutes. The flasks containing the monomer solutions were then sealed and transferred into a glove box, along with a custom designed UV polymerisation cell (stainless steel with o-ring sealed quartz glass lid) and the PS-ALAPP-PI coated 96 well plates. Aliquots of the monomer solutions (100

µL) were then transferred by pipette into the wells of the PS-ALAPP-PI coated 96 well plate. The 96 well plate containing monomer solution was then transferred into the UV polymerisation cell, the cell was sealed and removed from the glove box. Each quarter (a mask was placed on the remaining 3 quarters of the plate) of the PS-ALAPP-PI coated 96 well plate in the UV polymerisation cell (where the wells were partially filled with monomer solution), was then irradiated with UV light (320-500 nm wavelength; 50 mWcm$^{-2}$) for 30 minutes, in turn, using an EXFO Articure 400 lamp. After all four quarters of the plate were irradiated with UV light, the cell was opened and the 96 well plate removed. Each well of the plate was then washed twice with DMSO (250 µL of DMSO for 1 to 1.5 hours for each wash) and then soaked overnight in DMSO (250 µL in each well). Finally, the wells were washed thoroughly with MilliQ™ purified water (three times for 1-1.5 hours). The plates were then dried in a laminar flow cabinet before XPS analysis. In some cases, wells were partially filled (100 µL) with a solution of NeutrAvidin™ biotin binding protein (Pierce Biotechnology Inc.) (50 µg/mL in HEPES buffer) and incubated overnight at room temperature. The wells were then rinsed in 1M NaCl (twice over two hours then overnight) and HEPES buffer (three times over two hours) and finally rinsed in MilliQ™ purified water five times over a 30 minute time period before drying. The HEPES buffer contained 150 mM NaCl and 20 mM [N-2-hydroxyethyl)-1-piperazine-N'-2-ethanesulphonic acid, sodium salt] (HEPES) and was adjusted to pH 7.2 using a 1 M NaOH solution. For XPS analysis, the bottom of each well was removed, without contamination, from the plate using a specially designed stainless steel tool (from the underneath of the plate) and mounted in a specially designed XPS sample holder which avoided sample charging.

Presented in Table 29 are the elemental ratios calculated from XPS analysis of the PS-ALAPP-PI-P(ACRYLAMIDE) and PS-ALAPP-PI-(ACRYLAMIDE-co-Biotin MA) samples. Graft polymerisation of P(ACRYLAMIDE) from the surface of PS-ALAPP-PI samples resulted in an increase in both the O/C and N/C ratios, consistent with the presence of a thin coating of P(ACRYLAMIDE). Graft copolymerisation of P(ACRYLAMIDE-co-biotin MA) from the surface of the PS-ALAPP-PI sample resulted in an increase in the N/C atomic ratio, again consistent with the presence of a thin, graft copolymer coating. In addition, the S/C ratio increased after the graft polymerisation reaction, indicating the incorporation of biotin from the biotin-MA monomer into the coating. It should be noted that the graft polymer coatings were thinner than the XPS sampling depth. This was ascertained by comparison with the compositions obtained by XPS analysis of similar coatings on silicon wafer substrates (see Example 15). This may be expected due to a reduced intensity of UV irradiation inside the well of a 96 well plate, compared to a flat silicon wafer substrate. Confirmation that the graft polymerisation reactions described above were successful was obtained via high resolution XPS spectral analysis. In FIGS. 29 (d) and (e) are presented the high resolution C 1s XPS spectra obtained from the surfaces of PS-ALAPP-PI-P(ACRYLAMIDE) and PS-ALAPP-PI-(ACRYLAMIDE-co-Biotin MA) samples. Both spectra contain a feature consistent with the presence of amides (from polymerisation of the acrylamide monomer at a binding energy of 288 eV) in the graft polymerisation coatings. The amide peak is less prominent in spectra from the PS-ALAPP-PI-(ACRYLAMIDE-co-Biotin MA) samples than in those from PS-ALAPP-PI-P(ACRYLAMIDE) due to the presence of biotin MA in the coating. This trend was also observed in Example 15.

Also included in Table 29 are the elemental ratios obtained from XPS analysis of the surface of PS-ALAPP-PI-(ACRYLAMIDE-co-Biotin MA) sample after incubation in NA solution. A marked increase in the O/C and N/C ratios were observed, consistent with binding of NeutraVidin™ (NA) onto the PS-ALAPP-PI-(ACRYLAMIDE-co-Biotin MA) sample. The features present in the high resolution C 1s spectrum of this sample, presented in FIG. 29 (f), are distinctive for the presence of protein (i.e. NA) on the surface.

TABLE 29

Elemental ratios calculated from XPS analysis of PS, PS-ALAPP, PS-ALAPP-PI, PS-ALAPP-PI-P(ACRYLAMIDE), PS-ALAPP-PI-P(ACRYLAMIDE-co-biotin MA) and PS-ALAPP-PI-P(ACRYLAMIDE-co-biotin MA)-NA samples.

| Sample | O/C | N/C | S/C |
|---|---|---|---|
| PS | 0.152 | 0.000 | 0.000 |
| PS-ALAPP | 0.099 | 0.155 | 0.000 |
| PS-ALAPP-PI | 0.290 | 0.108 | 0.009 |
| PS-ALAPP-PI-P(ACRYLAMIDE) | 0.301 | 0.121 | 0.009 |
| PS-ALAPP-PI-P(ACRYLAMIDE-co-biotin MA) | 0.288 | 0.122 | 0.018 |
| PS-ALAPP-PI-P(ACRYLAMIDE-co-biotin MA)-NA | 0.283 | 0.189 | 0.009 |

Part B: Enzyme Linked Immunosorbent Assay (ELISA) Using PS-ALAPP-PI-ACRYLAMIDE-co-Biotin MA) Coated 96 Well Plates Microtitre plates in the 96 well format with wells coated with P(ACRYLAMIDE-co-Biotin MA) were prepared as described above. In three of the 11 wells tested, NeutrAvidin™ biotin binding protein (Pierce Biotechnology, Inc.) (NA) was also added, as described in Part A. All of the wells to be tested were then blocked. Aliquots (200 µL) of a bovine serum albumin (BSA) blocking solution (1% BSA) in TBS buffer (25 mM 2-Amino-2-hydroxymethyl-1,3-propanediol, 136 mM NaCl, 2.7 mM KCl, pH adjusted to 8 with 1 M HCl) were placed in the wells of the plate and incubation overnight at 4° C. was carried out.

To the wells containing bound NA and four other wells, which did not contain NA (biotinylated IgG (1° Ab) control), the BSA blocking solution was removed and 100 µL of biotin-SP-conjugated Goat anti-mouse IgG (Jackson ImmunoResearch, #115-066-072) (1° Ab) solution was added, which had been diluted 1 in 1000 to a concentration of 2 µg/mL with a solution of 1 wt % BSA in TBS buffer containing Tween 20 (0.05 wt %) (TBST buffer), was added to some of the wells on the plate. The wells containing the biotinylated IgG (1° Ab) were covered and incubated at room temperature for four hours. The biotinylated IgG solution, and the BSA blocking solution from the remaining four wells (no 1° Ab added), was then removed and the wells were washed three times with TBST buffer.

To all 11 wells was then added 100 µL of Donkey anti-goat Ig-HRP conjugate (Silenus #UAH) solution which had been diluted 1 to 500 in TBST buffer containing 1 wt % BSA. After incubation for 1.5 hours, the Donkey anti-goat Ig-HRP conjugate solution was removed and the wells were washed three times with TBST buffer. Aliquots (100 µL) of a developing reagent (ABTS) were then added to all 11 wells tested. The ABTS solution comprised 2,2'-azino-bis(3-ethylbenzthiazoline-6-sulphonic acid) (5 mg) dissolved in a citrate buffer (10 mL) to which was added 20 µL of hydrogen peroxide. The solution was used immediately after preparation. After 15 minutes, the ABTS solution was removed from all wells and transferred to a new microtitre 96 well plate for reading in a Biotek ELISA plate reader at a wavelength of 405 nm.

The wells tested were designated as the following:
(i) Wells to which NA was bound and to which 1° Ab and 2° Ab were added (+NA, +1° Ab, +2° Ab).
(ii) Wells which did not contain NA and to which 1° Ab and 2° Ab were added (−NA, +1° Ab, +2° Ab).
(iii) Wells which did not contain NA, to which no 1° Ab was added but to which 2°AB was added (−NA, −1° Ab, +2° Ab).

Figure 30:
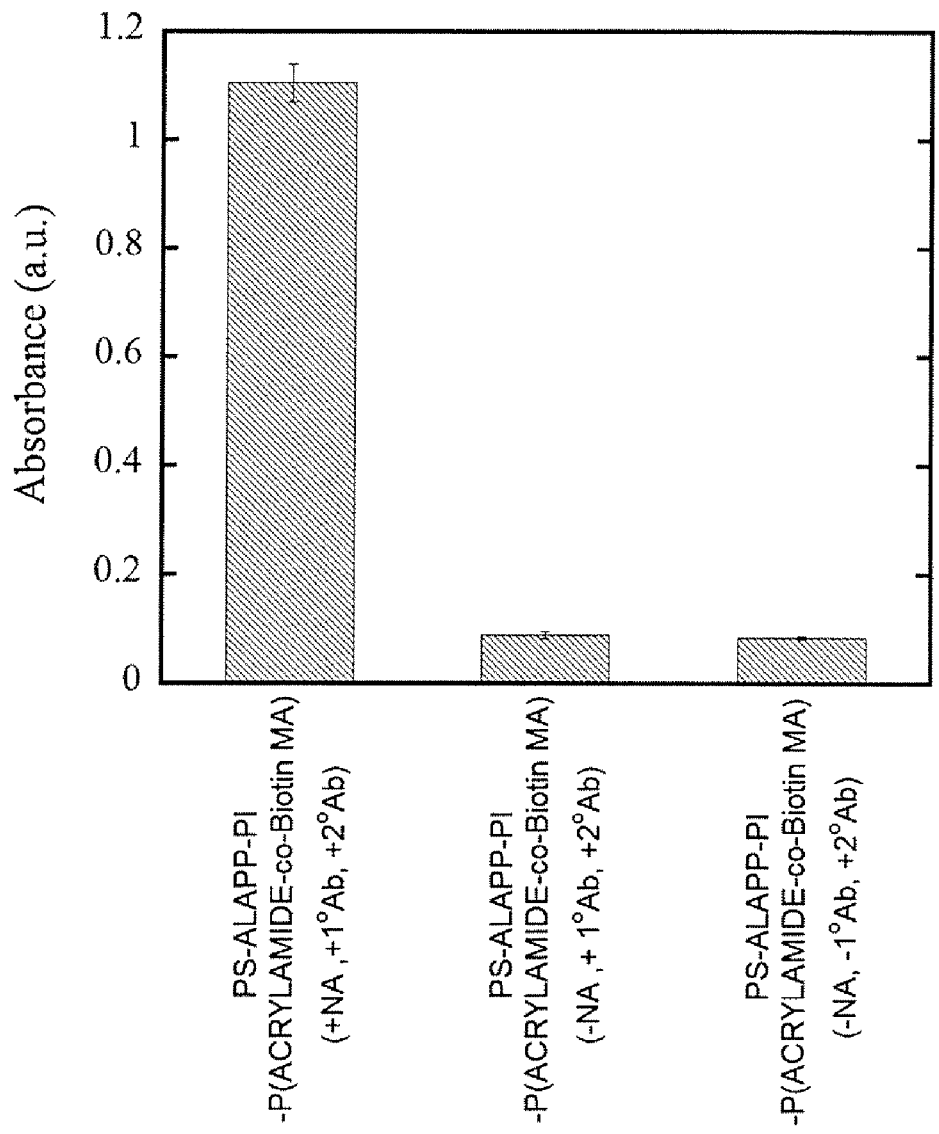
FIG. 30: Absorbance values (405 nm) obtained for ABTS developed solutions of wells containing PS-ALAPP-PI-P(ACRYLAMIDE-co-biotin MA) to which was added (i) NeutrAvidin™ biotin binding protein, biotinylated IgG and Ig-HRP conjugate (+NA, +1° Ab, +2° Ab), (ii) biotinylated IgG and Ig-HRP conjugate (−NA, +1° Ab, +2° Ab) and (iii) Ig-HRP conjugate only (−NA, −1° Ab, +2° Ab)

Wells which contained bound NA would be expected to bind the biotinylated IgG (1° Ab) and to form the HRP conjugate which could be detected by measuring the absorbance of the developed solution with an ELISA plate reader. Data obtained for the wells tested in presented in FIG. 30. Here the measured absorbance was high (1.05) only for the wells which contained NA bound onto the P(ACRYLAMIDE-co-biotin MA) coating (+NA, +1° Ab, +2° Ab). Low non-specific adsorption of the biotinylated IgG (1° Ab) was verified by the low absorbance obtained (0.089) for the wells which did not contain bound NA but to which was added the 1° Ab (−NA, +1° Ab, +2° Ab). This data is clear evidence that the PS-ALAPP-PI-P(ACRYLAMIDE-co-biotin MA) coating bound NA, that the NA was detectable with an ELISA assay and that the non-specific adsorption of the 1° Ab was low. In addition, the absorbance obtained for the 2° Ab control (−NA, −1° Ab, +2° Ab) was also low (0.084) indicating that non-specific adsorption of the 2° Ab onto the PS-ALAPP-PI-P(ACRYLAMIDE-co-biotin MA) coating was also low.

Example 29

Gradient Graft Polymerisation of PEGMA (475) from Si-ALAPP-PI Surfaces

Part A: Gradient Graft Polymerisation of PEGMA (475) from SI-ALAPP-PI Surfaces

Si-ALAPP surfaces were prepared as per Example 15 and covalent coupling of the PI copolymer onto the Si-ALAPP surfaces was carried out as per Example 4. However, in this example, clean glass microscope slides were used as substrates instead of silicon wafer pieces. In short, six ALAPP treated glass microscope slides were placed in a solution comprising 9 mL of the PI solution (see Example 3), DMF (27 mL), MilliQ™ purified $H_2O$ (4.5 mL) and N-(3-dimethylaminopropyl)-N-ethylcarbodiimide hydrochloride (EDC, 0.45 g, Sigma). The reaction was allowed to proceed overnight at room temperature, following which the glass microscope slides were washed in DMF (twice over a day followed by an overnight wash) and purified water (three times over one day) before drying in a laminar flow cabinet.

Figure 31:
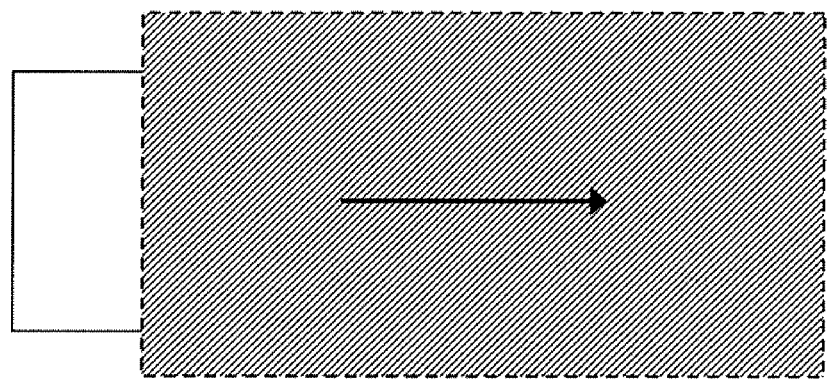
FIG. 31: Schematic indicating position of UV opaque mask (hatched rectangle) on Si-ALAPP-PI coated glass microscope slide (clear) for the period of UV irradiation. The arrow indicates the direction that the mask was moved for subsequent UV irradiation steps.

The Si-ALAPP-PI slides prepared above were then placed in a custom designed stainless steel cell fitted with an o-ring sealed quartz glass top. To this cell was added monomer solution (de-inhibited PEGMA (475), 10% w/v) which had been degassed with Nitrogen for 30 mins. A UV opaque mask, which covered most of the glass slide area (1.5 cm of the length was left exposed), was then placed on top of the quartz glass window. The distance between the mask and the surface of the Si-ALAPP-PI sample was 1 cm. UV irradiation of the exposed area of the glass slide was carried out for five minutes (320-500 nm wavelength; 50 mWcm$^{-2}$) using an EXFO Articure 400 lamp. After irradiation for five minutes, the masked was moved 1 cm along the glass slide and an additional 5 minutes of UV irradiation carried out, and so on, giving in total 7 areas with different irradiation times (see FIG. 31). At the end of the slide, a region of 1 cm did not receive any UV irradiation. Thus, in the centre of the slide, the total UV irradiation was 15 minutes. After all irradiation treatments had been carried out, the samples were removed, washed copiously with MilliQ™ purified water, soaked for two days in MilliQ™ purified water with intermittent changes and finally rinsed again with MilliQ™ purified water. The samples were then dried in a laminar flow cabinet before XPS analysis.

Figure 32:
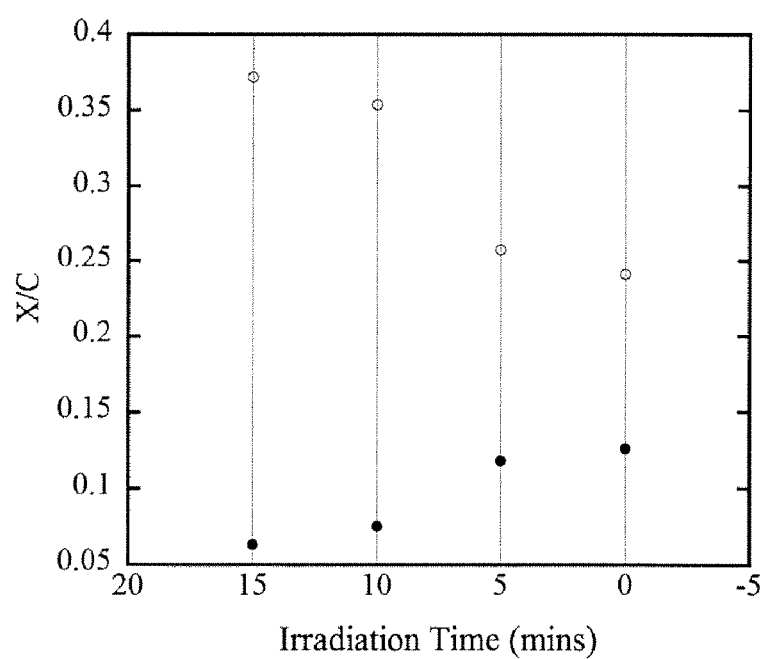
FIG. 32: Elemental ratios (○) O/C and (●) N/C determined from XPS analysis of gradient polymer coated Si-ALAPP-PI-P(PEGMA (475)) microscope slide as a function of UV irradiation time.
Figure 33A:
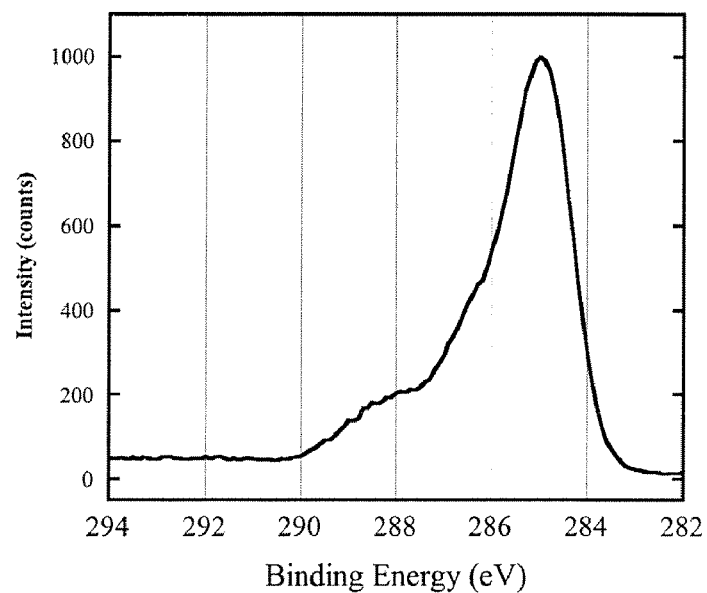
FIG. 33 (a): High resolution C1s XPS spectrum obtained from region of slide (a) which did not receive any UV irradiation (7 cm), (b) containing gradient graft polymerised coating of Si-ALAPP-PI-P(PEGMA (475)) which received 10 minutes UV irradiation (5 cm) and (c) containing gradient graft polymerised coating of Si-ALAPP-PI-P(PEGMA (475)) which received 15 minutes UV irradiation (4 cm).
Figure 33B:
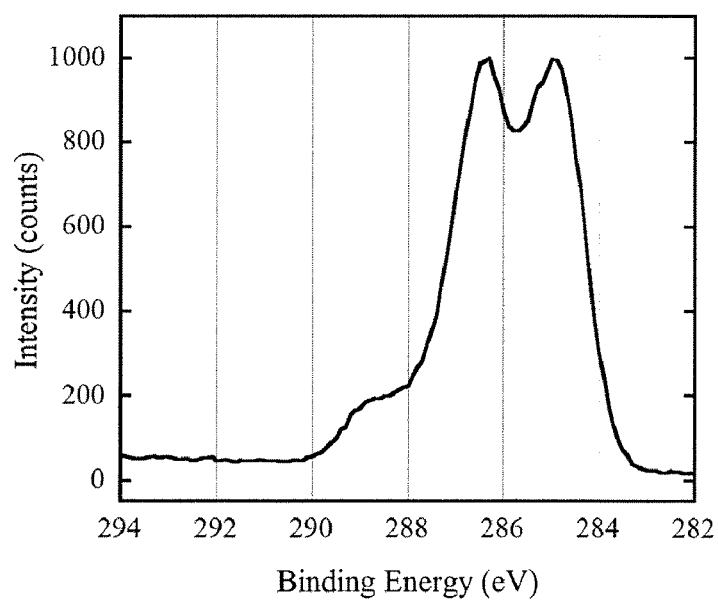
Figure 33C:
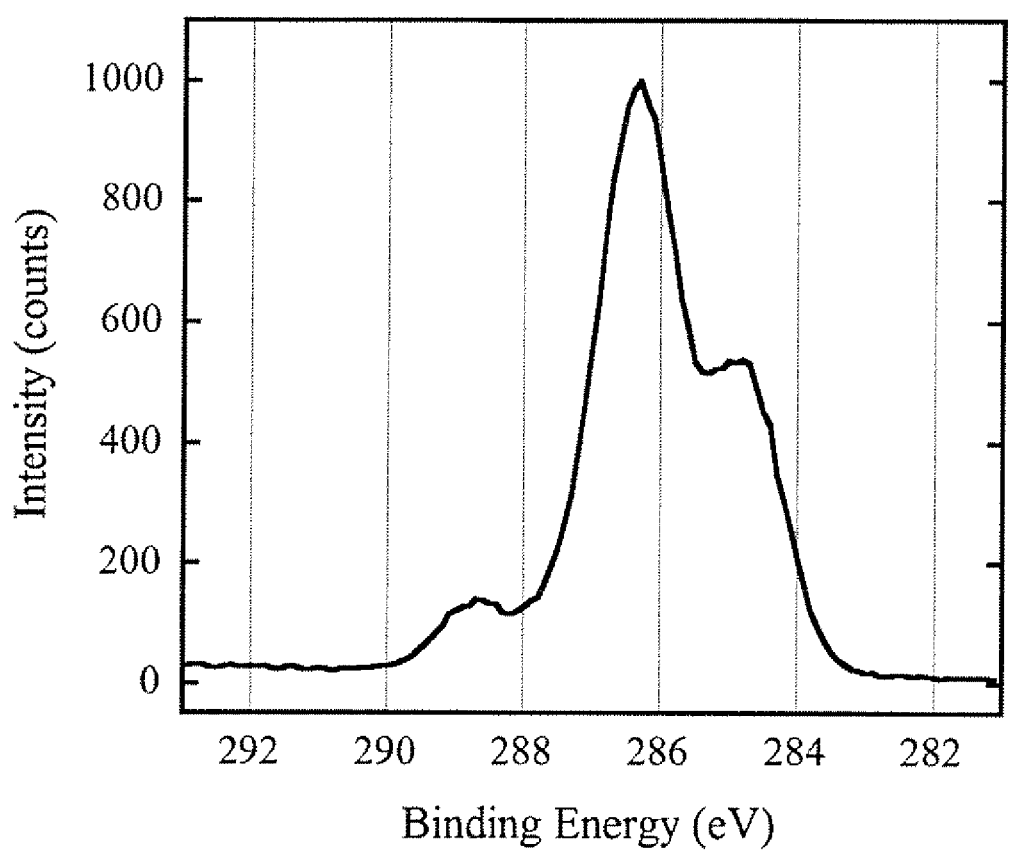
Figure 34A:
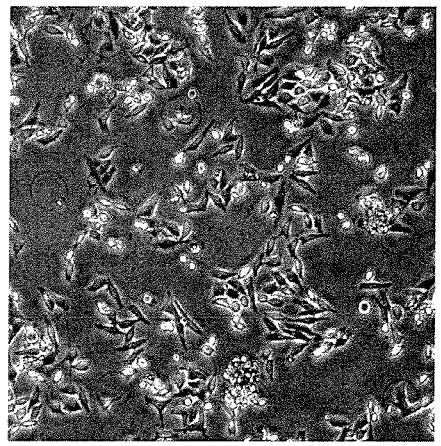
FIG. 34: Representative fields (4× objective magnification) showing HeLa cell attachment to gradient graft polymerised Si-ALAPP-PI-P(PEGMA (475)) surfaces after 18 hours in cell culture. The fields represent regions which were exposed to UV irradiation for (a) 5 minutes (b) 10 minutes (c) 20 minutes as well as (d) TCPS control surfaces.
Figure 34B:
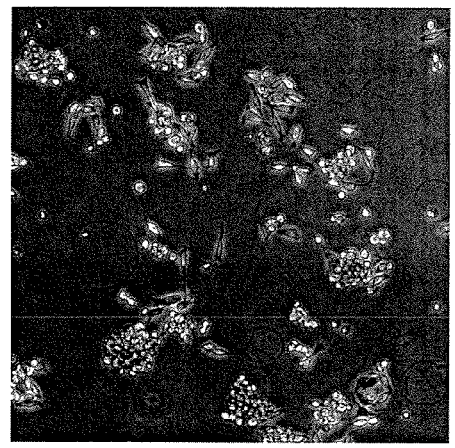
Figure 34C:
Figure 34D:
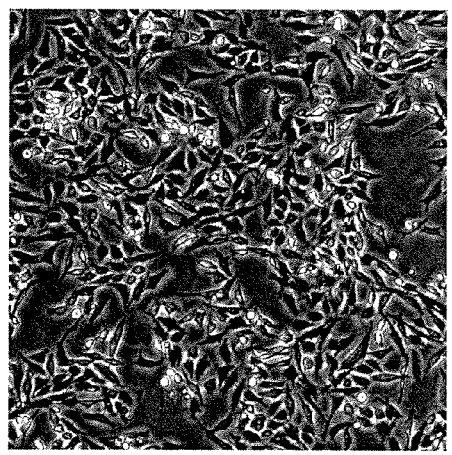

Presented in Table 30 are the elemental ratios determined via XPS analysis of regions along the Si-ALAPP-PI-P (PEGMA (475)) coated slide compared to a control region which was not exposed to UV irradiation at 7 cm along the slide and a full thickness Si-HAPP-PI-P(PEGMA (475)) sample from Example 5. Here 6, 5 and 4 cm along the slide represents 5, 10 and 15 minutes of UV irradiation respectively. It is clear from these data that the elemental ratios obtained were very different in the four regions analysed. As the irradiation time increased, the O/C ratio increased and the N/C ratio decreased. These trends are as expected for the presence of a P(PEGMA (475)) graft layer of increasing thickness as the irradiation time increased. These trends are also presented in FIG. 32 where the open circles represent the O/C ratio and the closed circles the N/C ratio. It should be pointed out that the P(PEGMA (475)) coating thickness at all points along the slide up to 15 minutes irradiation was less than the XPS sampling depth (10 nm) (see comparison with full thickness data from Example 5 in Table 30. Further evidence of the varying thickness of the P(PEGMA (475)) coating with irradiation time was also obtained by analysis of high resolution C 1s spectra (see FIGS. 33 (a) to (c)). Here it may be seen that the shape of the C 1s profile changed from that expected for a Si-ALAPP-PI surface (see FIG. 33 (a)) at zero UV irradiation time, to that expected for a Si-ALAPP-PI-P (PEGMA (475)) coating, of less than the XPS sampling depth, in a gradual manner (see FIGS. 33(b) and (c)) with increasing UV irradiation time. Of particular note was the increase in the proportion of C—O (binding energy 286.5) as the irradiation time was increased from zero (at 7 cm) to 15 minutes (at 4 cm). The fact that it was possible to increase the thickness of the P(PEGMA (475)) coatings by stopping UV irradiation, moving the mask and then continuing UV irradiation is direct evidence that this graft polymerisation reaction was (i) initiated by UV irradiation and (ii) living in nature.

TABLE 30

Elemental ratios, determined by XPS analysis of Si-ALAPP-PI (7 cm along slide), Si-HAPP-PI-P(PEGMA (475)) (6, 5 and 4 cm along slide) and Si-HAPP-PI-P(PEGMA (475)) (from Example 5).

| Sample | O/C | N/C | S/C |
|---|---|---|---|
| Si-ALAPP-PI (7 cm along slide) | 0.241 | 0.126 | 0.005 |
| Si-ALAPP-PI-P(PEGMA (475)) (6 cm along slide) | 0.257 | 0.118 | 0.005 |
| Si-ALAPP-PI-(P(PEGMA (475)) (5 cm along slide) | 0.354 | 0.075 | 0.003 |
| Si-ALAPP-PI-(P(PEGMA (475)) (4 cm along slide) | 0.372 | 0.063 | 0.001 |
| Si-HAPP-PI-(P(PEGMA (475)) (from Example 5) | 0.476 | 0.001 | 0.000 |

Part B: Determination of Differences in HeLa Cell Attachment in Regions of Gradient Polymerisation Si-ALAPP-PI-P(PEGMA (475)) Surfaces Graft polymer coated glass slides (Si-ALAPP-PI-P (PEGMA (475))) containing both masked and unmasked regions were transferred to 4-chamber culture trays (Nunc, Roskilde, Denmark) and each slide was soaked in a sterile solution of phosphate buffered saline (PBS, pH7.4) serum-free culture medium (SFM, Dulbecco's Modified Eagles Medium/Ham's F12 (50:50)) containing penicillin and streptomycin (120 µg/mL and 200 µg/mL, respectively) for three and a half hours at room temperature.

The sterilising solution from the step above was removed and HeLa cells were seeded at a density of $1 \times 10^6$ cells/chamber in a culture medium composed of SFM supplemented with 10% (v/v) foetal bovine serum (FBS). Cells were incubated for 24 hours at 37° C. in humidified air containing 5% $CO_2$. HeLa cells were viewed after 18 and 24 hours incubation by phase contrast microscopy (Olympus IX81, Olympus, Japan) and representative images were recorded digitally.

As previously, in Example 9, that HeLa cells attach well and spread on a Si-HAPP-PI surface and do not attach well and spread on a thick Si-HAPP-P(PEGMA (475)) surface. This difference can be attributed to the presence of a grafted P(PEGMA (475)) layer which resists the attachment of HeLa cells. It is clear from the images showing cell attachment in Figures W(a) to (e) that for low irradiation times (FIG. 34 (*a*)), and therefore thin P(PEGMA (475)) coatings, there was a significant amount of cell attachment with slightly lower density than the PS controls (FIG. 34 (*e*)). Furthermore, the cell spreading observed was very similar in both the 5 minute UV irradiated region of the slide to the PS control. However, as the irradiation time increased, and therefore the thickness of the coating increased, the degree of cell attachment decreased as expected. Furthermore the amount of cell spreading decreased markedly as the irradiation time was increased, to the point that the few cells that attached on the 20 minute UV irradiated region (FIG. 34 (*d*)), have a very rounded morphology.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A controllable polymeric surface coating including a macromolecule, which is covalently bound to the surface of a substrate, the macromolecule including a plurality of polymerisation initiators and a plurality of surface binding groups; and pendant polymers grafted from at least some of the polymerisation initiators.

2. A controllable polymeric surface coating according to claim 1, wherein the macromolecule includes a predetermined molar ratio of polymerisation initiators of at least 1%.

3. A controllable polymeric surface coating according to claim 1, wherein the polymerisation initiators are controlled free radical polymerisation initiators.

4. A controllable polymeric surface coating according to claim 1, wherein the pendant polymers are grafted from the polymerisation initiators by controlled free radical living polymerisation.

5. A controllable polymeric surface coating according to claim 1, wherein the controllable polymeric surface coating further includes additional polymers grafted to the pendant polymers.

6. A controllable polymeric surface coating according to claim 1, wherein the controllable polymeric surface coating further includes at least one biologically active component attached to the pendant polymer.

7. A controllable polymeric surface coating according to claim 1, wherein the pendant polymers possess a controlled architecture.

8. A controllable polymeric surface coating according to claim 1, wherein the pendant polymers modulate a biological response.

9. A controllable polymeric surface coating according to claim 8, wherein the pendant polymers modulate cell attachment.

10. A method for preparing a controllable polymeric surface coating on a surface of a substrate including covalently binding a macromolecule to the surface, wherein the macromolecule includes a plurality of polymerisation initiators and a plurality of surface binding groups; and grafting pendant polymers from at least some of the polymerisation initiators.

11. A method according to claim 10, wherein the macromolecule includes a predetermined molar ratio of polymerisation initiators of at least 1%.

12. A method according to claim 10, wherein the polymerisation initiators are controlled free radical polymerisation initiators.

13. A method according to claim 10, wherein the pendant polymers are grafted from the polymerisation initiators by controlled free radical living polymerisation.

14. A method according to claim 10, wherein the method further includes providing additional polymers which are grafted to the pendant polymers.

15. A controllable polymeric surface coating formed from a macromolecule, which is covalently bound to the surface of a substrate, the macromolecule including a plurality of polymerisation initiators and a plurality of surface binding groups; wherein pendant polymers are grafted from at least some of the polymerisation initiators to form the coating.

16. A controllable polymeric surface coating according to claim 15, wherein the pendant polymers are grafted from at least some of the polymerisation initiators simultaneous or subsequent to covalent binding of the macromolecule to said substrate to form the coating.

17. A controllable polymeric surface coating, comprising
a macromolecule covalently bound to a surface of a substrate, wherein the macromolecule comprises a plurality of polymerisation initiators and a plurality of surface binding groups; and
pendant polymers, wherein pendant polymers grafted from at least some of the polymerisation initiators form the coating.

* * * * *